(12) United States Patent
Goodrich et al.

(10) Patent No.: US 12,347,045 B2
(45) Date of Patent: *Jul. 1, 2025

(54) 3D CAPTIONS WITH SEMANTIC GRAPHICAL ELEMENTS

(71) Applicant: Snap Inc., Santa Monica, CA (US)

(72) Inventors: Kyle Goodrich, Venice, CA (US); Samuel Edward Hare, Los Angeles, CA (US); Maxim Maximov Lazarov, Culver City, CA (US); Tony Mathew, Irvine, CA (US); Andrew James McPhee, Culver City, CA (US); Daniel Moreno, New York, NY (US); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,163

(22) Filed: Jan. 22, 2024

(65) Prior Publication Data

US 2024/0161425 A1 May 16, 2024

Related U.S. Application Data

(63) Continuation of application No. 18/121,893, filed on Mar. 15, 2023, now Pat. No. 11,908,093, which is a (Continued)

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06F 3/04883* (2013.01);
(Continued)

(58) Field of Classification Search
None
See application file for complete search history.

(56) References Cited

U.S. PATENT DOCUMENTS 5,751,850 A 5/1998 Rindtorff
5,880,731 A 3/1999 Liles et al.
(Continued)

FOREIGN PATENT DOCUMENTS

CA 2887596 A1 7/2015
CN 103443582 A 12/2013
(Continued)

OTHER PUBLICATIONS

US 10,964,114 B2, 03/2021, Hare et al. (withdrawn)
(Continued)

*Primary Examiner* — Tapas Mazumder
(74) *Attorney, Agent, or Firm* — Schwegman Lundberg & Woessner, P.A.

(57) ABSTRACT

Aspects of the present disclosure involve a system comprising a computer-readable storage medium storing at least one program and method for performing operations comprising: receiving, by a messaging application, a video feed from a camera of a user device that depicts a face; receiving a request to add a 3D caption to the video feed; identifying a graphical element that is associated with context of the 3D caption; and displaying the 3D caption and the identified graphical element in the video feed at a position in 3D space of the video feed proximate to the face depicted in the video feed.

20 Claims, 37 Drawing Sheets

Related U.S. Application Data continuation of application No. 17/528,697, filed on Nov. 17, 2021, now Pat. No. 11,636,657, which is a continuation of application No. 16/721,459, filed on Dec. 19, 2019, now Pat. No. 11,227,442.

(51) Int. Cl.
*G06F 3/04883* (2022.01)
*G06T 15/80* (2011.01)
*G06T 19/20* (2011.01)

(52) U.S. Cl.
CPC .............. *G06T 15/80* (2013.01); *G06T 19/20* (2013.01); *G06T 2219/2004* (2013.01)

(56) References Cited

U.S. PATENT DOCUMENTS

| | | |
|---|---|---|
| 6,020,891 A | 2/2000 | Rekimoto |
| 6,023,270 A | 2/2000 | Brush, II et al. |
| 6,031,549 A | 2/2000 | Hayes-roth |
| 6,038,295 A | 3/2000 | Mattes |
| 6,157,342 A | 12/2000 | Okude et al. |
| 6,223,165 B1 | 4/2001 | Lauffer |
| 6,434,277 B1 | 8/2002 | Yamada et al. |
| 6,772,195 B1 | 8/2004 | Hatlelid et al. |
| 6,842,779 B1 | 1/2005 | Nishizawa |
| 6,867,787 B1 * | 3/2005 | Shimizu ............ G06T 11/203 345/441 |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,553,032 B1 | 10/2013 | Poston |
| 8,559,980 B2 | 10/2013 | Pujol |
| 8,564,621 B2 | 10/2013 | Branson et al. |
| 8,564,710 B2 | 10/2013 | Nonaka et al. |
| 8,570,343 B2 | 10/2013 | Halstead |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,031,809 B1 | 5/2015 | Kumar et al. |
| 9,040,574 B2 | 5/2015 | Wang et al. |
| 9,055,416 B2 | 6/2015 | Rosen et al. |
| 9,058,757 B2 | 6/2015 | Bala et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,430,791 B1 | 8/2016 | Sutton-Shearer |
| 9,442,564 B1 | 9/2016 | Dillon |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,517,403 B1 | 12/2016 | Kim et al. |
| 9,544,257 B2 | 1/2017 | Ogundokun et al. |
| 9,576,201 B2 | 2/2017 | Wu et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,789,403 B1 | 10/2017 | Furment et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,318,034 B1 | 6/2019 | Hauenstein et al. |
| 10,362,219 B2 | 7/2019 | Wilson et al. |

(56) References Cited

U.S. PATENT DOCUMENTS

| | | |
|---|---|---|
| 10,387,730 B1 | 8/2019 | Cowburn et al. |
| 10,475,225 B2 | 11/2019 | Park et al. |
| 10,504,266 B2 | 12/2019 | Blattner et al. |
| 10,529,109 B1 | 1/2020 | Chen et al. |
| 10,573,048 B2 | 2/2020 | Ni et al. |
| 10,593,116 B2 | 3/2020 | Egri et al. |
| 10,657,701 B2 | 5/2020 | Osman et al. |
| 10,699,488 B1 | 6/2020 | Terrano |
| 10,740,978 B2 | 8/2020 | McPhee et al. |
| 10,803,665 B1 | 10/2020 | Patel |
| 10,990,246 B1 | 4/2021 | Law et al. |
| 11,030,813 B2 | 6/2021 | Hare et al. |
| 11,176,737 B2 | 11/2021 | Hare et al. |
| 11,189,098 B2 | 11/2021 | Hare et al. |
| 11,195,338 B2 | 12/2021 | Mcphee et al. |
| 11,210,850 B2 | 12/2021 | Goodrich et al. |
| 11,227,442 B1 | 1/2022 | Goodrich et al. |
| 11,232,646 B2 | 1/2022 | Goodrich et al. |
| 11,263,817 B1 | 3/2022 | Goodrich et al. |
| 11,275,252 B2 | 3/2022 | Boriskin et al. |
| 11,308,284 B2 | 4/2022 | Huang et al. |
| 11,443,491 B2 | 9/2022 | Hare et al. |
| 11,501,499 B2 | 11/2022 | Goodrich et al. |
| 11,620,791 B2 | 4/2023 | Goodrich et al. |
| 11,636,657 B2 | 4/2023 | Goodrich et al. |
| 11,704,878 B2 | 7/2023 | Mcphee et al. |
| 11,715,268 B2 | 8/2023 | Hare et al. |
| 11,810,220 B2 | 11/2023 | Goodrich et al. |
| 11,823,341 B2 | 11/2023 | Hare et al. |
| 11,836,859 B2 | 12/2023 | Hare et al. |
| 11,908,093 B2 | 2/2024 | Goodrich et al. |
| 12,175,613 B2 | 12/2024 | Goodrich et al. |
| 2002/0067362 A1 | 6/2002 | Agostino Nocera et al. |
| 2002/0169644 A1 | 11/2002 | Greene |
| 2004/0080467 A1 | 4/2004 | Chinthammit et al. |
| 2004/0113915 A1 | 6/2004 | Ohtsuki et al. |
| 2004/0179038 A1 | 9/2004 | Blattner et al. |
| 2004/0179039 A1 | 9/2004 | Blattner et al. |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0018811 A1 | 1/2007 | Gollu |
| 2007/0096678 A1 | 5/2007 | Melrose |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0215536 A1 | 8/2009 | Yee et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0020083 A1 | 1/2010 | Kumakura et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0194782 A1 | 8/2010 | Gyorfi et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2011/0064388 A1 | 3/2011 | Brown et al. |
| 2011/0093780 A1 | 4/2011 | Dunn |
| 2011/0115798 A1 | 5/2011 | Nayar et al. |
| 2011/0129118 A1 | 6/2011 | Hagbi et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0239136 A1 | 9/2011 | Goldman et al. |
| 2012/0002014 A1 | 1/2012 | Walsh |
| 2012/0092329 A1 | 4/2012 | Koo et al. |
| 2012/0113106 A1 | 5/2012 | Choi et al. |
| 2012/0120186 A1 | 5/2012 | Diaz et al. |
| 2012/0124458 A1 | 5/2012 | Cruzada |
| 2012/0130717 A1 | 5/2012 | Xu et al. |
| 2012/0134588 A1 | 5/2012 | Zhang et al. |
| 2012/0146991 A1 | 6/2012 | Bala et al. |
| 2012/0194549 A1 | 8/2012 | Osterhout et al. |
| 2012/0206558 A1 | 8/2012 | Setton |
| 2012/0209924 A1 | 8/2012 | Evans et al. |
| 2012/0224773 A1 | 9/2012 | Sweet, III et al. |
| 2013/0021373 A1 | 1/2013 | Vaught et al. |
| 2013/0050258 A1 | 2/2013 | Liu et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0223673 A1 | 8/2013 | Davis et al. |
| 2013/0249948 A1 | 9/2013 | Reitan |
| 2013/0257877 A1 | 10/2013 | Davis |
| 2013/0278631 A1 | 10/2013 | Border et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0080560 A1 | 3/2014 | Knutsson |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0267410 A1 | 9/2014 | Fein et al. |
| 2014/0270703 A1 | 9/2014 | Wang et al. |
| 2014/0321702 A1 | 10/2014 | Schmalstieg |
| 2014/0344762 A1 | 11/2014 | Grasset et al. |
| 2014/0351758 A1 | 11/2014 | Yoshida |
| 2015/0023602 A1 | 1/2015 | Wnuk et al. |
| 2015/0098614 A1 | 4/2015 | Gee et al. |
| 2015/0103183 A1 | 4/2015 | Abbott et al. |
| 2015/0206349 A1 | 7/2015 | Rosenthal et al. |
| 2015/0254467 A1 | 9/2015 | Leuthardt et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0301599 A1 | 10/2015 | Miller |
| 2015/0309698 A1 | 10/2015 | Senderek et al. |
| 2015/0366527 A1 | 12/2015 | Yu et al. |
| 2016/0025978 A1 | 1/2016 | Mallinson |
| 2016/0054837 A1 | 2/2016 | Stafford |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0234149 A1 | 8/2016 | Tsuda et al. |
| 2016/0292917 A1 | 10/2016 | Dorner et al. |
| 2016/0330522 A1 | 11/2016 | Newell et al. |
| 2016/0350967 A1 | 12/2016 | Klassen |
| 2016/0360115 A1 | 12/2016 | Rim |
| 2016/0379418 A1 | 12/2016 | Osborn et al. |
| 2017/0038829 A1 | 2/2017 | Lanier et al. |
| 2017/0039986 A1 | 2/2017 | Lanier et al. |
| 2017/0052946 A1* | 2/2017 | Gu .................... G06F 40/274 |
| 2017/0069134 A1 | 3/2017 | Shapira et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0132821 A1 | 5/2017 | Valliani et al. |
| 2017/0178272 A1 | 6/2017 | Lashkari et al. |
| 2017/0199855 A1 | 7/2017 | Fishbeck |

(56) References Cited

U.S. PATENT DOCUMENTS

| | | |
|---|---|---|
| 2017/0221272 A1 | 8/2017 | Li et al. |
| 2017/0229153 A1 | 8/2017 | Moore et al. |
| 2017/0235848 A1 | 8/2017 | Van Deusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082117 A1 | 3/2018 | Sharma et al. |
| 2018/0082430 A1 | 3/2018 | Sharma et al. |
| 2018/0083978 A1 | 3/2018 | Pantazelos |
| 2018/0096507 A1 | 4/2018 | Valdivia et al. |
| 2018/0108179 A1 | 4/2018 | Tomlin et al. |
| 2018/0113587 A1 | 4/2018 | Allen et al. |
| 2018/0114365 A1 | 4/2018 | Egri et al. |
| 2018/0115503 A1 | 4/2018 | Baldwin et al. |
| 2018/0122142 A1 | 5/2018 | Egeler et al. |
| 2018/0143748 A1 | 5/2018 | Ahmed et al. |
| 2018/0143950 A1 | 5/2018 | Al-arnaouti et al. |
| 2018/0152400 A1 | 5/2018 | Chung et al. |
| 2018/0158250 A1 | 6/2018 | Yamamoto et al. |
| 2018/0160194 A1 | 6/2018 | Bayliss et al. |
| 2018/0174366 A1 | 6/2018 | Nishibe et al. |
| 2018/0174600 A1 | 6/2018 | Chaudhuri et al. |
| 2018/0189743 A1 | 7/2018 | Balasubramanian et al. |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1 | 11/2018 | Liu et al. |
| 2018/0335930 A1 | 11/2018 | Scapel et al. |
| 2018/0336714 A1 | 11/2018 | Stoyles et al. |
| 2018/0345129 A1 | 12/2018 | Rathod |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0073834 A1 | 3/2019 | Holzer et al. |
| 2019/0102922 A1 | 4/2019 | Gum |
| 2019/0107991 A1 | 4/2019 | Spivack et al. |
| 2019/0108578 A1 | 4/2019 | Spivack et al. |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0342507 A1 | 11/2019 | Dye et al. |
| 2019/0385378 A1 | 12/2019 | Bastian et al. |
| 2020/0066014 A1 | 2/2020 | Mehta et al. |
| 2020/0066052 A1 | 2/2020 | Antonsen et al. |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0201514 A1 | 6/2020 | Murphy et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0042993 A1 | 2/2021 | Tagra et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0183158 A1 | 6/2021 | Korngold et al. |
| 2021/0241537 A1 | 8/2021 | Ahn |
| 2021/0256773 A1 | 8/2021 | Hare et al. |
| 2021/0264668 A1 | 8/2021 | Goodrich et al. |
| 2022/0036660 A1 | 2/2022 | Mcphee et al. |
| 2022/0044311 A1 | 2/2022 | Ray |
| 2022/0044479 A1 | 2/2022 | Hare et al. |
| 2022/0070385 A1 | 3/2022 | Van Os et al. |
| 2022/0076497 A1 | 3/2022 | Goodrich et al. |
| 2022/0076504 A1 | 3/2022 | Goodrich et al. |
| 2022/0121874 A1 | 4/2022 | Mayes et al. |
| 2022/0148248 A1 | 5/2022 | Mcintyre-kirwin et al. |
| 2022/0148270 A1 | 5/2022 | Goodrich et al. |
| 2022/0375178 A1 | 11/2022 | Hare et al. |
| 2023/0037233 A1 | 2/2023 | Goodrich et al. |
| 2023/0089838 A1 | 3/2023 | Goodrich et al. |
| 2023/0215117 A1 | 7/2023 | Goodrich et al. |
| 2023/0245401 A1 | 8/2023 | Mcphee et al. |
| 2023/0316649 A1 | 10/2023 | Hare et al. |
| 2023/0316683 A1 | 10/2023 | Hare et al. |
| 2024/0029373 A1 | 1/2024 | Goodrich et al. |

FOREIGN PATENT DOCUMENTS

| | | |
|---|---|---|
| CN | 103460256 A | 12/2013 |
| CN | 103530495 A | 1/2014 |
| CN | 104764452 A | 7/2015 |
| CN | 105278826 A | 1/2016 |
| CN | 105607034 A | 5/2016 |
| CN | 106033333 A | 10/2016 |
| CN | 107093204 A | 8/2017 |
| CN | 107209950 A | 9/2017 |
| CN | 107329962 A | 11/2017 |
| CN | 107909638 A | 4/2018 |
| CN | 109118562 A | 1/2019 |
| CN | 109564351 A | 4/2019 |
| CN | 109863510 A | 6/2019 |
| CN | 109863532 A | 6/2019 |
| CN | 110168476 A | 8/2019 |
| CN | 110168478 A | 8/2019 |
| CN | 112639691 A | 4/2021 |
| CN | 113330484 A | 8/2021 |
| CN | 114026831 A | 2/2022 |
| CN | 114080628 A | 2/2022 |
| CN | 108027653 B | 3/2022 |
| CN | 114341780 A | 4/2022 |
| CN | 110168478 B | 1/2023 |
| CN | 115933886 A | 4/2023 |
| EP | 2157545 A1 | 2/2010 |
| EP | 2184092 A2 | 5/2010 |
| EP | 3086292 A1 | 10/2016 |
| EP | 3506213 A1 | 7/2019 |
| JP | 2001230801 A | 8/2001 |
| JP | 5497931 B2 | 3/2014 |
| KR | 20130119473 A | 10/2013 |
| KR | 20140020871 A | 2/2014 |
| KR | 101445263 B1 | 9/2014 |
| KR | 20150013709 A | 2/2015 |
| KR | 20150038272 A | 4/2015 |
| KR | 20150126938 A | 11/2015 |
| KR | 20190075977 A | 7/2019 |
| KR | 102254709 B1 | 5/2021 |
| KR | 102257167 B1 | 5/2021 |
| KR | 102367928 B1 | 3/2022 |
| KR | 102482293 B1 | 12/2022 |
| KR | 102606601 B1 | 11/2023 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-2013017991 A1 | 2/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |

(56) References Cited

FOREIGN PATENT DOCUMENTS

| WO | WO-2016090605 A1 | 6/2016 |
|---|---|---|
| WO | WO-2018081013 A1 | 5/2018 |
| WO | WO-2018081125 A1 | 5/2018 |
| WO | WO-2018102562 A1 | 6/2018 |
| WO | WO-2018128930 | 7/2018 |
| WO | WO-2018129531 | 7/2018 |
| WO | WO-2018129531 A1 | 7/2018 |
| WO | WO-2019089613 A1 | 5/2019 |
| WO | WO-2019129604 A1 | 7/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

"U.S. Appl. No. 15/581,994, Corrected Notice of Allowability mailed Jan. 7, 2020", 2 pgs.
"U.S. Appl. No. 15/581,994, Corrected Notice of Allowability mailed Feb. 18, 2020", 3 pgs.
"U.S. Appl. No. 15/581,994, Final Office Action mailed Dec. 3, 2018", 18 pgs.
"U.S. Appl. No. 15/581,994, Non Final Office Action mailed Jun. 6, 2019", 15 pgs.
"U.S. Appl. No. 15/581,994, Non Final Office Action mailed Jun. 26, 2018", 14 pgs.
"U.S. Appl. No. 15/581,994, Notice of Allowance mailed Nov. 6, 2019", 8 pgs.
"U.S. Appl. No. 15/581,994, Response filed Feb. 26, 2019 to Final Office Action mailed Dec. 3, 2018", 11 pgs.
"U.S. Appl. No. 15/581,994, Response filed Sep. 26, 2018 to Non Final Office Action mailed Jun. 26, 2018", 11 pgs.
"U.S. Appl. No. 15/581,994, Response filed Aug. 19, 2019 to Non-Final Office Action mailed Jun. 6, 2019", 12 pgs.
"U.S. Appl. No. 15/863,575, Non Final Office Action mailed Aug. 9, 2018", 14 pgs.
"U.S. Appl. No. 15/863,575, Notice of Allowance mailed Nov. 15, 2018", 8 pgs.
"U.S. Appl. No. 15/863,575, Response filed Sep. 24, 2018 to Non Final Office Action mailed Aug. 9, 2018", 9 pgs.
"U.S. Appl. No. 16/242,708, Corrected Notice of Allowability mailed Feb. 23, 2021", 2 pgs.
"U.S. Appl. No. 16/242,708, Examiner Interview Summary mailed Jul. 29, 2020", 3 pgs.
"U.S. Appl. No. 16/242,708, Final Office Action mailed Jul. 2, 2020", 25 pgs.
"U.S. Appl. No. 16/242,708, Non Final Office Action mailed Feb. 28, 2020", 19 pgs.
"U.S. Appl. No. 16/242,708, Notice of Allowance mailed Feb. 4, 2021", 7 pgs.
"U.S. Appl. No. 16/242,708, Notice of Allowance mailed Aug. 19, 2020", 5 pgs.
"U.S. Appl. No. 16/242,708, Notice of Allowance mailed Nov. 4, 2020", 7 pgs.
"U.S. Appl. No. 16/242,708, Response filed May 15, 2020 to Non Final Office Action mailed Feb. 28, 2020", 11 pgs.
"U.S. Appl. No. 16/242,708, Response filed Aug. 5, 2020 to Final Office Action mailed Jul. 2, 2020", 11 pgs.
"U.S. Appl. No. 16/283,482, Examiner Interview Summary mailed Feb. 19, 2020", 3 pgs.
"U.S. Appl. No. 16/283,482, Final Office Action mailed Dec. 16, 2019", 15 pgs.
"U.S. Appl. No. 16/283,482, Non Final Office Action mailed Jun. 26, 2019", 13 pgs.
"U.S. Appl. No. 16/283,482, Notice of Allowance mailed Apr. 2, 2020", 9 pgs.
"U.S. Appl. No. 16/283,482, Response filed Mar. 9, 2020 to Final Office Action mailed Dec. 16, 2019", 11 pgs.
"U.S. Appl. No. 16/283,482, Response filed Sep. 26, 2019 to Non Final Office Action mailed Jun. 26, 2019", 13 pgs.
"U.S. Appl. No. 16/457,461, Corrected Notice of Allowability mailed Feb. 26, 2021", 2 pgs.
"U.S. Appl. No. 16/457,461, Examiner Interview Summary mailed Jul. 10, 2020", 3 pgs.
"U.S. Appl. No. 16/457,461, Final Office Action mailed Jul. 14, 2020", 16 pgs.
"U.S. Appl. No. 16/457,461, Non Final Office Action mailed Apr. 16, 2020", 13 pgs.
"U.S. Appl. No. 16/457,461, Notice of Allowance mailed Apr. 14, 2021", 7 pgs.
"U.S. Appl. No. 16/457,461, Notice of Allowance mailed Jul. 28, 2021", 5 pgs.
"U.S. Appl. No. 16/457,461, Notice of Allowance mailed Sep. 2, 2020", 7 pgs.
"U.S. Appl. No. 16/457,461, Notice of Allowance mailed Nov. 19, 2020", 8 pgs.
"U.S. Appl. No. 16/457,461, Response filed Jul. 1, 2020 to Non Final Office Action mailed Apr. 16, 2020", 9 pgs.
"U.S. Appl. No. 16/457,461, Response filed Aug. 20, 2020 to Final Office Action mailed Jul. 14, 2020", 8 pgs.
"U.S. Appl. No. 16/460,519, Advisory Action mailed Mar. 9, 2021", 4 pgs.
"U.S. Appl. No. 16/460,519, Final Office Action mailed Jan. 6, 2021", 33 pgs.
"U.S. Appl. No. 16/460,519, Non Final Office Action mailed Mar. 17, 2021", 37 pgs.
"U.S. Appl. No. 16/460,519, Non Final Office Action mailed Sep. 4, 2020", 27 pgs.
"U.S. Appl. No. 16/460,519, Notice of Allowance mailed Jul. 12, 2021", 5 pgs.
"U.S. Appl. No. 16/460,519, Response filed Feb. 23, 2021 to Final Office Action mailed Jan. 6, 2021", 10 pgs.
"U.S. Appl. No. 16/460,519, Response filed Jun. 15, 2021 to Non Final Office Action mailed Mar. 17, 2021", 10 pgs.
"U.S. Appl. No. 16/460,519, Response filed Dec. 2, 2020 to Non Final Office Action mailed Sep. 4, 2020", 10 pgs.
"U.S. Appl. No. 16/696,600, 312 Amendment filed Jul. 7, 2021", 7 pgs.
"U.S. Appl. No. 16/696,600, Corrected Notice of Allowability mailed May 12, 2021", 2 pgs.
"U.S. Appl. No. 16/696,600, Corrected Notice of Allowability mailed Jul. 21, 2021", 3 pgs.
"U.S. Appl. No. 16/696,600, Corrected Notice of Allowability mailed Sep. 8, 2021", 2 pgs.
"U.S. Appl. No. 16/696,600, Non Final Office Action mailed Sep. 15, 2020", 20 pgs.
"U.S. Appl. No. 16/696,600, Notice of Allowability mailed Jan. 26, 2021", 2 pgs.
"U.S. Appl. No. 16/696,600, Notice of Allowance mailed May 4, 2021", 9 pgs.
"U.S. Appl. No. 16/696,600, Notice of Allowance mailed Aug. 17, 2021", 8 pgs.
"U.S. Appl. No. 16/696,600, Notice of Allowance mailed Dec. 18, 2020", 11 pgs.
"U.S. Appl. No. 16/696,600, Response filed Oct. 30, 2020 to Non Final Office Action mailed Sep. 15, 2020", 8 pgs.
"U.S. Appl. No. 16/721,418, Final Office Action mailed Aug. 4, 2021", 31 pgs.
"U.S. Appl. No. 16/721,418, Non Final Office Action mailed Apr. 29, 2021", 28 pgs.
"U.S. Appl. No. 16/721,418, Notice of Allowance mailed Oct. 21, 2021", 8 pgs.
"U.S. Appl. No. 16/721,418, Response filed Jul. 28, 2021 to Non Final Office Action mailed Apr. 29, 2021", 11 pgs.
"U.S. Appl. No. 16/721,418, Response filed Oct. 4, 2021 to Final Office Action mailed Aug. 4, 2021", 12 pgs.
"U.S. Appl. No. 16/721,459, Non Final Office Action mailed Apr. 15, 2021", 17 pgs.

(56) References Cited

OTHER PUBLICATIONS

"U.S. Appl. No. 16/721,459, Notice of Allowability mailed Dec. 17, 2021", 6 pgs.
"U.S. Appl. No. 16/721,459, Notice of Allowance mailed Aug. 19, 2021", 10 pgs.
"U.S. Appl. No. 16/721,459, Response filed Jul. 6, 2021 to Non Final Office Action mailed Apr. 15, 2021", 10 pgs.
"U.S. Appl. No. 16/723,540, Amendment Under 37 C.F.R. 1.312 Filed Sep. 20, 2022", 8 pgs.
"U.S. Appl. No. 16/723,540, Examiner Interview Summary mailed Jun. 16, 2021", 2 pgs.
"U.S. Appl. No. 16/723,540, Final Office Action mailed Sep. 27, 2021", 18 pgs.
"U.S. Appl. No. 16/723,540, Non Final Office Action mailed Jan. 26, 2022", 19 pgs.
"U.S. Appl. No. 16/723,540, Non Final Office Action mailed Mar. 18, 2021", 15 pgs.
"U.S. Appl. No. 16/723,540, Notice of Allowance mailed Jun. 29, 2022", 5 pgs.
"U.S. Appl. No. 16/723,540, PTO Response to Rule 312 Communication mailed Sep. 29, 2022", 2 pgs.
"U.S. Appl. No. 16/723,540, Response filed Apr. 26, 2022 to Non Final Office Action mailed Jan. 26, 2022", 10 pgs.
"U.S. Appl. No. 16/723,540, Response filed Jun. 16, 2021 to Non Final Office Action mailed Mar. 18, 2021", 10 pgs.
"U.S. Appl. No. 16/723,540, Response filed Dec. 23, 2021 to Final Office Action mailed Sep. 27, 2021", 10 pgs.
"U.S. Appl. No. 16/723,540, Supplemental Notice of Allowability mailed Aug. 15, 2022", 8 pgs.
"U.S. Appl. No. 16/723,540, Supplemental Notice of Allowability mailed Sep. 29, 2022", 2 pgs.
"U.S. Appl. No. 16/747,318, 312 Amendment filed Nov. 5, 2021", 7 pgs.
"U.S. Appl. No. 16/747,318, Corrected Notice of Allowability mailed Dec. 22, 2021", 2 pgs.
"U.S. Appl. No. 16/747,318, Examiner Interview Summary mailed Mar. 12, 2021", 2 pgs.
"U.S. Appl. No. 16/747,318, Final Office Action mailed May 12, 2021", 14 pgs.
"U.S. Appl. No. 16/747,318, Non Final Office Action mailed Dec. 15, 2020", 11 pgs.
"U.S. Appl. No. 16/747,318, Notice of Allowance mailed Sep. 9, 2021", 6 pgs.
"U.S. Appl. No. 16/747,318, PTO Response to Rule 312 Communication mailed Nov. 23, 2021", 3 pgs.
"U.S. Appl. No. 16/747,318, Response filed Mar. 15, 2021 to Non Final Office Action mailed Dec. 15, 2020", 11 pgs.
"U.S. Appl. No. 16/747,318, Response filed Aug. 12, 2021 to Final Office Action mailed May 12, 2021", 11 pgs.
"U.S. Appl. No. 16/790,322, 312 Amendment filed Oct. 12, 2022", 8 pgs.
"U.S. Appl. No. 16/790,322, Corrected Notice of Allowability mailed Feb. 15, 2022", 2 pgs.
"U.S. Appl. No. 16/790,322, Examiner Interview Summary mailed Jun. 14, 2021", 2 pgs.
"U.S. Appl. No. 16/790,322, Final Office Action mailed May 3, 2021", 22 pgs.
"U.S. Appl. No. 16/790,322, Non Final Office Action mailed Nov. 25, 2020", 21 pgs.
"U.S. Appl. No. 16/790,322, Notice of Allowance mailed Jul. 27, 2022", 8 pgs.
"U.S. Appl. No. 16/790,322, Notice of Allowance mailed Aug. 31, 2022", 8 pgs.
"U.S. Appl. No. 16/790,322, Notice of Allowance mailed Nov. 29, 2021", 8 pgs.
"U.S. Appl. No. 16/790,322, Response filed Feb. 25, 2021 to Non Final Office Action mailed Nov. 25, 2020", 9 pgs.
"U.S. Appl. No. 16/790,322, Response filed Aug. 2, 2021 to Final Office Action mailed May 3, 2021", 10 pgs.
"U.S. Appl. No. 16/922,618, Non Final Office Action mailed Apr. 27, 2021", 9 pgs.
"U.S. Appl. No. 16/922,618, Notice of Allowance mailed Aug. 4, 2021", 9 pgs.
"U.S. Appl. No. 16/922,618, Response filed Jun. 17, 2021 to Non Final Office Action mailed Apr. 27, 2021", 7 pgs.
"U.S. Appl. No. 17/249,092, Notice of Allowability mailed Aug. 12, 2022", 2 pgs.
"U.S. Appl. No. 17/249,092, Notice of Allowance mailed May 4, 2022", 12 pgs.
"U.S. Appl. No. 17/307,354, Advisory Action mailed Feb. 21, 2023", 3 pgs.
"U.S. Appl. No. 17/307,354, Final Office Action mailed Dec. 29, 2022", 30 pgs.
"U.S. Appl. No. 17/307,354, Non Final Office Action mailed Jun. 24, 2022", 29 pgs.
"U.S. Appl. No. 17/307,354, Notice of Allowance mailed Mar. 10, 2023", 7 pgs.
"U.S. Appl. No. 17/307,354, Response filed Feb. 9, 2023 to Final Office Action mailed Dec. 29, 2022", 13 pgs.
"U.S. Appl. No. 17/307,354, Response filed Sep. 20, 2022 to Non Final Office Action mailed Jun. 24, 2022", 13 pgs.
"U.S. Appl. No. 17/319,399, Corrected Notice of Allowability mailed Jan. 11, 2023", 2 pgs.
"U.S. Appl. No. 17/319,399, Corrected Notice of Allowability mailed Feb. 27, 2023", 2 pgs.
"U.S. Appl. No. 17/319,399, Non Final Office Action mailed Apr. 22, 2022", 8 pgs.
"U.S. Appl. No. 17/319,399, Notice of Allowance mailed Aug. 25, 2022", 9 pgs.
"U.S. Appl. No. 17/319,399, Response filed Jul. 21, 2022 to Non Final Office Action mailed Apr. 22, 2022", 8 pgs.
"U.S. Appl. No. 17/505,370, Non Final Office Action mailed Oct. 17, 2022", 16 pgs.
"U.S. Appl. No. 17/505,370, Notice of Allowance mailed Jan. 13, 2023", 8 pgs.
"U.S. Appl. No. 17/505,370, Response filed Dec. 21, 2022 to Non Final Office Action mailed Oct. 17, 2022", 8 pgs.
"U.S. Appl. No. 17/506,478, Final Office Action mailed Dec. 16, 2022", 36 pgs.
"U.S. Appl. No. 17/506,478, Non Final Office Action mailed Sep. 2, 2022", 34 pgs.
"U.S. Appl. No. 17/506,478, Notice of Allowance mailed Feb. 24, 2023", 13 pgs.
"U.S. Appl. No. 17/506,478, Response filed Feb. 13, 2023 to Final Office Action mailed Dec. 16, 2022", 10 pgs.
"U.S. Appl. No. 17/506,478, Response filed Nov. 17, 2022 to Non Final Office Action mailed Sep. 2, 2022", 9 pgs.
"U.S. Appl. No. 17/527,376, Examiner Interview Summary mailed Jun. 1, 2023", 2 pgs.
"U.S. Appl. No. 17/527,376, Final Office Action mailed Mar. 1, 2023", 21 pgs.
"U.S. Appl. No. 17/527,376, Non Final Office Action mailed Jul. 5, 2023", 20 pgs.
"U.S. Appl. No. 17/527,376, Non Final Office Action mailed Nov. 10, 2022", 20 pgs.
"U.S. Appl. No. 17/527,376, Response filed Feb. 10, 2023 to Non Final Office Action mailed Nov. 10, 2022", 12 pgs.
"U.S. Appl. No. 17/527,376, Response filed May 30, 2023 to Final Office Action mailed Mar. 1, 2023", 12 pgs.
"U.S. Appl. No. 17/527,376, Response filed Oct. 5, 2023 to Non Final Office Action mailed Jul. 5, 2023", 12 pgs.
"U.S. Appl. No. 17/528,697, Non Final Office Action mailed Sep. 15, 2022", 12 pgs.
"U.S. Appl. No. 17/528,697, Notice of Allowance mailed Jan. 11, 2023", 10 pgs.
"U.S. Appl. No. 17/528,697, Response filed Dec. 2, 2022 to Non Final Office Action mailed Sep. 15, 2022", 8 pgs.
"U.S. Appl. No. 17/581,093, Notice of Allowance mailed Jul. 6, 2023", 9 pgs.
"U.S. Appl. No. 18/121,893, Non Final Office Action mailed Jul. 20, 2023", 15 pgs.

(56) References Cited

OTHER PUBLICATIONS

"U.S. Appl. No. 18/121,893, Notice of Allowability mailed Oct. 25, 2023", 2 pgs.
"U.S. Appl. No. 18/121,893, Notice of Allowance mailed Oct. 13, 2023", 10 pgs.
"U.S. Appl. No. 18/121,893, Response filed Sep. 13, 2023 to Non Final Office Action mailed Jul. 20, 2023", 8 pgs.
"Chinese Application Serial No. 201880006129.X, Response to Examiner Telephone Interview filed Sep. 22, 2022", With English machine translation, 102 pgs.
"Chinese Application Serial No. 201880006129, Response filed Aug. 29, 2022 to Office Action mailed Jun. 17, 2022", w/ English Claims, 14 pgs.
"Chinese Application Serial No. 201880006129.X, Office Action mailed Jan. 5, 2022", w/ English translation, 18 pgs.
"Chinese Application Serial No. 201880006129.X, Office Action mailed Jun. 17, 2022", w/ English translation, 13 pgs.
"Chinese Application Serial No. 201880006129.X, Response filed Apr. 20, 2022 to Office Action mailed Jan. 5, 2022", 10 pgs.
"Chinese Application Serial No. 202080047024.6, Office Action mailed Nov. 30, 2022", w/ English Translation, 16 pgs.
"European Application Serial No. 17835983.2, Response to Communication Pursuant to Rules 161(1) and 162 EPC filed Feb. 19, 2020", 11 pgs.
"European Application Serial No. 18713732.8, Response to Communication Pursuant to Rules 161(1) and 162 EPC filed Feb. 19, 2020", 25 pgs.
"European Application Serial No. 20775562.0, Response to Communication pursuant to Rules 161 and 162 filed Sep. 27, 2022", 23 pgs.
"European Application Serial No. 17835983.2, Communication Pursuant to Article 94(3) EPC mailed Aug. 24, 2021", 7 pgs.
"European Application Serial No. 17865596.5, Communication Pursuant to Article 94(3) EPC mailed Sep. 23, 2021", 6 pgs.
"European Application Serial No. 17865596.5, Extended European Search Report mailed Sep. 13, 2019", 11 pgs.
"European Application Serial No. 17865596.5, Response filed Apr. 9, 2020 to Extended European Search Report mailed Sep. 13, 2019", 21 pgs.
"European Application Serial No. 19769288.2, Response filed Sep. 29, 2021 to Communication Pursuant to Rules 161(1) and 162 EPC mailed Apr. 8, 2021", 24 pgs.
"European Application Serial No. 19845741.8, Response filed Feb. 3, 2022 to Communication Pursuant to Rules 161 and 162 EPC mailed Jul. 27, 2021", 19 pgs.
"European Application Serial No. 21153993.7, Extended European Search Report mailed May 12, 2021", 9 pgs.
"International Application Serial No. PCT/US2017/058093, International Preliminary Report on Patentability mailed May 9, 2019", 6 pgs.
"International Application Serial No. PCT/US2017/058093, International Search Report mailed Jan. 4, 2018", 2 pgs.
"International Application Serial No. PCT/US2017/058093, Written Opinion mailed Jan. 4, 2018", 4 pgs.
"International Application Serial No. PCT/US2017/068988, International Preliminary Report on Patentability mailed Jul. 18, 2018", 8 pgs.
"International Application Serial No. PCT/US2017/068988, International Search Report mailed Apr. 5, 2018", 3 pgs.
"International Application Serial No. PCT/US2017/068988, Written Opinion mailed Apr. 5, 2018", 6 pgs.
"International Application Serial No. PCT/US2018/012967, International Preliminary Report on Patentability mailed Jul. 18, 2019", 8 pgs.
"International Application Serial No. PCT/US2018/012967, International Search Report mailed May 15, 2018", 5 pgs.
"International Application Serial No. PCT/US2018/012967, Written Opinion mailed May 15, 2018", 6 pgs.
"International Application Serial No. PCT/US2019/048597, International Preliminary Report on Patentability mailed Mar. 11, 2021", 10 pgs.
"International Application Serial No. PCT/US2019/048597, International Search Report mailed Dec. 2, 2019", 5 pgs.
"International Application Serial No. PCT/US2019/048597, Written Opinion mailed Dec. 2, 2019", 8 pgs.
"International Application Serial No. PCT/US2019/068007, International Preliminary Report on Patentability mailed Jul. 1, 2021", 17 pgs.
"International Application Serial No. PCT/US2019/068007, International Search Report mailed Apr. 30, 2020", 10 pgs.
"International Application Serial No. PCT/US2019/068007, Invitation to Pay Additional Fees mailed Mar. 11, 2020", 18 pgs.
"International Application Serial No. PCT/US2019/068007, Written Opinion mailed Apr. 30, 2020", 15 pgs.
"International Application Serial No. PCT/US2020/070158, International Preliminary Report on Patentability mailed Jan. 6, 2022", 14 pgs.
"International Application Serial No. PCT/US2020/070158, International Search Report mailed Dec. 17, 2020", 5 pgs.
"International Application Serial No. PCT/US2020/070158, Invitation to Pay Additional Fees mailed Oct. 1, 2020", 12 pgs.
"International Application Serial No. PCT/US2020/070158, Written Opinion mailed Dec. 17, 2020", 12 pgs.
"International Application Serial No. PCT/US2020/070230, International Preliminary Report on Patentability mailed Jan. 13, 2022", 16 pgs.
"International Application Serial No. PCT/US2020/070230, International Search Report mailed Nov. 5, 2020", 7 pgs.
"International Application Serial No. PCT/US2020/070230, Invitation to Pay Additional Fees mailed Sep. 15, 2020", 16 pgs.
"International Application Serial No. PCT/US2020/070230, Written Opinion mailed Nov. 5, 2020", 14 pgs.
"International Application Serial No. PCT/US2020/070503, International Preliminary Report on Patentability mailed Mar. 17, 2022", 9 pgs.
"International Application Serial No. PCT/US2020/070503, International Search Report mailed Dec. 2, 2020", 5 pgs.
"International Application Serial No. PCT/US2020/070503, Written Opinion mailed Dec. 2, 2020", 7 pgs.
"Korean Application Serial No. 10-2019-7014554, Final Office Action mailed May 25, 2021", w/ English Translation, 6 pgs.
"Korean Application Serial No. 10-2019-7014554, Notice of Preliminary Rejection mailed Nov. 27, 2020", w/ English Translation, 7 pgs.
"Korean Application Serial No. 10-2019-7014554, Response filed Jun. 25, 2021 to Final Office Action mailed May 25, 2021", w/ English Translation of Claims, 18 pgs.
"Korean Application Serial No. 10-2019-7014554, Response filed Jan. 27, 2021 to Notice of Preliminary Rejection mailed Nov. 27, 2020", w/ English Translation of Claims, 18 pgs.
"Korean Application Serial No. 10-2019-7023098, Notice of Preliminary Rejection mailed Oct. 8, 2020", w/ English translation, 15 pgs.
"Korean Application Serial No. 10-2019-7023098, Response filed Jan. 8, 2021 to Notice of Preliminary Rejection mailed Oct. 8, 2020", w/ English Claims, 19 pgs.
"Korean Application Serial No. 10-2021-7014739, Notice of Preliminary Rejection mailed May 29, 2021", w/ English translation, 9 pgs.
"Korean Application Serial No. 10-2021-7014739, Response filed Aug. 10, 2021 to Notice of Preliminary Rejection mailed May 29, 2021", w/ English claims, 17 pgs.
"Korean Application Serial No. 10-2021-7015384, Notice of Preliminary Rejection mailed Jun. 11, 2021", w/ English translation, 13 pgs.
"Korean Application Serial No. 10-2021-7015384, Response filed Oct. 7, 2021 to Notice of Preliminary Rejection mailed Jun. 11, 2021", w/ English Claims, 17 pgs.
"Korean Application Serial No. 10-2022-7005953, Notice of Preliminary Rejection mailed Apr. 4, 2022", w/ English Translation, 13 pgs.

(56) References Cited

OTHER PUBLICATIONS

"Korean Application Serial No. 10-2022-7005953, Response filed Aug. 3, 2022 to Office Action mailed Apr. 4, 2022", w/ English Claims, 20 pgs.

"Mirror my texture", C4dcafe, [Online] Retrieved from the Internet: <URL: https://www.c4dcafe.com/ipb/forums/topic/95957-mirror-my-texture/)>, (2016), 3 pgs.

"Mobile Keyboard", Unity User Manual, Website, historical copy retrieved from web archive: <https://web.archive.org/web/20181204043559/https://docs.unity3d.com/Manual/MobileKeyboard.html> on Apr. 20, 2021, (Dec. 4, 2018), 5 pgs.

Besancon, Lonni, "A Tangible Volume for Portable 3D Interaction", Youtube, [Online] Retrieved from the Internet: <URL: https://www.youtube.com/watch?v=LP7GG6t2j-g>, [Accessed May 28, 2021], (Sep. 28, 2016), 4 pgs.

Bikos, Marios, "Diploma Thesis(AR-Chess)—Gameplay (Virtual Object Manipulation)", Youtube, [Online] Retrieved from the Internet: <URL: https://www.youtube.com/watch?v=lpb3xHwgLfU>, [Accessed May 28, 2021], (Jul. 3, 2015), 2 pgs.

Deepu, R, et al., "3D Reconstruction from Single 2D Image", International Journal of Latest Research in Engineering and Technology (IJLRET), 2(1), (Jan. 2016), 42-51.

Fuccella, Vittorio, et al., "Gestures and Widgets: Performance in Text Editing on Multi-Touch Capable Mobile Devices", ACM, CHI '13: Proceedings of the SIGCHI Conference on Human Factors in Computing Systems, (Apr. 2013), 2785-2794.

Giaccone, P R, et al., "Foreground-background segmentation by cellular neural networks", IEEE 15th International Conference on Pattern Recognition (ICPR-2000), vol. 2, (2000), 438-441.

Kawai, Norihiko, et al., "Diminished Reality Based on Image Inpainting Considering Background Geometry", IEEE transactions on visualization and computer graphics, 22(3), (Mar. 1, 2016), 1236-1247.

Keeler, Alice, "Google Slides: Make a Draggable Stack", Teacher Tech with Alice Keeler, [Online] Retrieved from the Internet: <URL: https://alicekeeler.com/2017/04/10/google-slides-make-draggable-stack/>, (2017), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Long, et al., "Context-Aware Mixed Reality: A Framework for Ubiquitous Interaction", arXiv:1803.05541v1, Cornell University Library, Ithaca, NY, (Mar. 14, 2018), 11 pgs.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Park, Jong-Seung, et al., "Virtual Object Placement in Video for Augmented Reality", Advances in Multimedia Information Processing-PCM 2005: 6th Pacific Rim Conference on Multimedia, Jeju Island, KR, Proceedings (vol. 3767). Springer, Berlin, DE, (2005), 13-24.

Park, Jungsik, et al., "[Poster] Interactive deformation of real objects", 2014 IEEE International Symposium on Mixed and Augmented Reality (ISMAR), (Sep. 10, 2014), 295-296.

Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.

Ranganathan, Parthasarathy, et al., "Energy-Aware User Interfaces and Energy-Adaptive Displays", IEEE, Computer, vol. 39, Issue 3, (Mar. 20, 2006), 31-38.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Jan. 1, 2014), 8 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

Wang, Nanyang, et al., "Pixel2mesh: Generating 3d mesh models from single rgb images", Proceedings of the European Conference on Computer Vision (ECCV); arXIv:1804.01654v2 [cs.CV], (2018), 16 pgs.

Ward, Caleb, "5 Creative Ways to Use Layer Stacking in After Effects", RocketStock Blog, [Online] Retrieved from the Internet: <URL: https://www.rocketstock.com/blog/5-creative-ways-use-layer-stacking-effects/>, (2015), 9 pgs.

Yang, Jie, et al., "A Real-Time Face Tracker", Proceedings of the 3rd IEEE Workshop on Applications of Computer Vision (WACV'96), (Dec. 4, 1996), 142-147.

You, Suya, et al., "Hybrid Inertial and Vision Tracking for Augmented Reality Registration", Proceedings IEEE Virtual Reality (Cat. No. 99CB36316), (1999), 8 pgs.

"U.S. Appl. No. 17/307,354, Corrected Notice of Allowability mailed Mar. 24, 2023", 2 pgs.

"U.S. Appl. No. 17/505,370, Notice of Allowability mailed Jun. 1, 2023", 2 pgs.

"U.S. Appl. No. 17/506,478, Notice of Allowance mailed Aug. 2, 2023", 9 pgs.

"U.S. Appl. No. 17/527,376, Advisory Action mailed Nov. 20, 2024", 4 pgs.

"U.S. Appl. No. 17/527,376, Examiner Interview Summary mailed Feb. 26, 2024", 2 pgs.

"U.S. Appl. No. 17/527,376, Examiner Interview Summary mailed Jul. 29, 2024", 2 pgs.

"U.S. Appl. No. 17/527,376, Examiner Interview Summary mailed Aug. 23, 2024", 2 pgs.

"U.S. Appl. No. 17/527,376, Final Office Action mailed Aug. 8, 2024", 23 pgs.

"U.S. Appl. No. 17/527,376, Final Office Action mailed Oct. 30, 2023", 20 pgs.

"U.S. Appl. No. 17/527,376, Non Final Office Action mailed Apr. 26, 2024", 22 pgs.

"U.S. Appl. No. 17/527,376, Non Final Office Action mailed Dec. 19, 2024", 7 pgs.

"U.S. Appl. No. 17/527,376, Response filed Feb. 28, 2024 to Final Office Action mailed Oct. 30, 2023", 9 pgs.

"U.S. Appl. No. 17/527,376, Response filed Jul. 26, 2024 to Non Final Office Action mailed Apr. 26, 2024", 10 pgs.

"U.S. Appl. No. 17/527,376, Response filed Oct. 3, 2024 to Final Office Action mailed Aug. 8, 2024", 11 pgs.

"U.S. Appl. No. 17/817,491, Non Final Office Action mailed May 10, 2023", 15 pgs.

"U.S. Appl. No. 17/817,491, Notice of Allowance mailed Jul. 20, 2023", 7 pgs.

"U.S. Appl. No. 17/817,491, Response filed Jun. 30, 2023 to Non Final Office Action mailed May 10, 2023", 9 pgs.

"U.S. Appl. No. 18/073,280 , Response filed Mar. 20, 2024 to Non Final Office Action mailed Dec. 22, 2023", 10 pgs.

"U.S. Appl. No. 18/073,280, Corrected Notice of Allowability mailed Jun. 6, 2024", 2 pgs.

"U.S. Appl. No. 18/073,280, Corrected Notice of Allowability mailed Aug. 14, 2024", 2 pgs.

"U.S. Appl. No. 18/073,280, Examiner Interview Summary mailed Mar. 11, 2024", 2 pgs.

"U.S. Appl. No. 18/073,280, Non Final Office Action mailed Dec. 22, 2023", 23 pgs.

"U.S. Appl. No. 18/073,280, Notice of Allowance mailed May 24, 2024", 8 pgs.

(56) References Cited

OTHER PUBLICATIONS

"U.S. Appl. No. 18/132,940, Non Final Office Action mailed Nov. 22, 2023", 37 pgs.
"U.S. Appl. No. 18/195,012, Non Final Office Action mailed Jan. 9, 2024", 16 pgs.
"U.S. Appl. No. 18/375,693, Corrected Notice of Allowability mailed Sep. 3, 2024", 2 pgs.
"U.S. Appl. No. 18/375,693, Examiner Interview Summary mailed Aug. 2, 2024", 2 pgs.
"U.S. Appl. No. 18/375,693, Non Final Office Action mailed May 15, 2024", 26 pgs.
"U.S. Appl. No. 18/375,693, Notice of Allowance mailed Aug. 20, 2024", 8 pgs.
"U.S. Appl. No. 18/375,693, Response filed Aug. 5, 2024 to Non Final Office Action mailed May 15, 2024", 11 pgs.
"U.S. Appl. No. 18/763,468, Non Final Office Action mailed Feb. 20, 2025", 15 pgs.
"Chinese Application Serial No. 201980056286.6, Office Action mailed Oct. 12, 2023", w/ English Translation, 12 pgs.
"Chinese Application Serial No. 202080047024.6, Office Action mailed Jun. 29, 2023", w/ English translation, 18 pgs.
"Chinese Application Serial No. 202080047024.6, Office Action mailed Oct. 7, 2023", W/English Translation, 8 pgs.
"Chinese Application Serial No. 202080047024.6, Response Filed Dec. 22, 2023 to Office Action mailed Oct. 7, 2023", w/ English Claims, 50 pgs.
"Chinese Application Serial No. 202080062445.6, Office Action mailed Oct. 18, 2024", W/English Translation, 18 pgs.
"Chinese Application Serial No. 202080062445.6, Response filed Feb. 8, 2025 to Office Action mailed Oct. 18, 2024", W/ English Claims, 14 pgs.
"European Application Serial No. 20751041.3, Response Filed Aug. 10, 2022 to Communication pursuant to Rules 161(1) and 162 EPC mailed Feb. 9, 2022", 27 pgs.
"European Application Serial No. 20775562.0, Communication Pursuant to Article 94(3) EPC mailed Feb. 6, 2024", 7 pgs.
"European Application Serial No. 23153345.6, Extended European Search Report mailed May 8, 2023", 9 pgs.
"European Application Serial No. 23153345.6, Response filed Nov. 14, 2023 to Extended European Search Report mailed May 8, 2023", 15 pgs.
"European Application Serial No. 23160064.4, Extended European Search Report mailed Jun. 22, 2023", 7 pgs.
"Korean Application Serial No. 10-2021-7008906, Notice of Preliminary Rejection mailed Jun. 20, 2023", w/ English translation, 9 pgs.
"Korean Application Serial No. 10-2022-7010928, Notice of Preliminary Rejection mailed Nov. 8, 2024", w/ English Translation, 13 pgs.
"Korean Application Serial No. 10-2022-7010928, Response Filed Jan. 8, 2025 to Notice of Preliminary Rejection mailed Nov. 8, 2024", w/ English Claims, 22 pgs.
"Korean Application Serial No. 10-2022-7045427, Notice of Preliminary Rejection mailed Mar. 13, 2023", w/ English Translation, 15 pgs.
Singh, Gurjinder, et al., "Ubiquitous hybrid tracking techniques for augmented reality applications", IEEE 2nd International Conference on Recent Advances in Engineering & Computational Sciences, (Dec. 21, 2015), 1-5.

\* cited by examiner

3D CAPTIONS WITH SEMANTIC GRAPHICAL ELEMENTS

PRIORITY CLAIM

This application is a continuation of and claims the benefit of priority of U.S. patent application Ser. No. 18/121,893, filed Mar. 15, 2023, which is a continuation of and claims the benefit of priority of U.S. patent application Ser. No. 17/528,697, filed Nov. 17, 2021, which is a continuation of and claims the benefit of priority of U.S. patent application Ser. No. 16/721,459, filed Dec. 19, 2019, which are hereby incorporated by reference in their entireties.

TECHNICAL FIELD

The present disclosure relates generally to visual presentations and more particularly to rendering virtual objects within a real-world environment captured in a camera feed of a computing device.

BACKGROUND

Augmented reality (AR) refers to supplementing the view of real-world objects and environments with computer-generated graphics content. Virtual rendering systems can be used to create, view, and interact with engaging and entertaining AR experiences, in which 3D virtual object graphics content appears to be present in the real world. Virtual rendering systems are frequently implemented within mobile devices such as smartphones and tablets.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
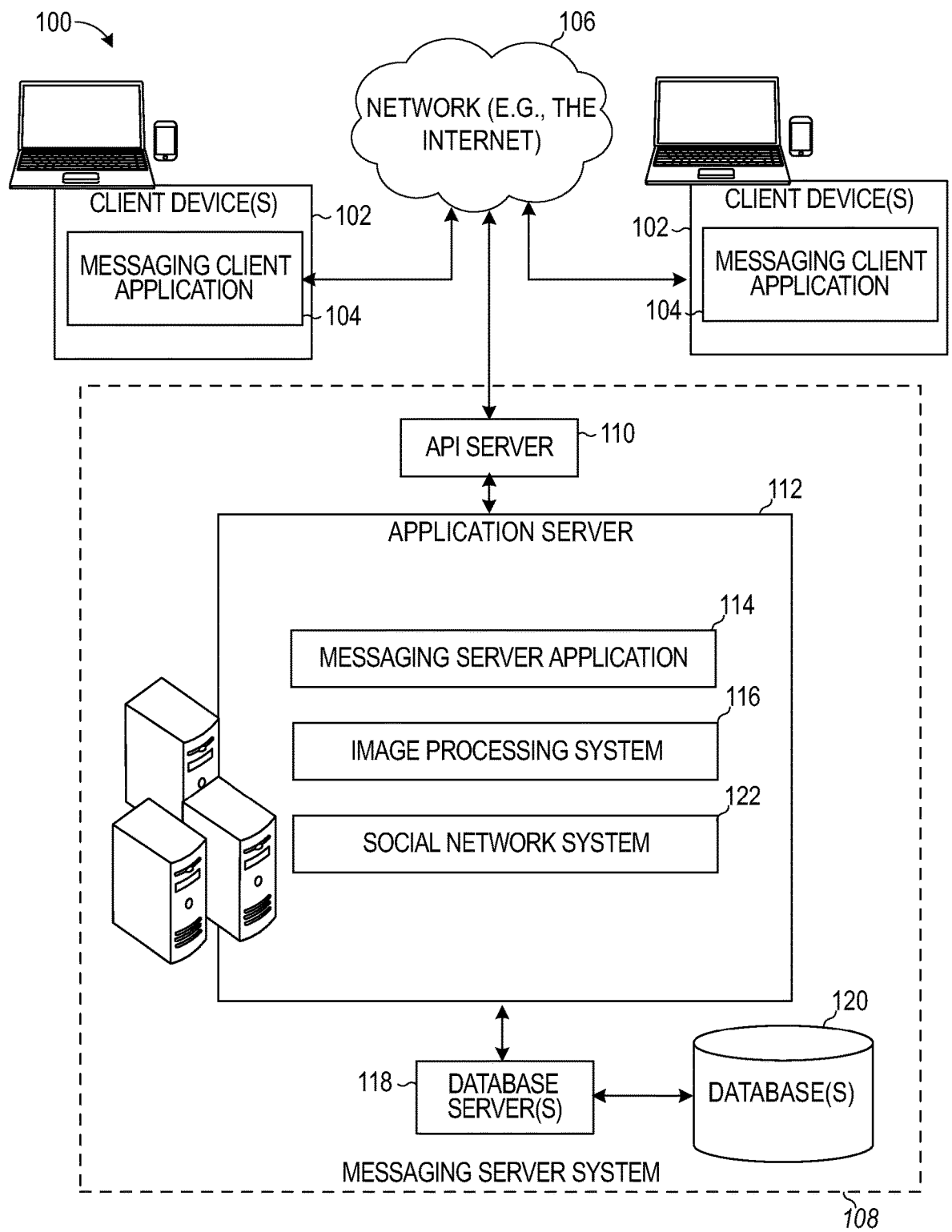
FIG. 1 is a block diagram showing a messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Traditional virtual rendering systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world. For example, a virtual rendering system may not present virtual objects in a consistent manner with respect to real-world items as a user moves about through the real world.

Additionally, conventional virtual rendering systems are often lacking in functionality related to authoring AR content because these conventional systems are not optimized for the limited display size of mobile computing devices. As an example, conventional virtual rendering systems are often limited to predefined 3D virtual objects and do not provide users with the ability to create or edit these virtual objects. As another example, user interfaces of conventional virtual rendering systems often require users to navigate between various views or windows to access certain content-authoring functions. These systems usually provide buttons or other interactive elements to facilitate navigation between views and windows, but the buttons and other interactive elements often utilize much of the available display space, which may obscure AR content being authored or require a user to navigate to yet another window or view to inspect the AR content being authored. As a result, the AR content authoring process provided by conventional virtual rendering systems may be a time-consuming and tedious process that requires users to repeatedly shuffle through various views and windows to ultimately produce content that may not meet the user's expectations.

Aspects of the present disclosure include systems, methods, techniques, instruction sequences, and computing machine program products for creating virtual three-dimensional (3D) objects, such as a 3D caption, and rendering the virtual 3D objects within a camera feed, as if they exist in real-world environments. For example, media overlays of 3D captions can be generated by the system and displayed in conjunction with real-world environment content (e.g., images and/or video) generated by an image-capturing device (e.g., a digital camera). 3D captions include one or more text characters (e.g., letters, symbols, and/or emojis). Users may use the 3D captioning functionality described herein to augment image data (e.g., images and/or video) to describe, comment on, or provide additional meaning or context to the real-world environment content. The system includes user interfaces to automatically add 3D captions to an image or video based on context, such as time of day, day of the week, location, and/or one or more words input by a user. The system includes user interfaces to automatically augment the 3D captions a user inputs with one or more graphical elements, such as emojis, that represent the content of the 3D caption.

In these ways, these user interfaces improve upon interfaces of prior systems and improve the operation of a device by providing greater functionality and enhanced mechanisms for interaction such as by providing a preview of 3D captions that are in progress as they will be rendered within real-world environments, which allows users to make any desired modification before committing. Given these improvements, the system may be particularly suitable in mobile device implementations in which a display screen size is limited.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
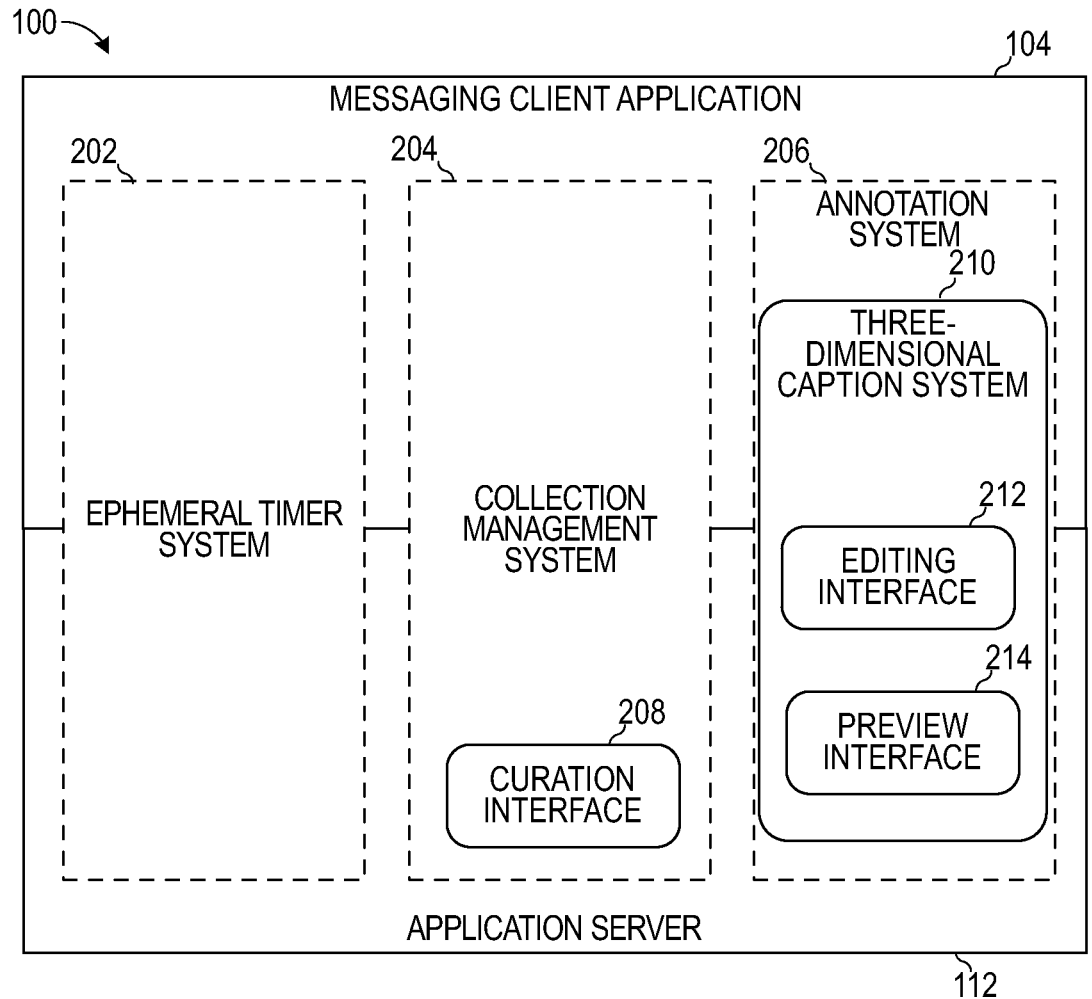
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter or LENS) to the messaging client application 104. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying.

The audio and visual content or the visual effects can be applied to a media content item (e.g., a photo) at the client device 102. For example, the media overlay including text that can be overlaid on top of an image or video generated by the client device 102. In another example, the media overlay includes an identification of a location overlay (e.g., Venice beach), a name of a live event, or a name of a merchant overlay (e.g., Beach Coffee House).

The annotation system 206 includes a 3D caption system 210 that provides functionality to generate, display, and track virtual objects at positions relative to the client device 102, within a 3D space captured within a camera feed of the client device 102 (also referred to by those of ordinary skill in the art as a "camera stream," "a video stream," or a "video feed"). The virtual objects generated, displayed, and tracked by the 3D caption system 210 include 3D captions. A 3D caption is a 3D representation of one or more text characters (e.g., letters, symbols, and emojis).

The 3D caption system 210 provides functionality to enable users to author, edit, and preview 3D captions. To this end, the 3D caption system 210 includes an editing interface 212 and a preview interface 214. The editing interface 212 allows a user to author and edit a 3D caption. The editing interface 212 enables users to author 3D captions using keyboard input and enable users to edit 3D captions using keyboard input and other types of input including touch-screen-based gestures. In some cases, the users type text of a 3D caption in a 2D view and after the user selects a suitable option (e.g., a done option), the 2D text is converted to a 3D caption according to any font, color and/or style characteristics selected by the user. The preview interface 214 allows a user to preview and review a 3D caption before generating a message that includes the 3D caption. The preview interface 214 may also enable the user to edit the presentation of the 3D captions (e.g., by changing a scale, orientation, placement, font, style, and/or color of the 3D caption).

The 3D caption system 210 may cause a 3D caption to be displayed (e.g., on a display of the client device 102) at a position in a 3D space captured within the camera feed based on a reference surface (e.g., the ground) detected in the 3D space. As will be discussed in further detail below, the 3D caption system 210 comprises a redundant tracking system comprising a set of tracking subsystems configured to track a 3D caption at position in 3D space based on a set of tracking indicia, and transition between tracking subsystems. The 3D caption system 210 may further transition between tracking with six degrees of freedom (6 DoF) and tracking with three degrees of freedom (3 DoF) based on an availability of the tracking indicia.

In some embodiments, the 3D caption system 210 includes a face detection and/or tracking component. The 3D caption system 210 may receive an indication from the face detection component that a face is detected in a camera feed being received and displayed. In such cases, the 3D caption system 210 automatically positions the 3D caption in close proximity to the face. For example, the 3D caption system 210 may curve the 3D caption around the top of the face (e.g., in the shape of a crown), the bottom of the face or on the forehead of the person depicted in the camera feed. As the user moves the camera around, the face may no longer be detected by the face detection component. As a result, the 3D caption system 210 may move the 3D caption from being placed in proximity to the face to being placed on a suitable reference surface (e.g., the ground). When the camera pans back to reveal the face again, the 3D caption system 210 automatically moves and transitions display of the 3D caption from the reference surface to being in close proximity to the face. When the 3D caption is positioned in proximity to the face in the camera feed, the 3D caption system 210 activates the face tracking component to continuously adjust the position of the 3D caption relative to changes in positions of the face. For example, as the face moves up and down, the 3D caption also moves up and down to keep its placement on top of or underneath the face in the camera feed.

In some cases, the 3D caption system 210 detects more than one face in the same frame or image of the camera feed. In such circumstances, the 3D caption system 210 computes how many pixels are in each of the faces relative to the total number of pixels in the frame or image. The 3D caption system 210 may then place the 3D caption in close proximity to a given face of the one or more faces that has the greater number of pixels relative to the total number of pixels. Namely, the 3D caption system 210 may position the 3D caption in close proximity (e.g., above or below) the face that is largest in size relative to other faces in the image.

In some embodiments, the 3D caption system 210 determines whether a front-facing camera of the client device 102 is being used to capture and display the video feed or a rear-facing camera is being used. The front-facing camera is a camera integrated on a same side of the client device 102 as the display screen and points towards the user. The rear-facing camera (world camera) is a camera pointing away from the user and is on an opposing side from the front-facing camera. The 3D caption system 210 may determine that the front-facing camera is being used and may determine that a face is not detected in the video feed. In such cases, the 3D caption system 210 may disable the 3D captions feature of the messaging client application 104.

In some embodiments, the 3D caption system 210 may determine that a front-facing camera is used to display the video feed. The 3D caption system 210 may detect a face in the video feed. The 3D caption system 210 may present a 3D caption in close proximity to the face with or without graphical elements. While the 3D caption is presented in close proximity to the face (e.g., as a crown on top of the head on which the face is depicted), the 3D caption system 210 may receive a user request to activate the rear-facing camera. In response, the 3D caption system 210 may start presenting a video feed being captured by the rear-facing camera. The video feed may not include any faces, and in such cases the 3D caption system 210 presents the same 3D caption that was presented in close proximity to the face, on a surface depicted in the video feed of the rear-facing camera. When a face appears in the video feed of the rear-facing camera, the 3D caption system 210 automatically transitions and repositions the 3D caption in close proximity to the face that appears in the video feed.

In some embodiments, the 3D caption system 210 automatically determines context of an environment of the client device 102. For example, the 3D caption system 210 determines the day of the week and/or time of day. Based on the context of the environment, the 3D caption system 210 automatically selects text for insertion in the 3D caption. In response to receiving input from a user requesting that a 3D caption be inserted (or without receiving input from the user), the 3D caption system 210 presents the 3D caption with the text that is selected based on the context of the environment.

In some embodiments, the 3D caption system 210 enhances and augments the 3D caption with one or more graphical elements (e.g., emojis or avatars) when a face is detected in the camera feed. For example, when the face is detected in the camera, the 3D caption system places a 3D caption (with automatically populated text based on context or manually supplied text from the user) in close proximity to the face. The 3D caption system 210 also searches for one or more graphical elements based on context of the text in the 3D caption. Specifically, the 3D caption system 210 may automatically identify one or more words in the 3D caption that are associated in a database with one or more graphical elements. For example, the 3D caption system 210 may determine that the 3D caption includes the word "love" and may retrieve a heart emoji that is associated with the word "love". The 3D caption system 210 may place the retrieved graphical elements on a left and a right side of the 3D caption to enclose the 3D caption with the graphical elements. For example, the 3D caption system 210 may display the word love in 3D above the user's face as a crown and place two heart emojis (one on the left and one on the right) around the 3D caption. In some cases, the 3D caption system 210 may determine that none of the words or phrases in the 3D caption matches or corresponds to words or phrases previously associated with graphical elements. In such cases, the 3D caption system 210 selects a default graphical element to populate into and add to the 3D caption.

In some embodiments, the 3D caption system 210 determines that the video feed being received and presented is being captured by the front-facing camera of the client device 102. In such cases, the 3D caption system 210 may determine whether a face is detected as being depicted in the video feed. If a face is detected in the video feed, the 3D caption system 210 automatically presents the one or more graphical elements when the user requests to add a 3D caption. Namely, after the 3D caption is added (either with automatically determined text or with text manually input by the user), the 3D caption system 210 automatically adds the one or more graphical elements to the caption.

In some embodiments, the 3D caption system 210 determines that the video feed being received and presented is being captured by the rear-facing camera of the client device 102. In such cases, the 3D caption system 210 may determine whether a face is detected as being depicted in the video feed. If a face is detected in the video feed, the 3D caption system 210 presents an option for the user to request to add one or more graphical elements when the user requests to add a 3D caption. Namely, after the 3D caption is added (either with automatically determined text or with text manually input by the user), the 3D caption system 210 provides an additional option for the user to select one or more graphical elements to add to the caption. In this way, graphical elements are automatically added to the 3D caption presented in proximity to a user's face when the video feed is being captured and received from the front-facing camera. When the video feed is being captured and received from the rear-facing camera, the 3D caption system 210 requests specific user instructions to add the graphical elements to the 3D caption that is presented in proximity to the user's face in the video feed.

In some embodiments, the 3D caption system 210 may allow the user to select the graphical elements in the camera feed that are displayed with the 3D caption. In response to receiving a user selection of the graphical element(s) (e.g., when the user taps on the displayed graphical element), the 3D caption system 210 may display the text of the 3D caption in 2D together with a menu of a list of alternate graphical elements for the user to choose from. The 3D graphical elements may continue to be displayed on the face without the 3D caption while the user selects a new graphical element from the list. In response to receiving a user selection of the new graphical element from the list, the 3D caption system 210 replaces the previously displayed graphical element with the selected graphical element and presents the 3D caption with the new graphical element. For example, the user can select a heart emoji that is displayed with the word "love" in the 3D caption. In response, a list of alternate graphical elements is displayed including a broken heart emoji. The user can select the broken heart emoji and in response the 3D caption system 210 displays the 3D caption with the word "love" and two broken heart emojis on either side of (e.g., on the left and right sides of) the 3D caption.

In some embodiments, the 3D caption system 210 may allow the user to modify or edit the text of the 3D caption. To do so, the 3D caption system 210 may receive input from the user that selects the 3D caption (e.g., the user can tap on the 3D caption). In response, the 3D caption system 210 may display the text of the 3D caption in 2D and allow the user to edit the text of the caption. The user can tap between any two letters of the text to navigate a cursor to a position between the two letters. The user can then add or delete characters starting from the position between the two letters the user selected. In some cases, the user can pinch the text in a 2D or 3D caption to adjust the size and layout of the text or 3D caption. In some cases, adjusting the size and layout of the text based on a pinch gesture may be enabled if the size of the text is wide enough (e.g., if there is a minimum of 4 or 5 characters in the text). In some embodiments, in response to receiving a user request to edit the 3D caption, the 3D caption system 210 automatically dims a display in which the 3D caption is presented. Namely, the 2D text is presented in a dimmer screen than the 3D caption to focus the user's attention on the 2D text.

In some embodiments, the user can modify attributes of the 2D text to make changes to the 3D caption. For example, the user can modify a color of the text and/or style of the text by selecting between a menu listing various styles and a separate menu listing various colors. In some embodiments, the 3D caption system 210 accesses a resource list of the client device 102 to determine whether resources (e.g., memory, processing power, and/or bandwidth) of the client device 102 satisfy a minimum device resource threshold. In response to determining that the resources (e.g., memory, processing power, and/or bandwidth) of the client device 102 satisfy the minimum device resource threshold, the 3D caption system 210 presents the menu of styles and/or colors for the user to use to modify the attributes of the 3D caption. In response to determining that the resources (e.g., memory, processing power, and/or bandwidth) of the client device 102 fail to satisfy the minimum device resource threshold, the 3D caption system 210 may not present the menu of styles and/or colors and may present the 3D caption with default attributes. In this way, the 3D caption system 210 conditions presentation of the option for adjusting visual attributes of the 3D caption based on the device resources.

When the user completes editing the text, the user can select a done option and, in response, the 3D caption system 210 may display the edited or modified text back on the surface or face that is in the camera feed. If the screen was dimmed while the user was editing the 2D text, the brightness of the screen may be restored to the brightness setting that was used to display the 3D caption prior to the user requesting to edit the 3D caption. In some cases, a first brightness setting is always used to display text in 2D for modifying the text of the 3D caption and a different, second brightness setting that is greater than the first brightness setting is used to present the 3D caption in the camera feed.

In some embodiments, the 3D caption system 210 stores a setting for each user indicating whether the given user has previously edited or accessed a 3D caption feature of the messaging client application 104. In response to receiving a user request to add, modify, or access the 3D caption feature, the 3D caption system 210 may access the settings for the user to determine whether the user is accessing the 3D caption feature for the first time. In response to determining that the user is accessing the 3D caption feature for the first time, the 3D caption system 210 may clear the setting to indicate that the user has not accessed the 3D caption system. Also, in response to determining that the user is accessing the 3D caption feature for the first time, the 3D caption system 210 may present a 3D caption in the camera feed together with an instructional animation (e.g., a 3D hint) on how to adjust the 3D caption. In some embodiments, the instructional animation includes a hand that repeatedly points to the 3D caption (e.g., the text of the 3D caption) and moves in a particular direction (e.g., towards the user) to indicate to the user that the user can point a finger and tap on the 3D caption to drag and reposition the 3D caption. The instructional animation can be any suitable instruction that visually explains to the user the options the user has to adjust or edit the 3D caption (e.g., the instructional animation can repeatedly point to the 3D caption to inform the user that if the user taps on the 3D caption, the user can edit text of the caption). After the 3D caption system 210 receives input from the user that responds to the instructional animation to perform the action indicated by the instruction, the 3D caption system 210 removes the instructional animation from the display and allows the user to perform the requested action (e.g., adjusting a position of and/or modifying the 3D caption).

In some embodiments, the 3D caption system 210 stores settings or attributes of the 3D caption for a threshold period of time (e.g., 30 seconds) after the user finishes creating a message that includes the 3D caption. For example, the user can select a style, text, color, and/or graphical elements to include in the 3D caption and place the 3D caption in a video feed. The 3D caption system 210 can then store a video clip or image that includes the 3D caption with the selected attributes to send or share with another user in a message. After the video clip is stored, the 3D caption system 210 may receive a user request to access the 3D caption feature of the messaging client application 104. The 3D caption system 210 determines when the video clip was stored (e.g., by accessing a timestamp of the video clip) and compares the time when the video clip was stored to the current time. If the video clip was stored more than a threshold period of time, such as if the difference between the current time and the creation time of the video clip exceeds a threshold, (e.g., if the 3D caption system 210 determines that a threshold amount of time has elapsed since the video segment was stored), the 3D caption system 210 may present a caption editing interface with default attributes (e.g., the user can input a new text string and the text string may be presented with default color and style). If the video clip was stored less than the threshold amount of time, such as if the difference between the current time and the creation time is less than the threshold, the 3D caption system 210 retrieves the 3D caption attributes last used by the user. For example, the 3D caption system 210 presents a 3D caption creation/modification feature with settings and attributes of the last caption the user created (e.g., the text of the last caption may be shown to the user with the previously selected style and color). The user can then modify the 3D caption and create a new segment with the modified 3D caption.

Figure 3:
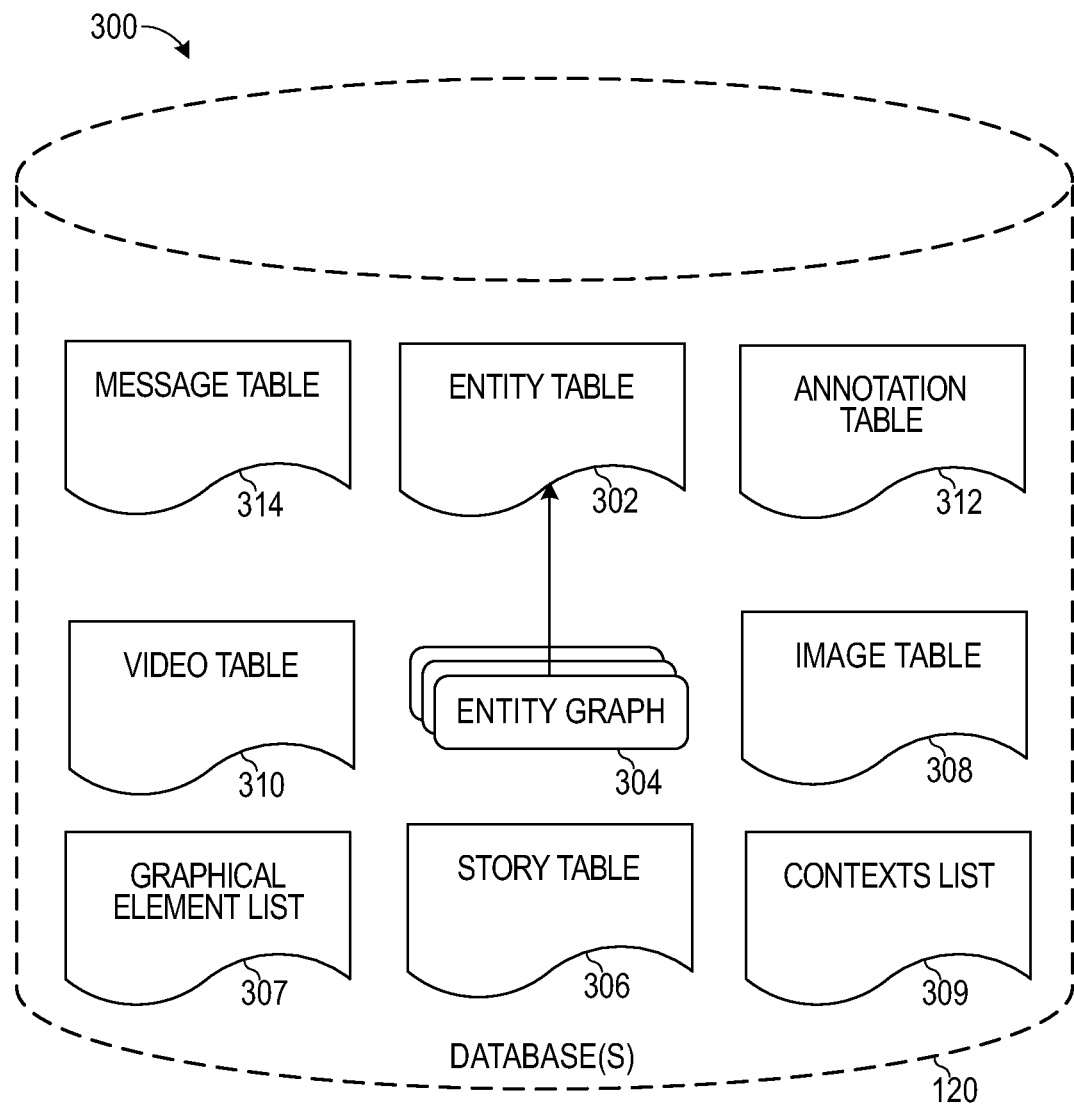
FIG. 3 is a schematic diagram illustrating data which may be stored in the database of the messaging system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and LENSES, in an annotation table 312. Filters and LENS for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. LENSES include real-time visual effects and/or sounds that may be added to real-world environments depicted in a camera feed (e.g., while a user is viewing the camera feed via one or more interfaces of the messaging system 100, while composing a message, or during presentation to a recipient user). In comparison, filters are applied to an image or video after the image or video is captured at the client device 102 while a LENS is applied to the camera feed of the client device 102 such that when an image or video is captured at the client device 102 with a LENS applied, the applied LENS is incorporated as part of the image or video that is generated. Filters and LENSES may be of various types, including user-selected filters and LENSES from a gallery of filters or a gallery of LENSES presented to a sending user by the messaging client application 104 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

Graphical elements list 307 stores a list of different graphical elements (e.g., emojis and/or avatars) that are associated with different contexts. For example, the graphical elements list 307 may store different emojis or paired emojis, each associated with a different context. Specifically, a happy face emoji or happy face emoji pair may be associated with a happy context, a heart emoji may be associated with a love context, a baseball or football emoji may be associated with a sporting event and/or baseball or football context, and a broken heart emoji may be associated with a sad or broken heart context.

Contexts list 309 stores a list of different contexts associated with different words or combinations of words. Graphical elements list 307 stores a list of rules that the three-dimensional caption system 210 uses to process a text string in a 2D/3D caption to derive or determine a context of the text string.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
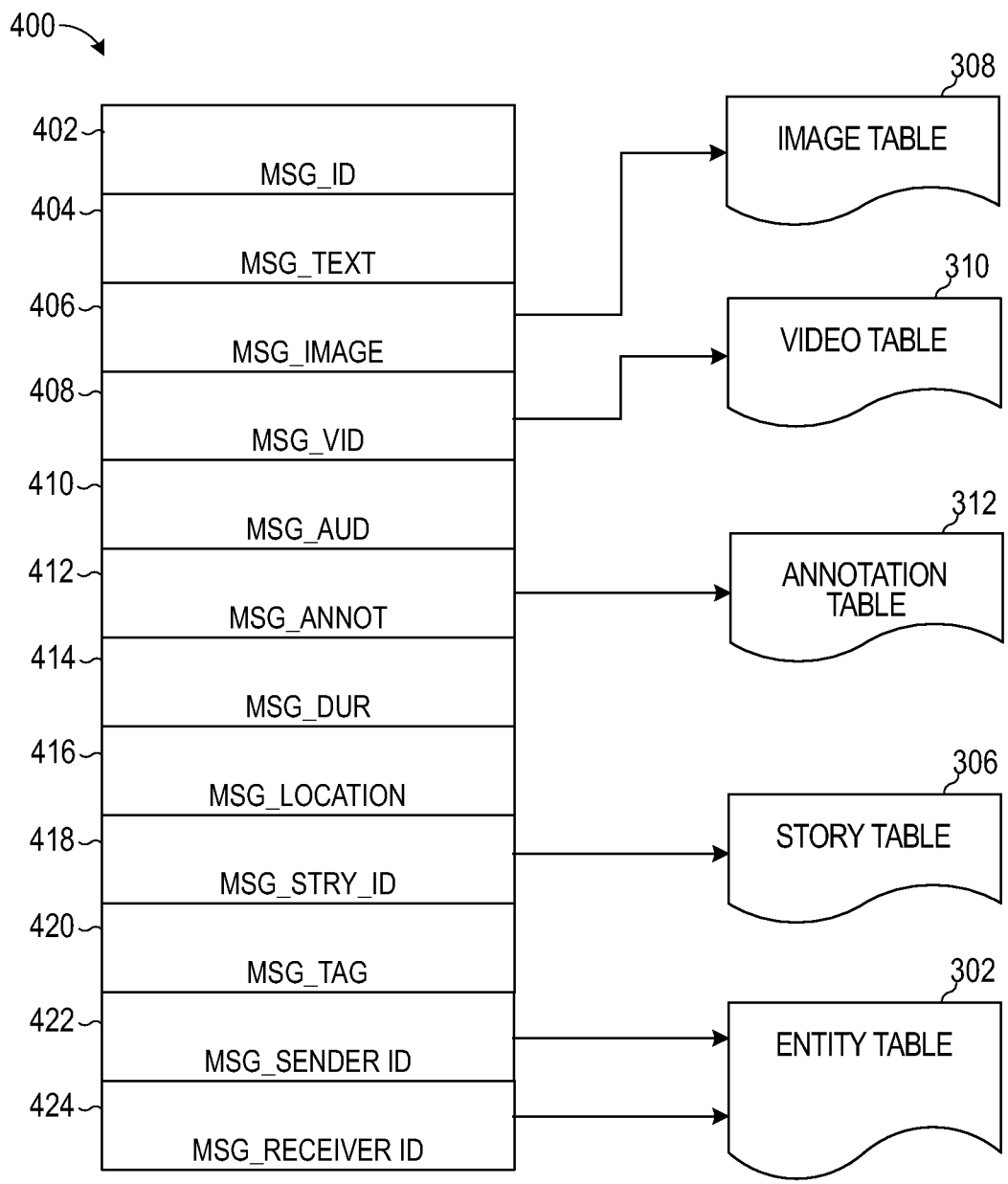
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
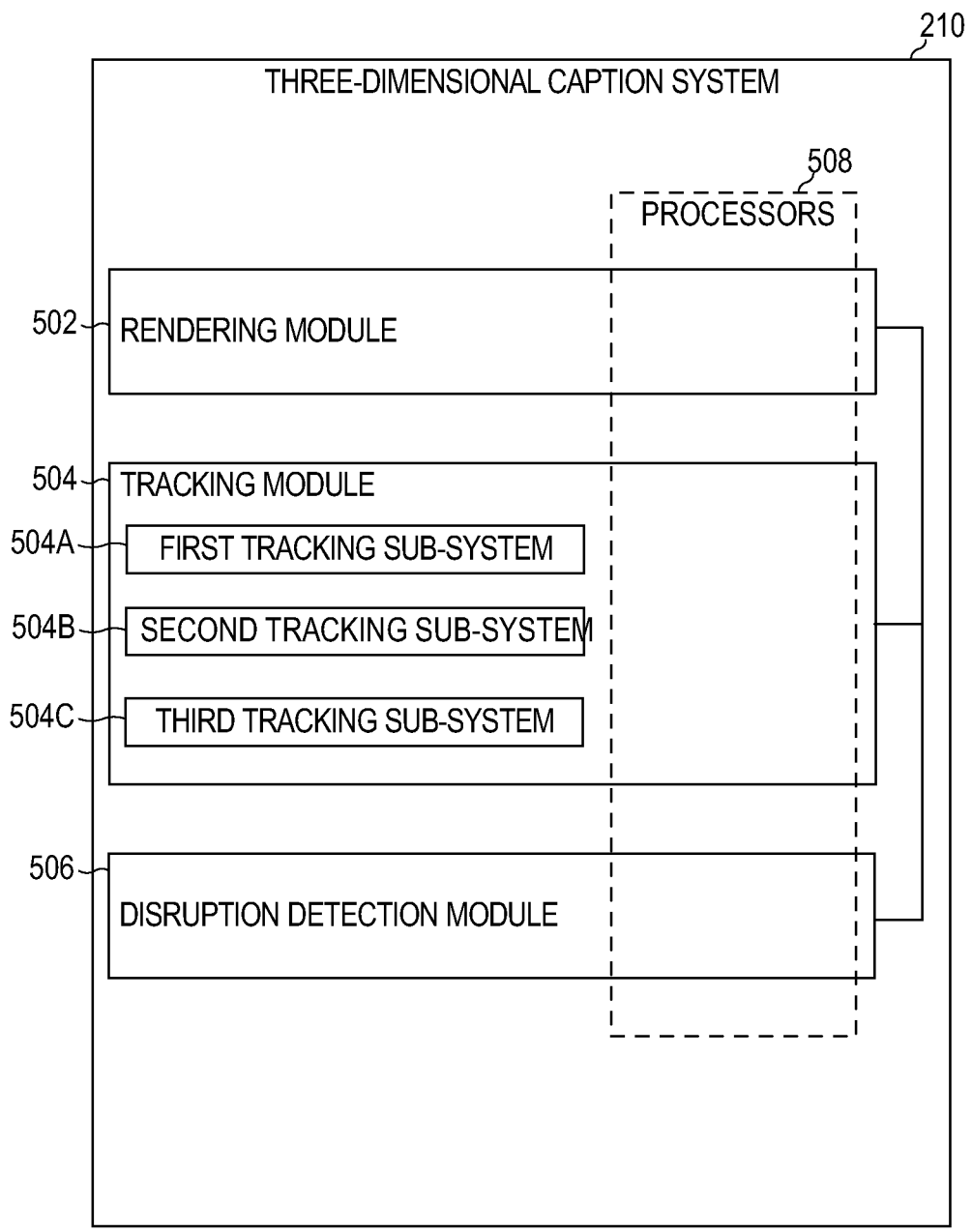
FIG. 5 is a block diagram illustrating various components of a three-dimensional (3D) caption system, which may be provided as part of the messaging system, according to example embodiments.

FIG. 5 is a block diagram illustrating functional components of the 3D caption system 210 that configure the 3D caption system 210 to render 3D captions in a 3D space (e.g., a real-world environment) depicted in a live camera feed. The 3D caption system 210 is shown as including a rendering component 502, a tracking system 504, and a disruption detection component 506. The various components of the 3D caption system 210 may be configured to communicate with each other (e.g., via a bus, shared memory, or a switch). Although not illustrated in FIG. 5, in some embodiments, the 3D caption system 210 may include or may be in communication with a front-facing or rear-facing camera configured to produce a camera feed comprising image data that includes a sequence of images (e.g., a video).

Any one or more of the components described may be implemented using hardware alone (e.g., one or more of the processors 508 of a machine) or a combination of hardware and software. For example, any component described of the 3D caption system 210 may physically include an arrangement of one or more of the processors 508 (e.g., a subset of or among the one or more processors of the machine) configured to perform the operations described herein for that component. As another example, any component of the 3D caption system 210 may include software, hardware, or both, that configure an arrangement of one or more processors 508 (e.g., among the one or more processors of the machine) to perform the operations described herein for that component. Accordingly, different components of the 3D caption system 210 may include and configure different arrangements of such processors 508 or a single arrangement of such processors 508 at different points in time.

Moreover, any two or more components of the 3D caption system 210 may be combined into a single component, and the functions described herein for a single component may be subdivided among multiple components. Furthermore, according to various example embodiments, components described herein as being implemented within a single machine, database, or device may be distributed across multiple machines, databases, or devices.

The tracking system 504 may comprise a first tracking sub-system 504A, a second tracking sub-system 504B, and a third tracking sub-system 504C. Each tracking sub-system tracks the position of a 3D caption within the 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization And Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with 3 DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the 3D caption system 210 comprises multiple redundant tracking sub-systems 504A-C that enable seamless transitions between tracking sub-systems. The multiple redundant tracking sub-systems 504A-C address the issues with traditional tracking systems by merging multiple tracking approaches into a single tracking system 504. The tracking system 504 is able to combine 6 DoF and 3 DoF tracking techniques through combining and transitioning between multiple tracking systems based on the availability of tracking indicia tracked by the tracking systems. Thus, as the indicia tracked by any one tracking system become unavailable, the 3D caption system 210 seamlessly switches between tracking in 6 DoF and 3 DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6 Dof and 3 DoF based on the availability of tracking indicia.

In some example embodiments, to transition between tracking in 6 DoF and 3 DoF, the 3D caption system 210 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1-T_0$ as the translation of the view matrix.

The rendering component 502 of the 3D caption system 210 is configured to generate and render 3D captions in a 3D space captured within a live camera feed produced by a camera. For example, the rendering component 502 may generate a 3D caption based on input received from a user (e.g., keyboard input) and render the 3D caption in the 3D space captured within the live camera feed. In rendering the 3D caption, the 3D caption system 210 assigns the 3D caption to a position in the 3D space based on a real-world reference surface detected in the 3D space. In some cases, the rendering component 502 automatically positions the 3D caption in 3D space on top of a user's head or under the user's head in response to detecting presence of a face in the camera feed. The rendering component 502 automatically transitions the 3D caption to a reference surface (e.g., the ground) from being presented on top of or under the user's head when the face is no longer presented in the camera feed (e.g., because the user panned the camera right/left/up/down to a point where the face is no longer being picked up by the camera). Similarly, the rendering component 502 automatically transitions the 3D caption to being presented on top of or under the user's head from being presented on a reference surface (e.g., the ground) when the face is again (or for the first time) presented in the camera feed (e.g., because the user panned the camera right/left/up/down to a point where the face is being picked up by the camera).

The 3D caption system 210 may thereafter track the position of the 3D caption relative to a user device in the 3D space by one or more tracking systems in 6 DoF. For example, the one or more tracking systems of the 3D caption system 210 may collect and analyze a set of tracking indicia (e.g., roll, pitch, yaw, natural features, etc.) in order to track the position of the 3D caption relative to the user device in the 3D space with 6 DoF. In such embodiments, the 3D caption system 210 may transition between tracking systems based on the availability of the tracked indicia to maintain consistent tracking in 6 DoF.

The disruption detection component 506 monitors tracking indicia to detect disruptions. Upon the disruption detection component 506 detecting an interruption of one or more indicia, such that tracking in 6 DoF becomes unreliable or impossible, the 3D caption system 210 transitions to tracking the 3D caption in the 3D space in 3 DoF in order to prevent an interruption of the display. For example, the 3D caption system 210 may transition from a first tracking system (or first set of tracking systems among the set of tracking systems) to a second tracking system among the set of tracking systems (or second set of tracking systems), wherein the second tracking system is capable of tracking the 3D caption with 3 DoF in the 3D space, based on the tracking indicia available.

In some example embodiments, the set of tracking systems of the 3D caption system 210 includes a gyroscopic tracking system, an NFT system, as well as a SLAM tracking system. Each tracking system among the set of tracking systems may analyze tracking indicia in order to track a position of a virtual object within a 3D space. For example, to track a virtual object with 6 DoF, the 3D caption system 210 may require at least six tracking indicia to be available. As tracking indicia become obstructed or unavailable for various reasons, the 3D caption system 210 may transition between the available tracking systems among the set of tracking systems in order to maintain 6 DoF, or transition to 3 DoF if necessary.

It will be readily appreciated that the 3D caption system 210 provides consistent rendered virtual objects (e.g., 3D captions) in real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

To ensure firm consistency in the location of virtual objects, annotation data in the example form of a presentation LENS that is specific for the 3D object tracking and rendering described herein may be employed. In particular, a surface-aware LENS is a presentation LENS that identifies and references a real-world surface (e.g., the ground) for the consistent rendering and presentation of virtual objects in 3D space. The surface-aware LENS can be a specific portion or subcomponent within the rendering component 502. This surface-aware LENS of the rendering component 502 can be configured to recognize a reference surface or face based on visual camera content, and may also utilize other device inputs (e.g., gyroscope, accelerometer, compass) to determine what is an appropriate surface within a 3D space depicted in a live camera feed. Once the reference surface or face has been determined, then a virtual object (e.g., a 3D caption) can be accomplished with respect to that reference surface or face. In an example, the reference surface in the 3D space is a ground surface. The 3D caption system 210 may render the 3D caption at a position in the 3D space such that the caption appears to be on or slightly above the 3D space. In an example, the reference surface in the 3D space is a face or head. The 3D caption system 210 may render the 3D caption at a position in the 3D space such that the caption appears to be on top of the head or slightly below the head in the 3D space. The 3D caption system 210 may curve the 3D caption around the head based on contours of the head. In particular, a more rounded face may result in a 3D caption that is more straight or curved less around the face or head than when the 3D caption is presented on a less rounded face. Namely, a 3D caption may be generated and a first user with a face having a first curvature may be detected in the video stream. The 3D caption may be curved by a first extent around the curvature of the first user's face. Then, a second user with a face having a second curvature may be detected. The second curvature may be smaller than the first curvature. In such cases, the same 3D caption may be presented with a smaller extent than the first extent around the curvature of the second user's face.

Figure 6:
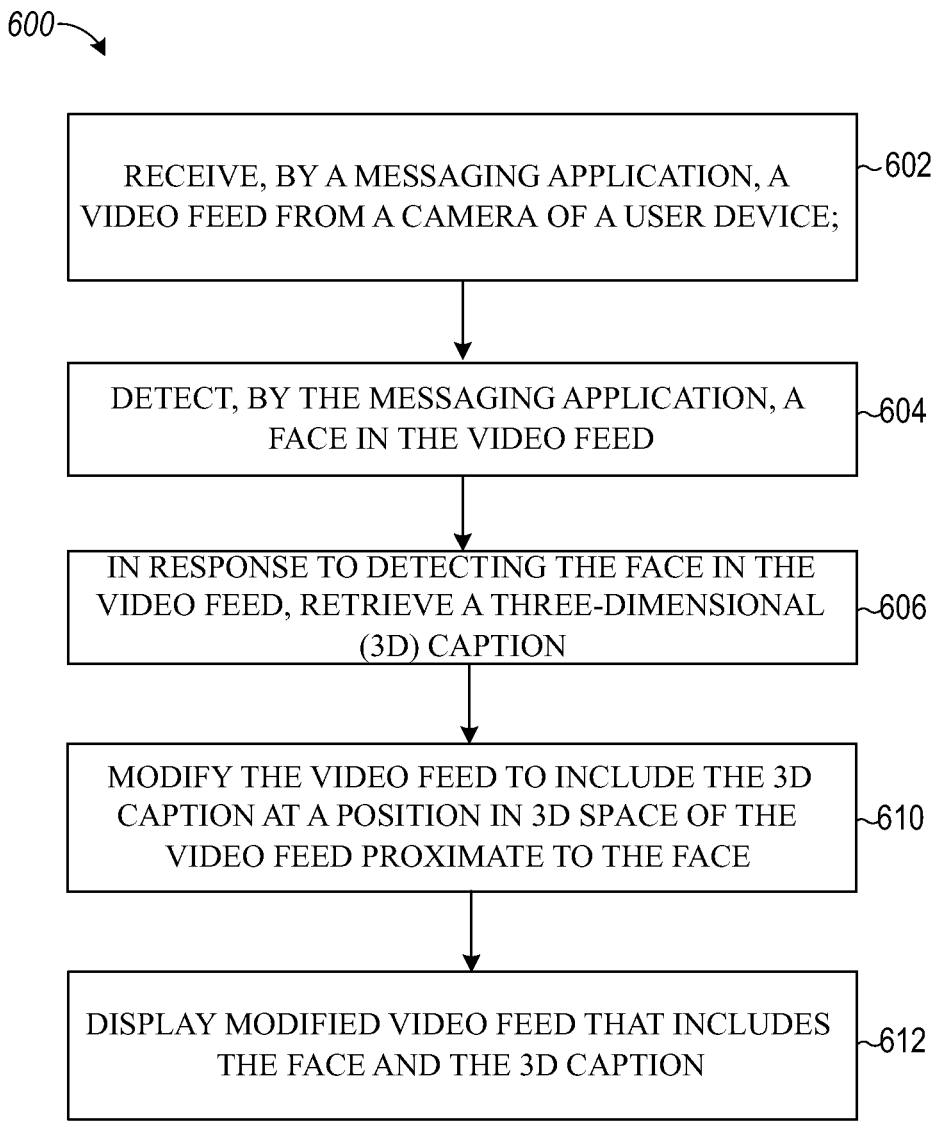
FIGS. 6 and 7 are flowcharts illustrating example operations of the 3D caption system in performing a method for generating a message that includes a 3D caption, according to example embodiments.
Figure 7:
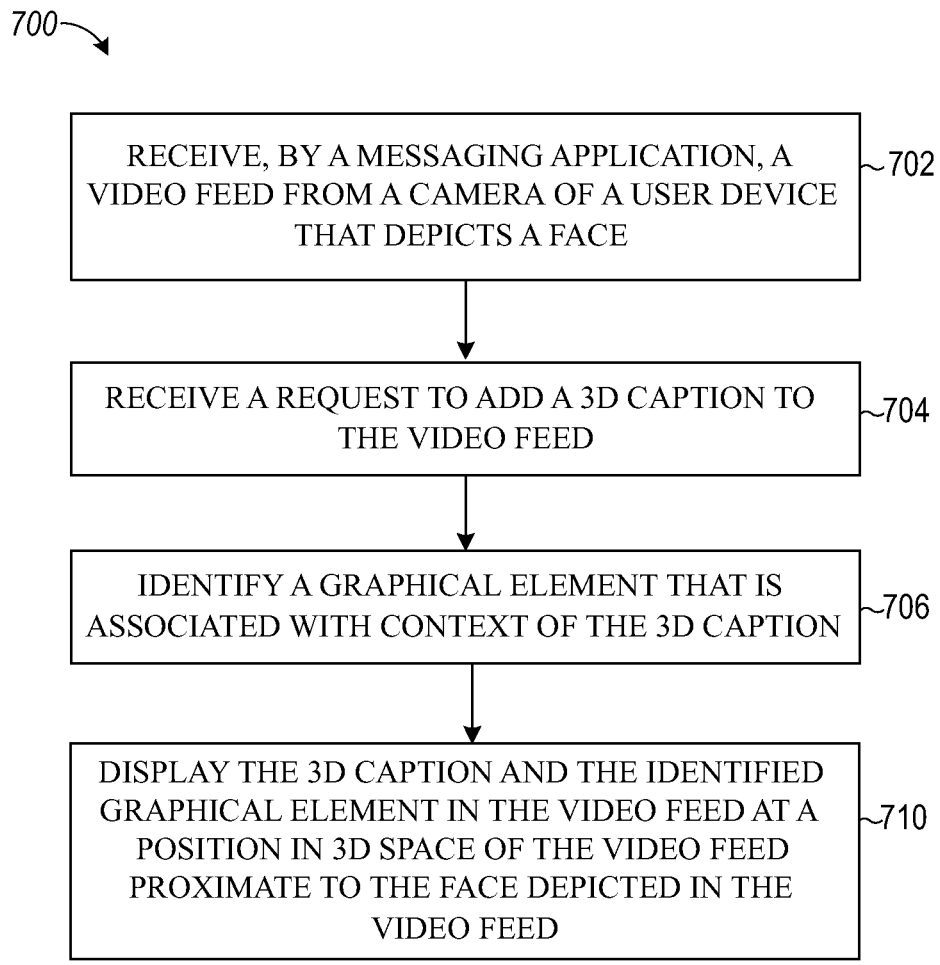

FIGS. 6-7 are flowcharts illustrating example operations of the 3D caption system in performing methods 600 and 700 for generating a message that includes a 3D caption, according to example embodiments. The methods 600 and 700 may be embodied in computer-readable instructions for execution by one or more processors such that the operations of the methods 600 and 700 may be performed in part or in whole by the functional components of the 3D caption system 210; accordingly, the methods 600 and 700 are described below by way of example with reference thereto. However, it shall be appreciated that at least some of the operations of the methods 600 and 700 may be deployed on various other hardware configurations and the methods 600 and 700 are not intended to be limited to the 3D caption system 210.

The preview interface 214 includes a presentation of a 3D caption generated based on the one or more text characters input by the user. The 3D caption is a 3D representation of the one or more text characters input by the user. The 3D caption may be rendered at a position in a 3D space captured in the camera feed that is based on a detected reference surface in the 3D space such as a ground or floor surface. For example, the 3D caption system may render the 3D caption such that it appears to be attached to the detected reference surface or face.

At operation 602, the 3D caption system 210 receives a video feed from a camera of a user device. For example, the 3D caption system 210 receives and displays a camera feed received from a rear-facing camera of the client device 102.

At operation 604, the 3D caption system 210 detects a face in the video feed. For example, the 3D caption system 210 detects that a user's face is present in the camera feed of the rear-facing camera.

At operation 606, the 3D caption system 210 retrieves a three-dimensional caption in response to detecting the face in the video feed. For example, the 3D caption system 210 receives a user input that types in letters of words or phrases to added to a 3D caption. In another example, the 3D caption system 210 determines a current context (e.g., the current time, time of day, location, date, or day of the week) and retrieves a prepopulated string of text based on which the 3D caption is automatically generated.

At operation 610, the 3D caption system 210 modifies the video feed to include the 3D caption at a position in 3D space of the video feed proximate to the face. For example, the 3D caption system 210 displays the 3D caption on top of the head of the user whose face is depicted in the camera feed so the 3D caption appears as a crown on the user's head. The 3D caption can be curved around the user's head.

At option 612, the 3D caption system 210 displays the modified video feed that includes the face and the 3D caption. For example, the 3D caption system 210 may track movement of the face in the video stream and maintain the 3D caption in a static placement relative to the user's face so the 3D caption moves together with the user's face.

At option 702, the 3D caption system 210 receives a video feed from a camera of a user device. For example, the 3D caption system 210 receives and displays a camera feed received from a front-facing camera of the client device 102.

At option 704, the 3D caption system 210 receives a request to add a 3D caption to the video feed. For example, the 3D caption system 210 receives a user selection of an option to add a 3D caption. The 3D caption system 210 dims the screen and presents a cursor allowing the user to input one or more characters of a word or phrase in 2D based on which the 3D caption is generated.

At option 706, the 3D caption system 210 identifies a graphical element that is associated with context of the 3D caption. For example, the 3D caption system 210 searches a database of graphical elements to identify a graphical element that is associated with the words or phrases in the 3D caption. In some cases, the 3D caption system 210 searches a database of contexts associated with words or phrases. Then the 3D caption system 210 retrieves a matching context and searches another database that associates different contexts with different graphical elements to identify a graphical element associated with the 3D caption.

At option 710, the 3D caption system 210 displays the 3D caption and the identified graphical element in the video feed at a position in 3D space of the video feed proximate to the face depicted in the video feed. For example, the 3D caption system 210 duplicates the retrieved graphical element (e.g., an emoji) and presents each instance of the duplicated graphical element on a given side of the 3D caption. Namely, a first graphical element may be positioned on a left side of the 3D caption and a second graphical element (that is a duplicate of the first graphical element) may be positioned on a right side of the 3D caption.

Figure 8:
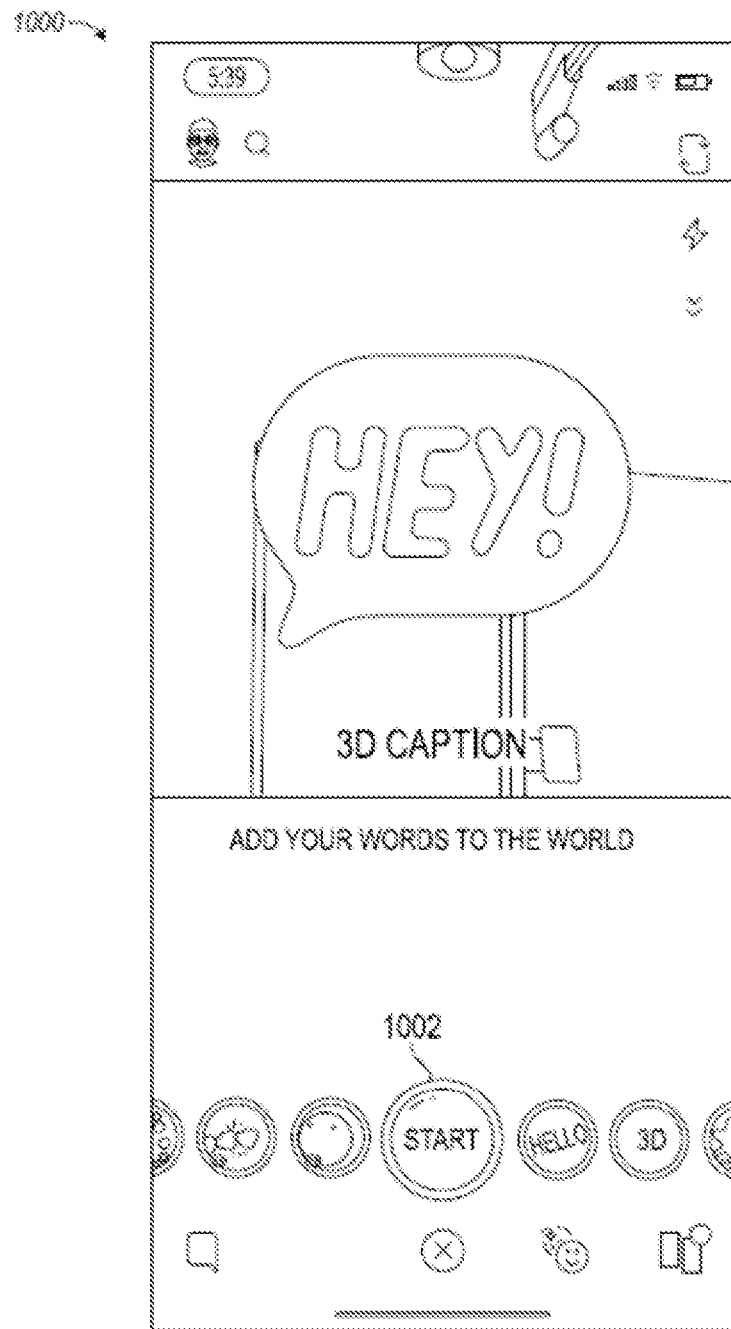
FIGS. 8-11 are interface diagrams that illustrate various interfaces provided by the messaging system, according to some example embodiments.

FIG. 8 is an interface diagram that illustrates a user interface 1000 provided by the messaging system 100, according to some embodiments. User interface 1000 includes a LENS carousel from which a user may initiate functionality of the 3D caption system 210 through selection of icon 1002. As shown, the LENS carousel is overlaid upon a 3D space captured within a camera feed produced by a camera of a computing device (e.g., a client device 102).

Figure 9:
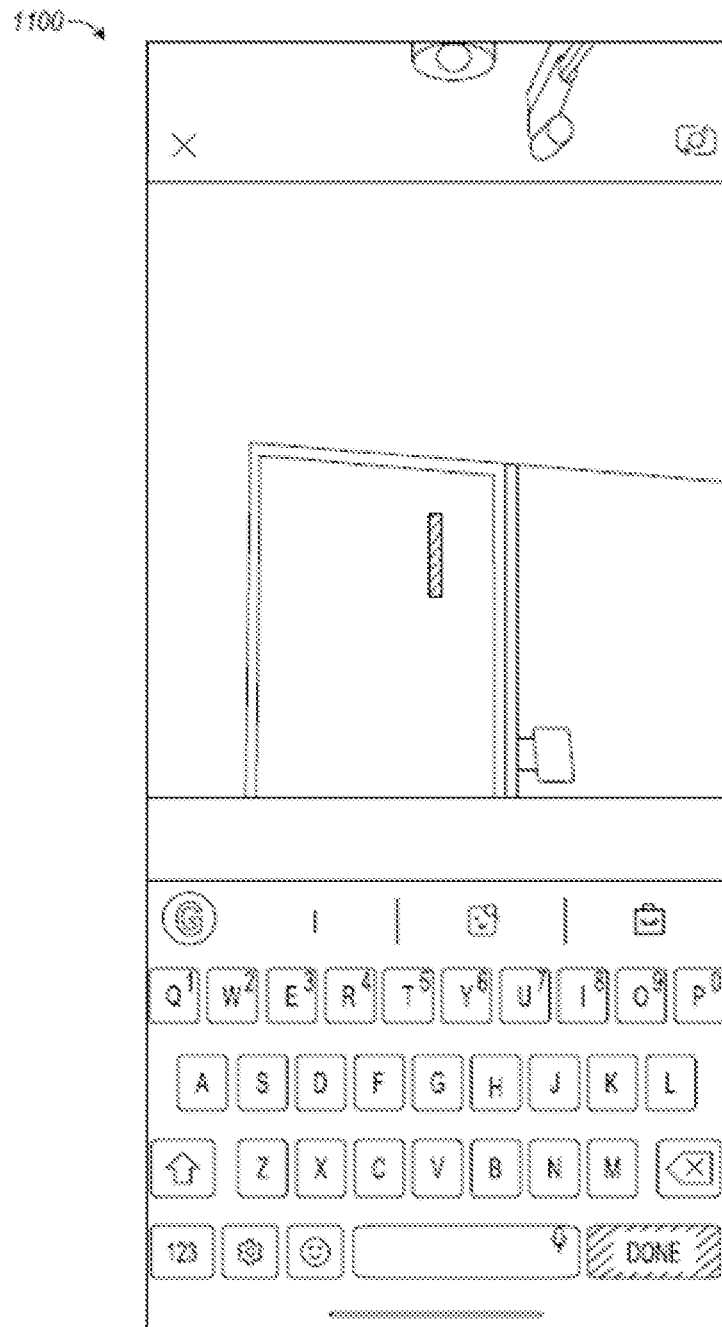

Consistent with some embodiments, upon receiving a user selection of the icon 1002, a user is presented with an editing interface configured for creating and editing a 3D caption. For example, upon receiving a user selection of the icon 1102, the 3D caption system 210 may cause display of a user interface 1100 illustrated in FIG. 9. As shown in FIG. 9, the user interface 1100 includes a keyboard and a blinking cursor overlaid upon the 3D space captured within the camera feed. In some cases, upon receiving a user selection of the icon 1002, the keyboard of user interface 1100 is animated up from the bottom of the screen. A style carousel (that includes a menu listing various styles, such as round, spooky, bubble, 8-bit, and so forth) is then animated in after the keyboard is animated up. Together with the keyboard, a color picker that includes various colors is also animated into the screen to allow the user to swipe up/down on the screen using their finger to gradually or quickly change the color of the text input for the 3D caption. The style carousel and color picker are shown and described in FIG. 14A. The user may use the keyboard to input one or more text characters that provide a basis for a 3D caption to be rendered within the 3D space. The user interface 1100 is an example of the editing interface 212. In some cases, the language of the keyboard can be changed using a specified option on the screen.

Figure 10:
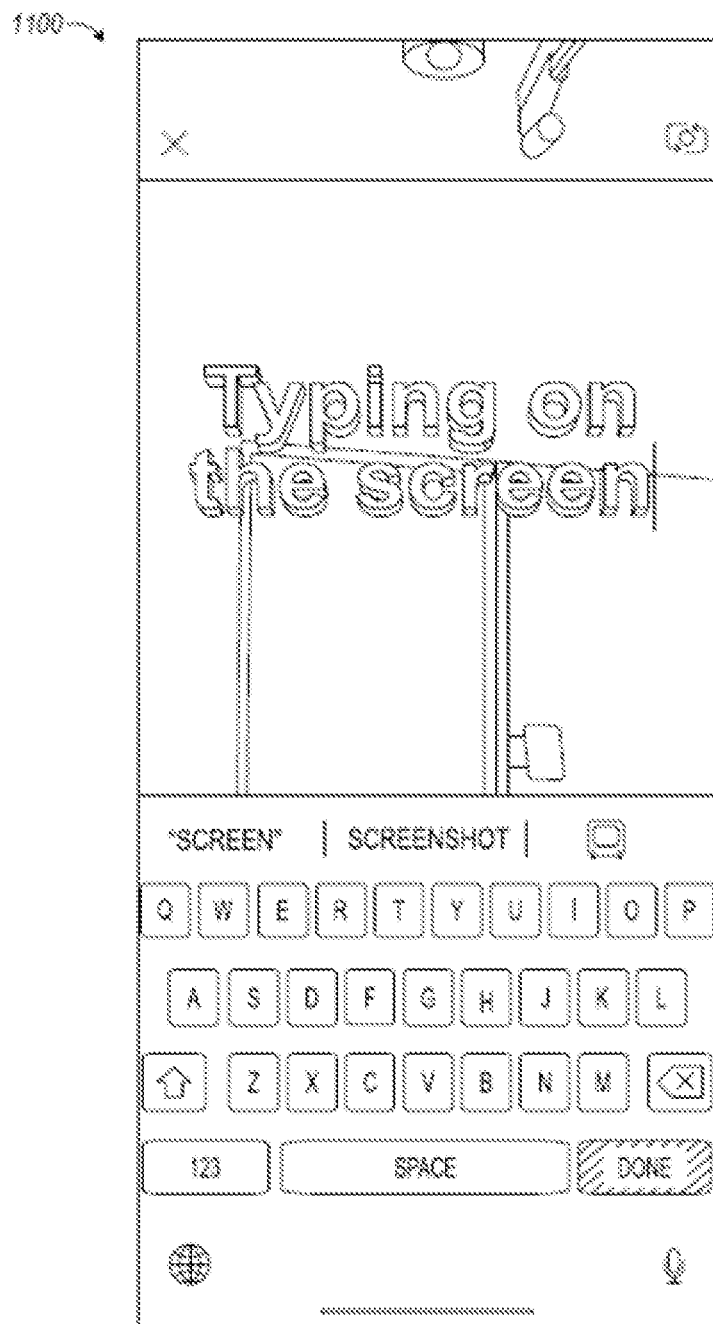

As shown in FIG. 10, upon receiving input from the user (e.g., entered via the keyboard), the user interface 1100 is updated to present a representation of the input text ("Typing on the screen"). Within the user interface 1100, a 2D representation of the user input is rendered at the foreground of the camera feed of the client device 102. In essence, the 2D representation of the user input is a 2D representation of a 3D caption. In other words, the 2D representation of the user input is a preview of the 3D caption. In some cases, the 2D representation screen used to type in the text is presented in a dimmed manner (e.g., with less brightness) than the camera feed presented on the display before the user selected the icon 1002. Namely, in response to receiving the user selection of icon 1002, the 3D caption system 210 dims the display and presents a cursor allowing the user to input a 2D text string.

Consistent with some embodiments, a user of the client device 102 may access a preview interface (e.g., preview interface 214) that includes a preview of the 3D caption by providing an input such as changing an orientation of the client device 102 (e.g., changing the orientation of the camera from pointing upward to pointing downward) or by selecting an interface element (e.g., a button) presented within the preview interface 214.

Figure 11:
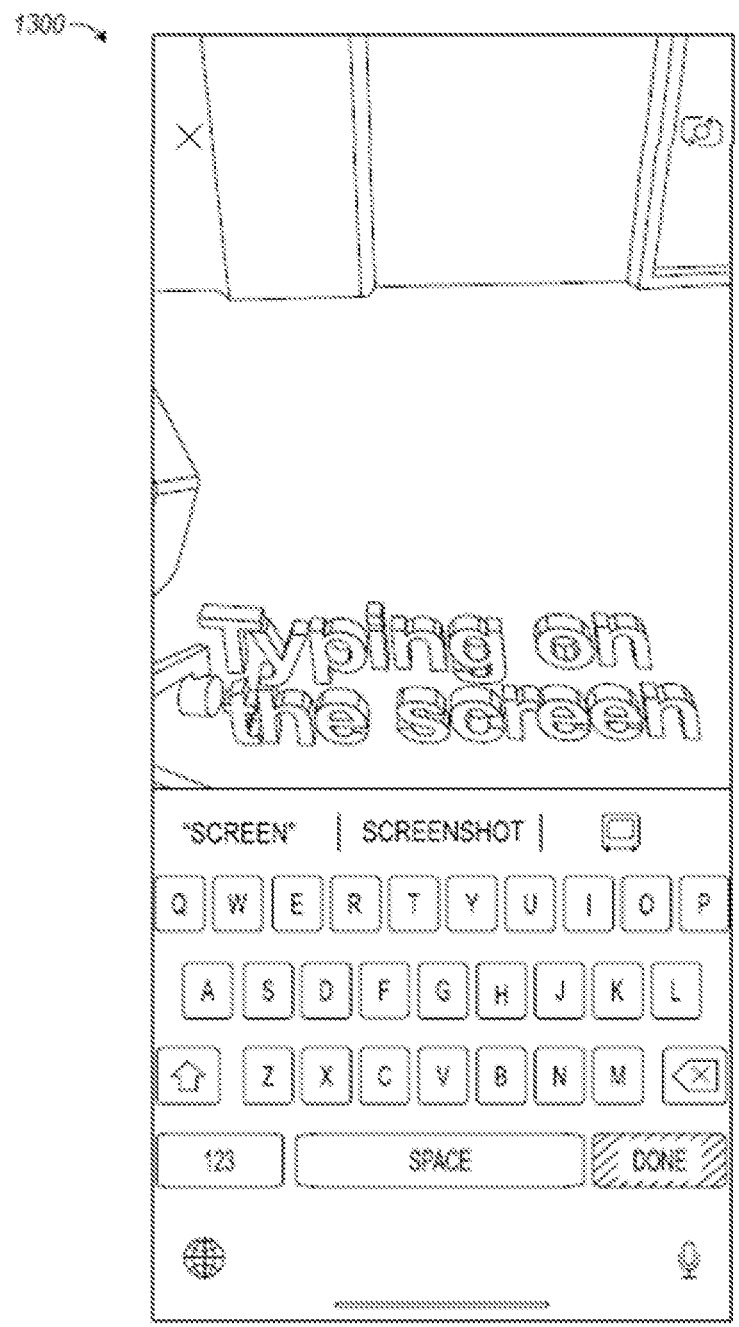

FIG. 11 illustrates an interface 1300 that includes a preview of a 3D caption generated based on user input (e.g., user input provided via the interface 1100). The interface 1300 is an example of the preview interface 214. As noted above, the user may access the interface 1300 by providing an input such as a change in orientation. As shown in FIG. 11, upon detecting a reference surface (e.g., the ground) in the 3D space captured within the camera feed (e.g., based on a change of orientation of the computing device), a 3D caption based on the user's authored text is rendered within the 3D space captured within the camera feed. As shown, the 3D text object is rendered with respect to a reference surface in the 3D space. That is, the 3D text object, as rendered, is oriented within the 3D space at a position relative to the reference surface (e.g., the ground). Rendering the 3D object in this manner makes it appear attached to a real-world surface captured within the camera feed. In an example, if the rear-facing camera is used to capture and display the camera feed, the 3D caption is positioned on a surface, such as the ground, in the camera feed. If the front-facing camera is used to capture and display the camera feed, the 3D caption is added to the face depicted in the camera feed.

Figure 12A:
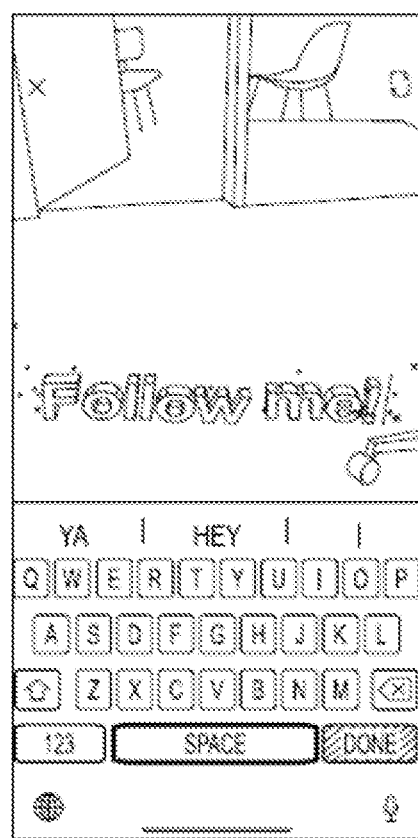
FIGS. 12A-12C are interface diagrams that illustrate various interfaces provided by the messaging system, according to some example embodiments.
Figure 12B:
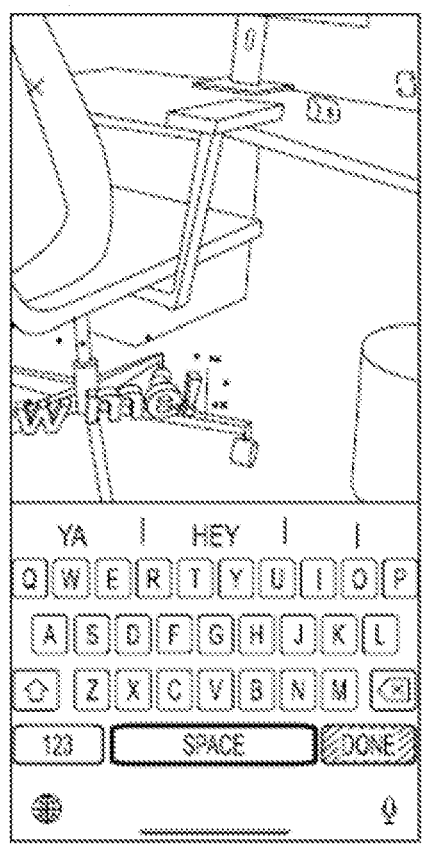
Figure 12C:
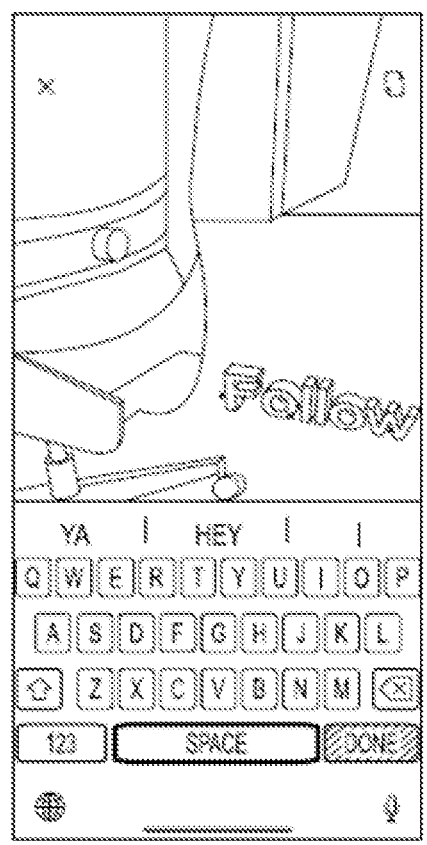

FIGS. 12A-12C illustrate an interface, which is an example of the preview interface 214. As shown in FIGS. 12A-12C, as a user is editing a 3D caption while accessing the preview interface 214, the user may move the computing device away from the caption and the 3D caption system 210 is able to track the movement and force the 3D caption to follow within the 3D space captured within the camera feed of the computing device. For example, the 3D caption system 210 may detect movement of the client device that causes a second 3D space to be captured in the camera feed and animate the 3D caption moving from the first 3D space to the second 3D space during the movement of the client device. In this manner, the 3D caption system 210 ensures that, while editing, the 3D caption remains visible to the user until they commit a final version of the 3D caption. As shown, moving the 3D caption may be rendered with a lower opacity than remaining stationary.

Figure 13A:
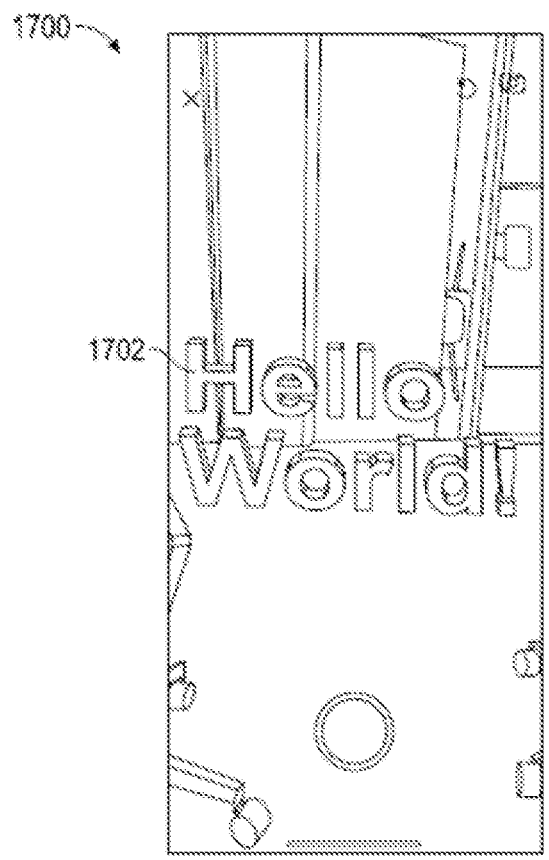
FIGS. 13A-13D are interface diagrams that illustrate various interfaces provided by the messaging system, according to some example embodiments.
Figure 13B:
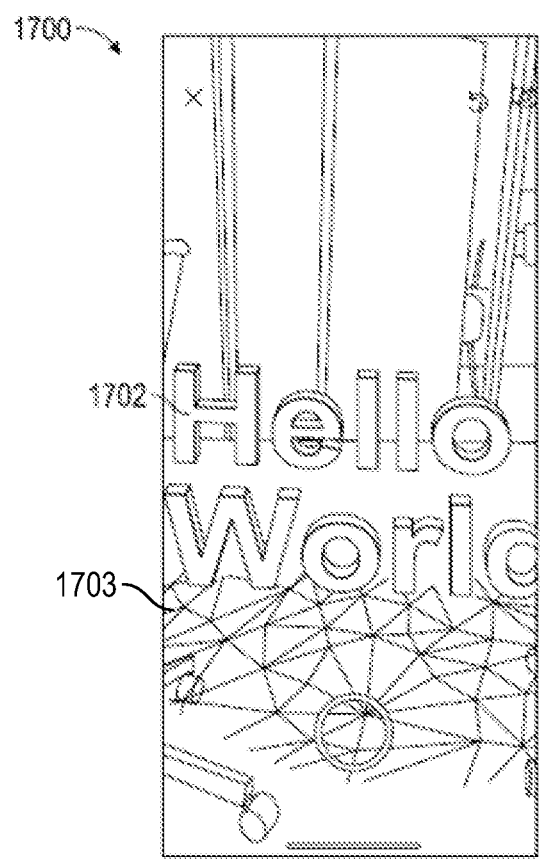

FIGS. 13A-13D are interface diagrams that illustrate an interface 1700, which is an example of a preview interface 214. As shown in FIG. 13A, a 3D caption 1702 is rendered within a 3D space at a first position; the 3D caption 1702 is rendered such that it appears attached to a reference surface 1703 (e.g., the ground). As shown in FIG. 13B, through appropriate interaction with the 3D caption 1702 (e.g., a select and drag gesture), the user may move the 3D caption 1702 such that it is rendered at a second position within the 3D space.

Figure 13C:
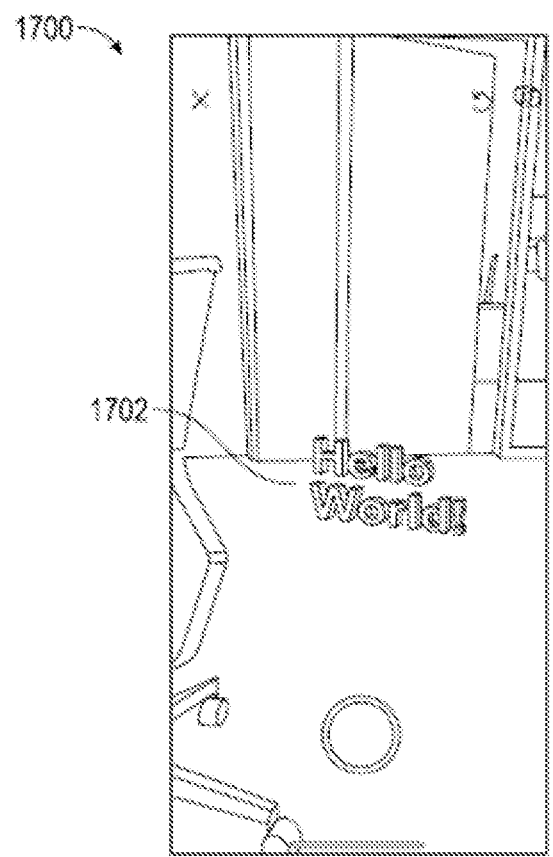
Figure 13D:
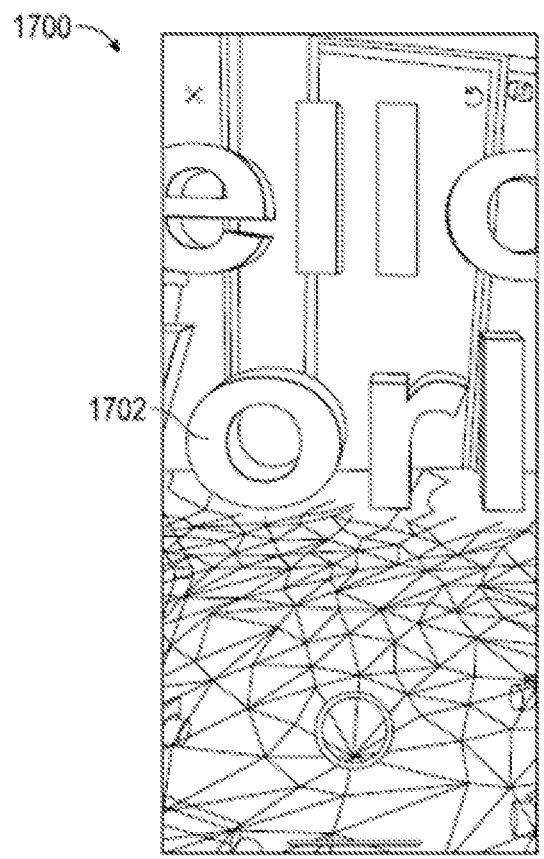

As shown in FIGS. 13C and 13D, a user may change a scale and rotation of the 3D caption 1702 through appropriate interaction with the 3D caption 1702. For example, the user can perform a pinch and rotate gesture with two fingers on an input touchscreen display on which the camera feed is displayed to scale and rotate the 3D caption 1702 on the reference surface without affecting a layout of the 3D caption 1702.

Once the user is satisfied with the placement and look of a 3D caption, the user may create a message that includes the 3D caption and one or more images from the camera feed. For example, the user may use the client device 102 to record a video in which the 3D caption is rendered such that it appears attached to a surface in the video.

Figure 14A:
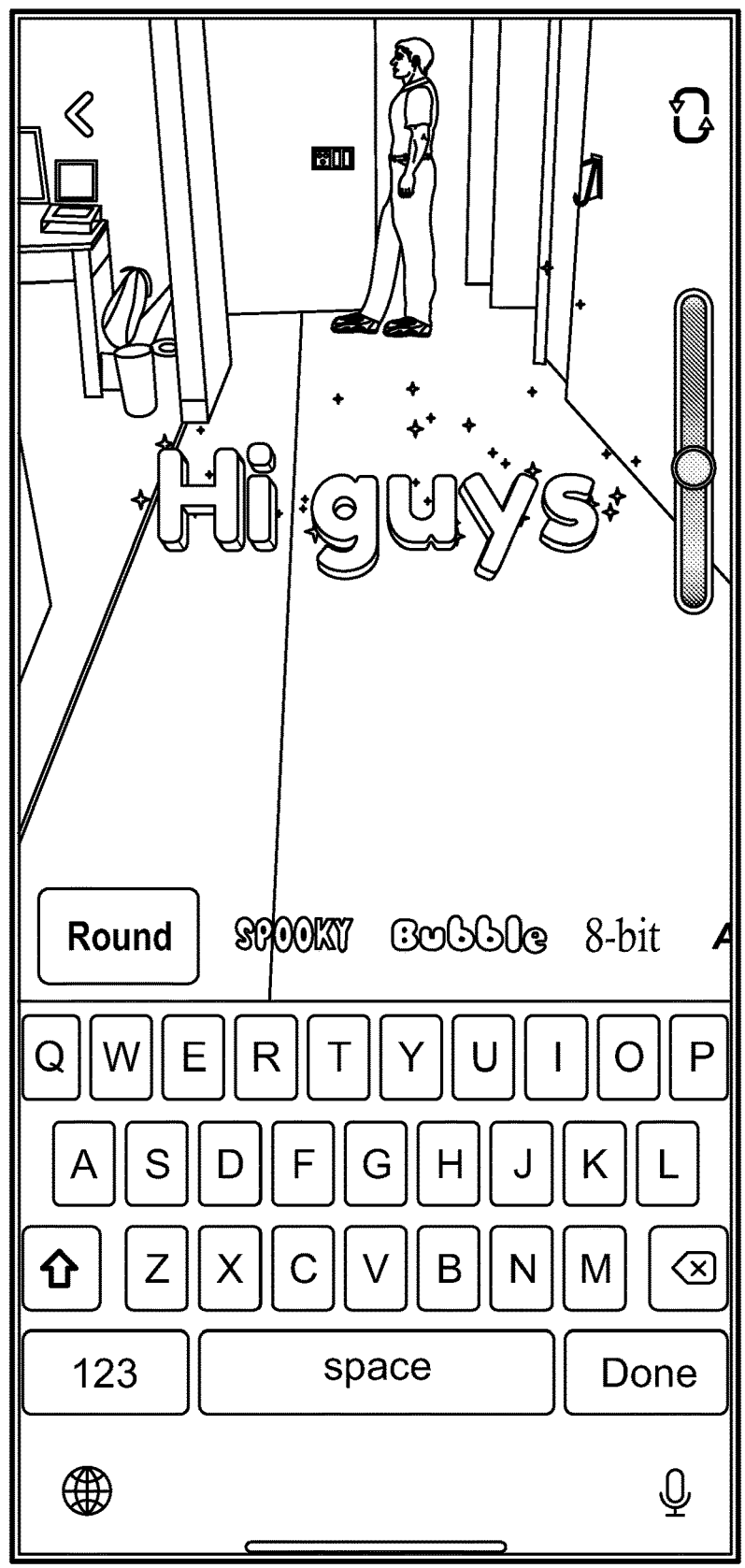
FIGS. 14A and 14B are interface diagrams that illustrate various interfaces provided by the messaging system, according to some example embodiments.
Figure 14B:
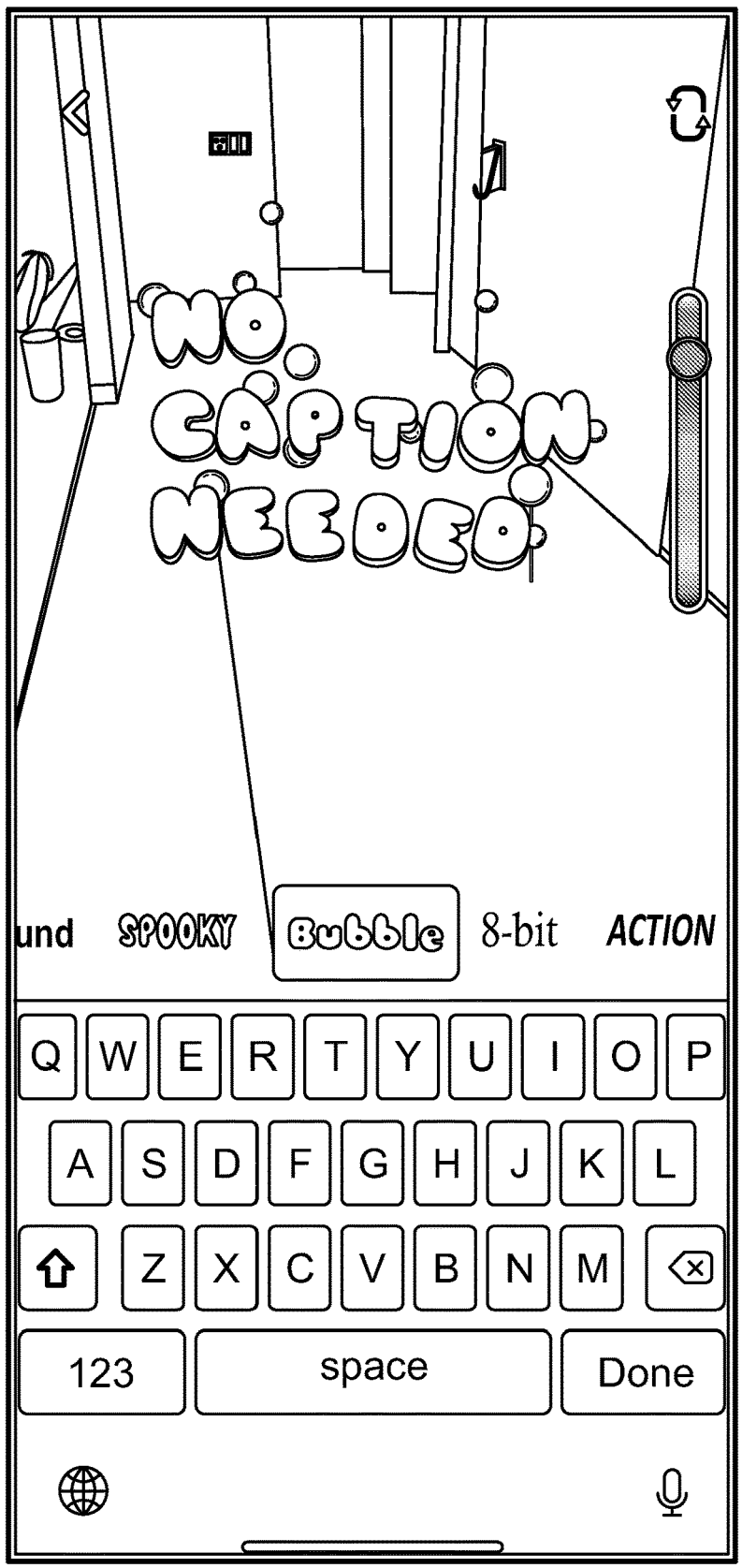

FIGS. 14A-14B are interface diagrams that illustrate an interface according to some embodiments. As shown in FIG. 14A, the user is presented with a style carousel and a color picker menu. The style carousel includes an interactive menu of text styles including an option for round text, an option for spooky text, an option for bubble text and so forth. In response to receiving a user selection of the bubble text option, as shown in FIG. 14B, the text style changes to have bubble style attributes relative to the text shown in FIG. 14A. The user can also swipe up/down along the color picker to adjust the color of the text.

Figure 15:
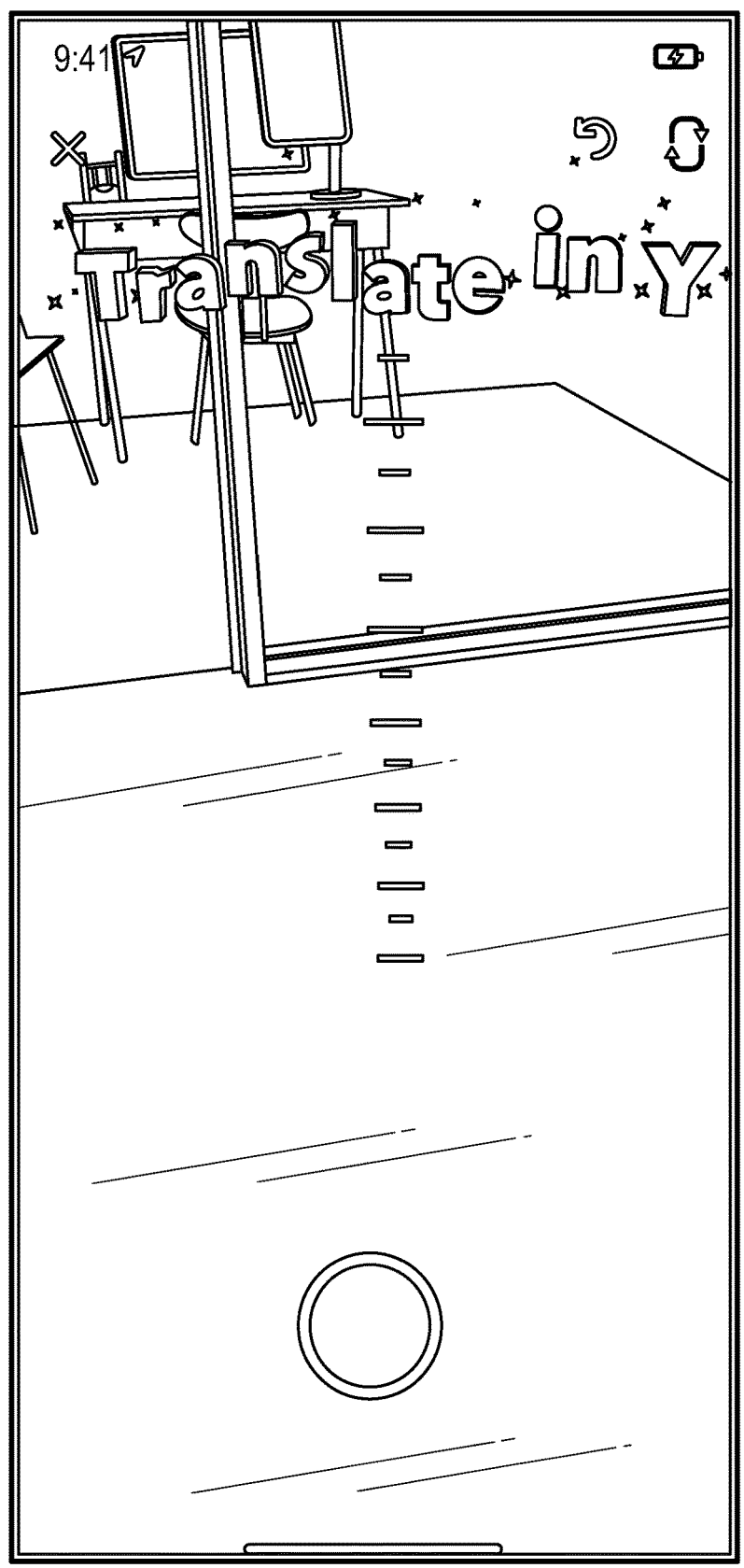
FIG. 15 is an interface diagram that illustrates an interface provided by the messaging system, according to some example embodiments.

FIG. 15 is an interface diagram that illustrates an interface provided by the messaging system 100, according to some example embodiments. Specifically, after the user selects a "done" option, the 2D text with the specified attributes (e.g., style and color) is converted to the 3D caption and displayed in the camera feed, as shown in FIG. 15. The user can then adjust the orientation and position of the 3D caption in 3D space. Namely, the user can move the text up/down in the y-axis by pressing and holding two fingers on top of the 3D caption displayed on the screen and then releasing one of the two fingers. This gesture activates the option to translate the 3D caption along the y-axis up/down. Specifically, the user can now use the one finger that remains in contact with the screen to swipe up/down to move the 3D caption in the y-axis.

Figure 16A:
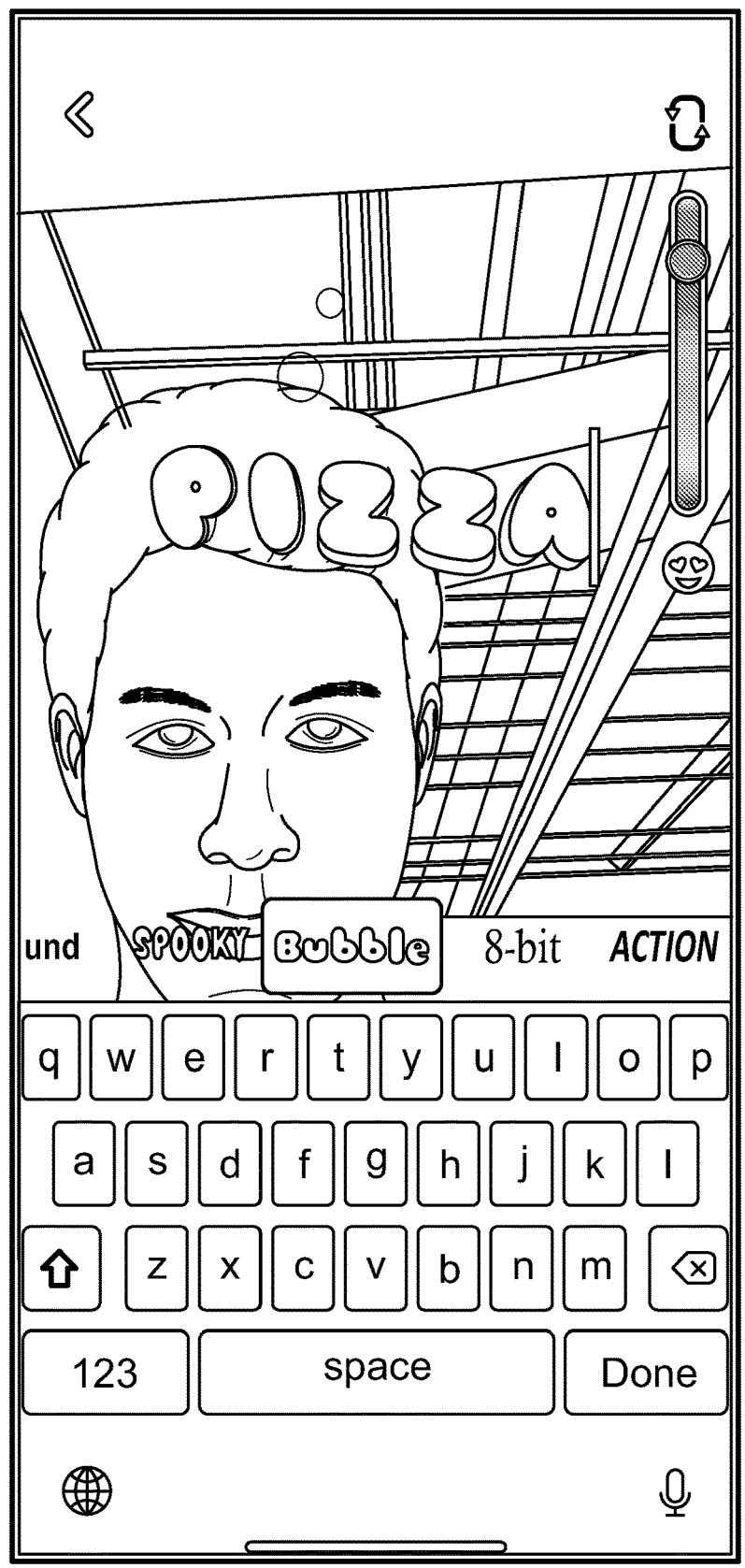
FIGS. 16A and 16B are interface diagrams that illustrate various interfaces provided by the messaging system, according to some example embodiments.
Figure 16B:
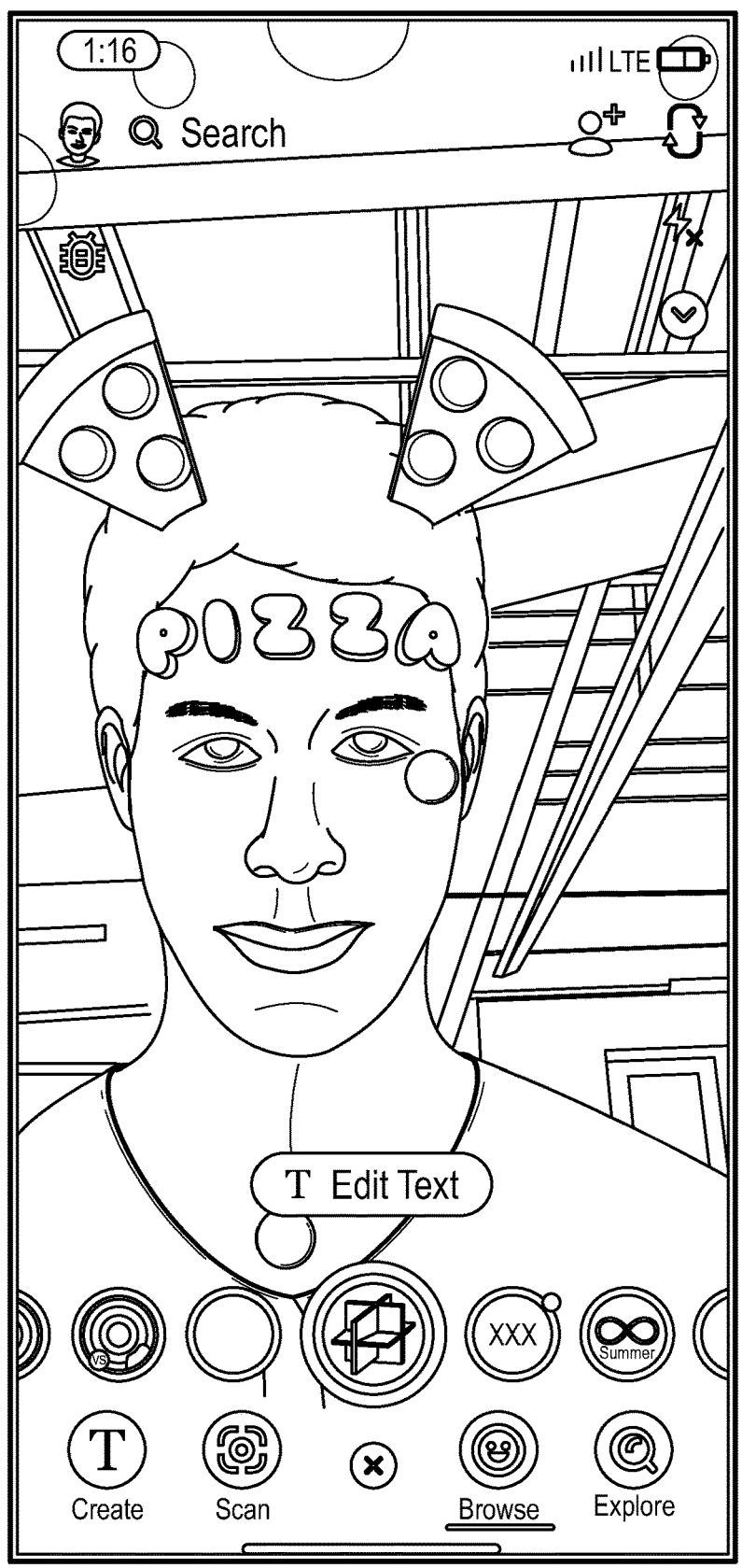

FIGS. 16A and 16B are interface diagrams that illustrate various interfaces provided by the messaging system 100, according to some example embodiments. For example, the user can enter text (e.g., the word "pizza") in FIG. 16A to add to a face depicted in the camera feed (e.g., the camera feed of the front-facing or rear-facing camera) and then press a "done" button. In response to the user pressing the "done" button, the text entered by the user is converted to a 3D caption and placed on top of the forehead of the face depicted in the camera feed, as shown in FIG. 16B. The 3D caption system 210 searches for one or more graphical elements that are associated with the text input by the user. In this case, the 3D caption system 210 found that the word "pizza" is associated with an emoji that looks like a pizza or a pizza graphical element. In response, as shown in FIG. 16B, the 3D caption system 210 adds a first pizza graphical element on the user's head on a left side of the 3D caption and a second pizza graphical element on the user's head on the right side of the 3D caption.

Figure 17A:
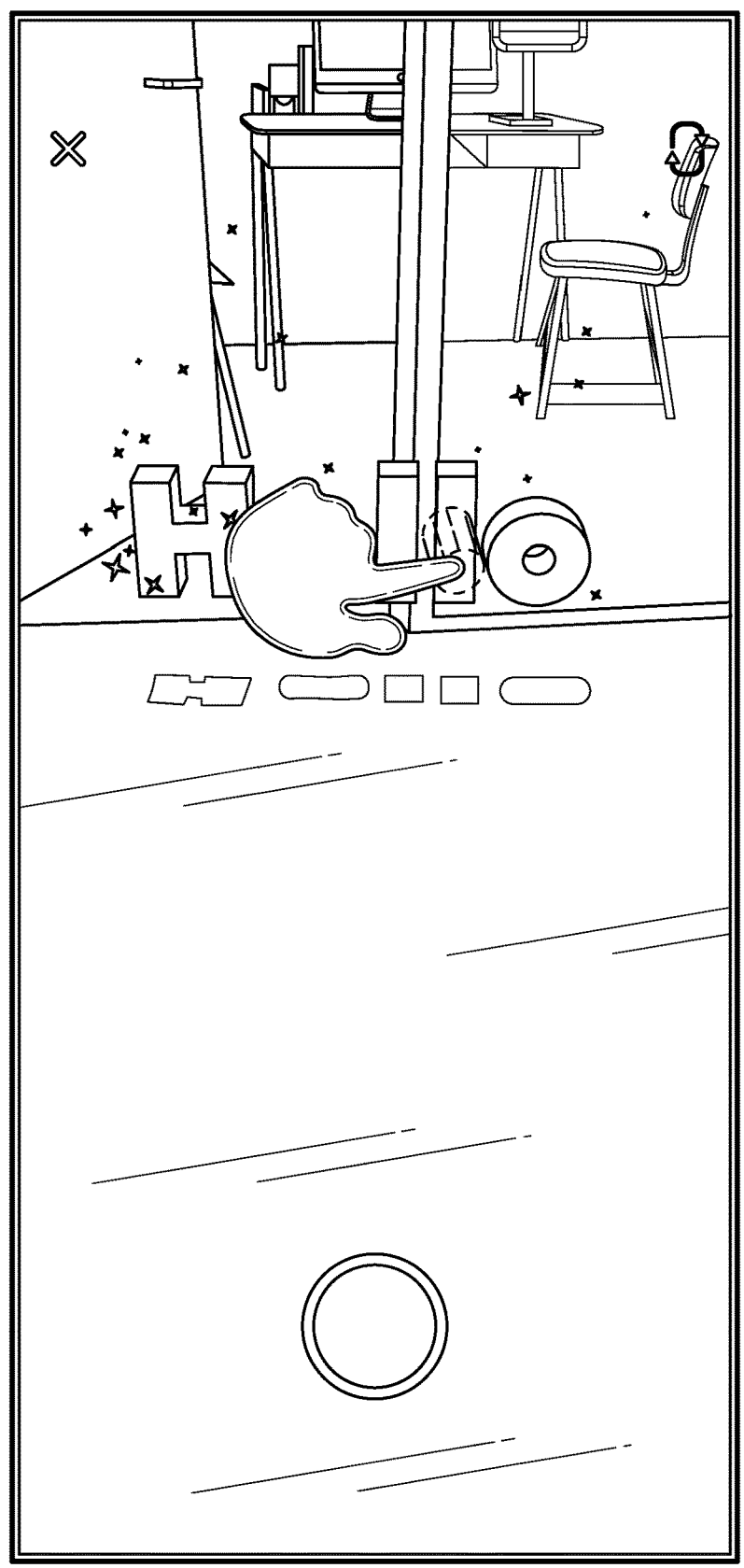
FIGS. 17A and 17B are interface diagrams that illustrate various interfaces provided by the messaging system, according to some example embodiments.
Figure 17B:
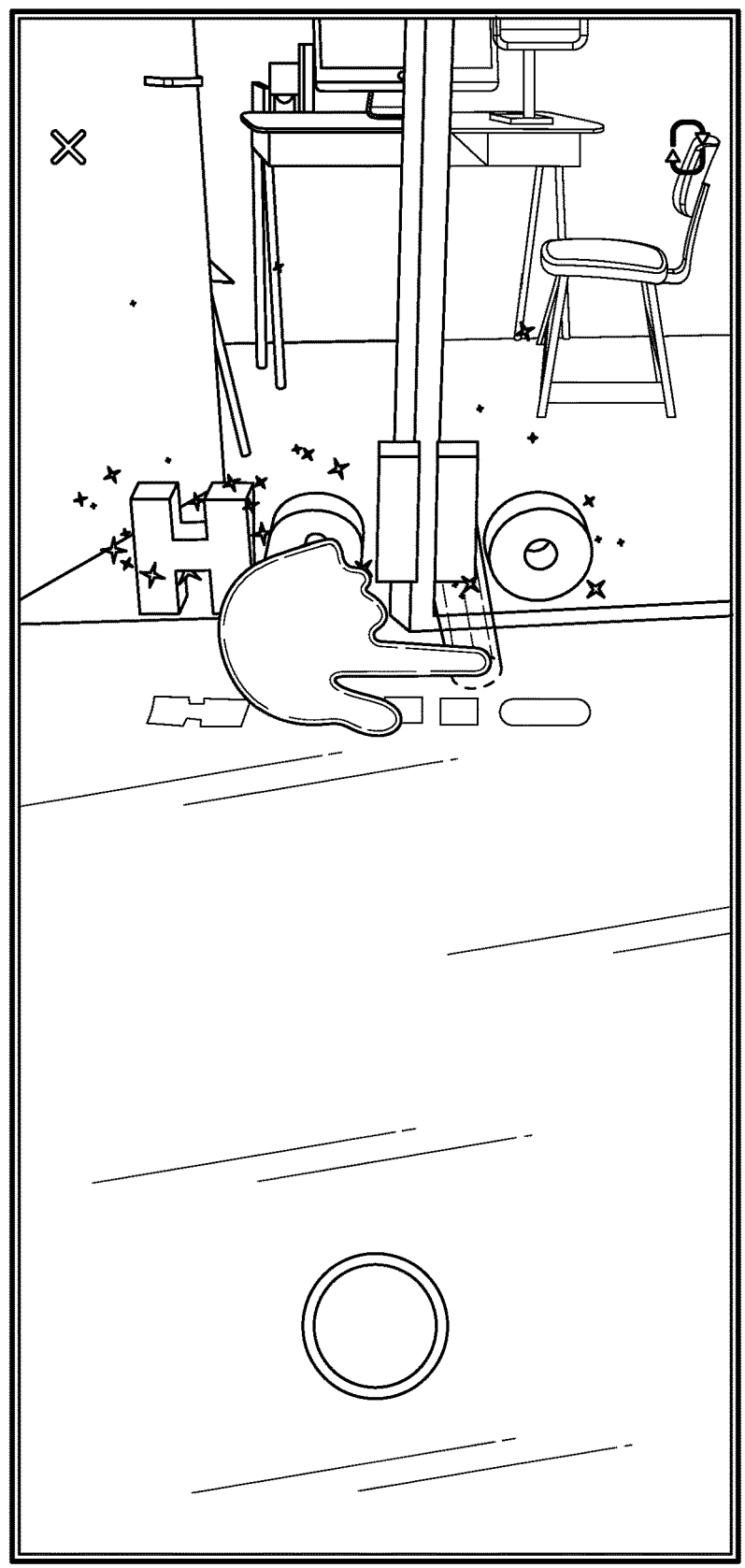

FIGS. 17A and 17B are interface diagrams that illustrate various interfaces provided by the messaging system 100, according to some example embodiments. The 3D caption system 210 may determine whether the user is accessing the 3D caption feature for the first time. In response to determining that the user is accessing the 3D caption feature for the first time, the 3D caption system 210 may present a 3D caption in the camera feed together with an instructional animation (e.g., a 3D hint) on how to adjust the 3D caption, as shown in FIGS. 17A-B. The instructional animation shown in FIGS. 17A-B includes a hand that repeatedly points to the 3D caption (e.g., the text of the 3D caption) and moves in a particular direction (e.g., towards the user) to indicate to the user that the user can point a finger and tap on the 3D caption to drag and reposition the 3D caption. After the 3D caption system 210 receives input from the user that responds to the instructional animation to perform the action indicated by the instruction, the 3D caption system 210 removes the instructional animation from the display and allows the user to perform the requested action (e.g., adjusting a position and/or modifying the 3D caption).

Figure 18A:
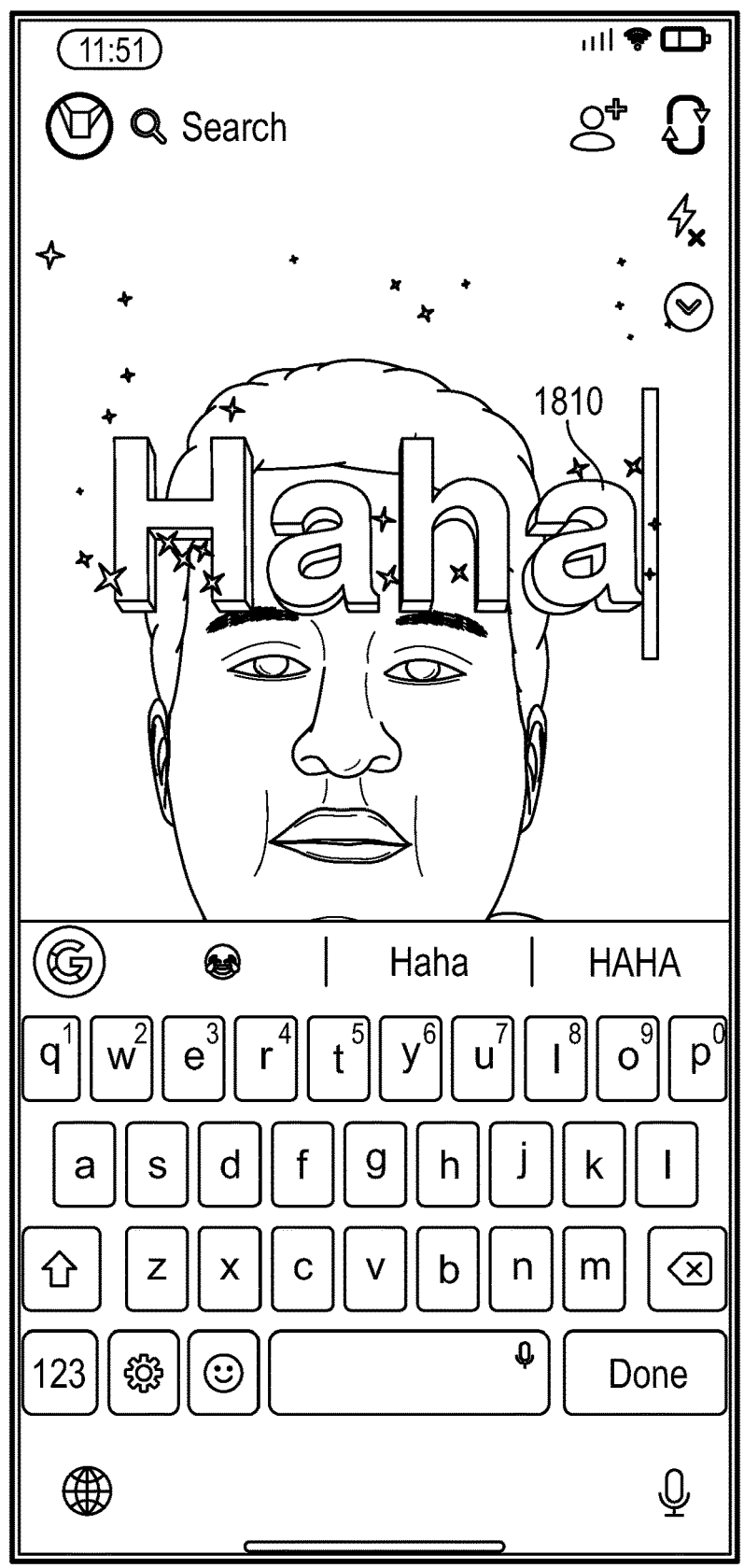
FIGS. 18A-J are interface diagrams that illustrate various interfaces provided by the messaging system, according to some example embodiments.
Figure 18B:
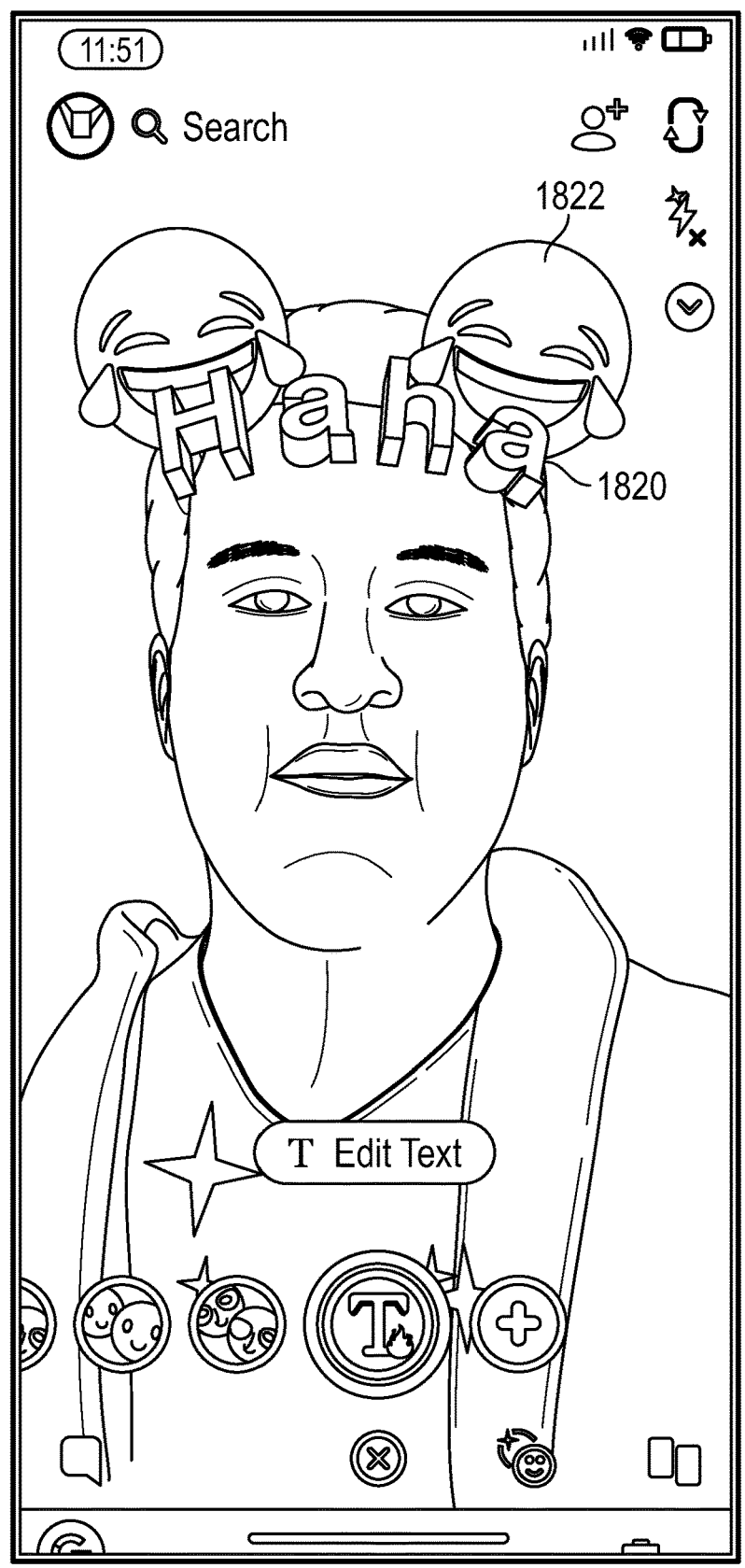
Figure 18C:
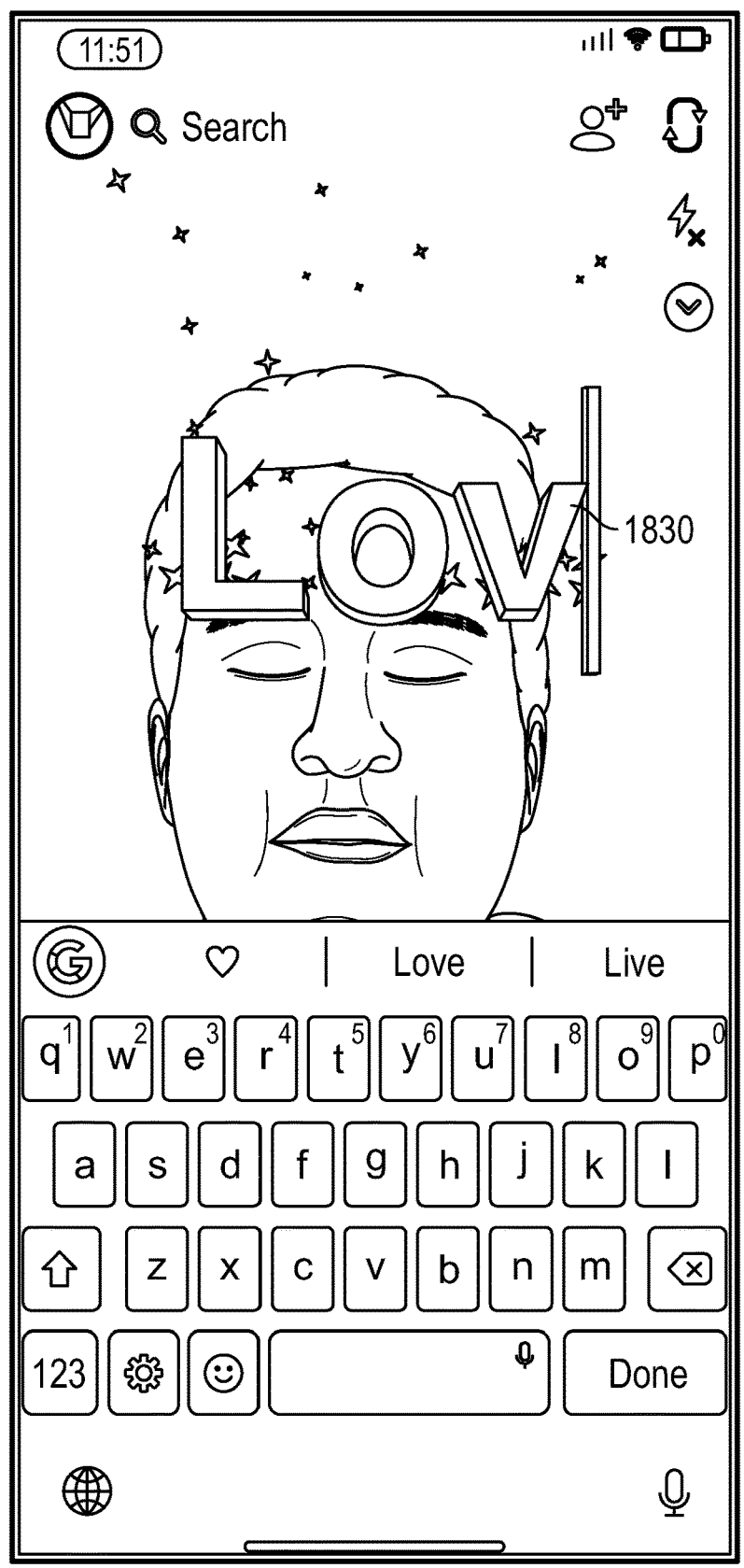
Figure 18D:
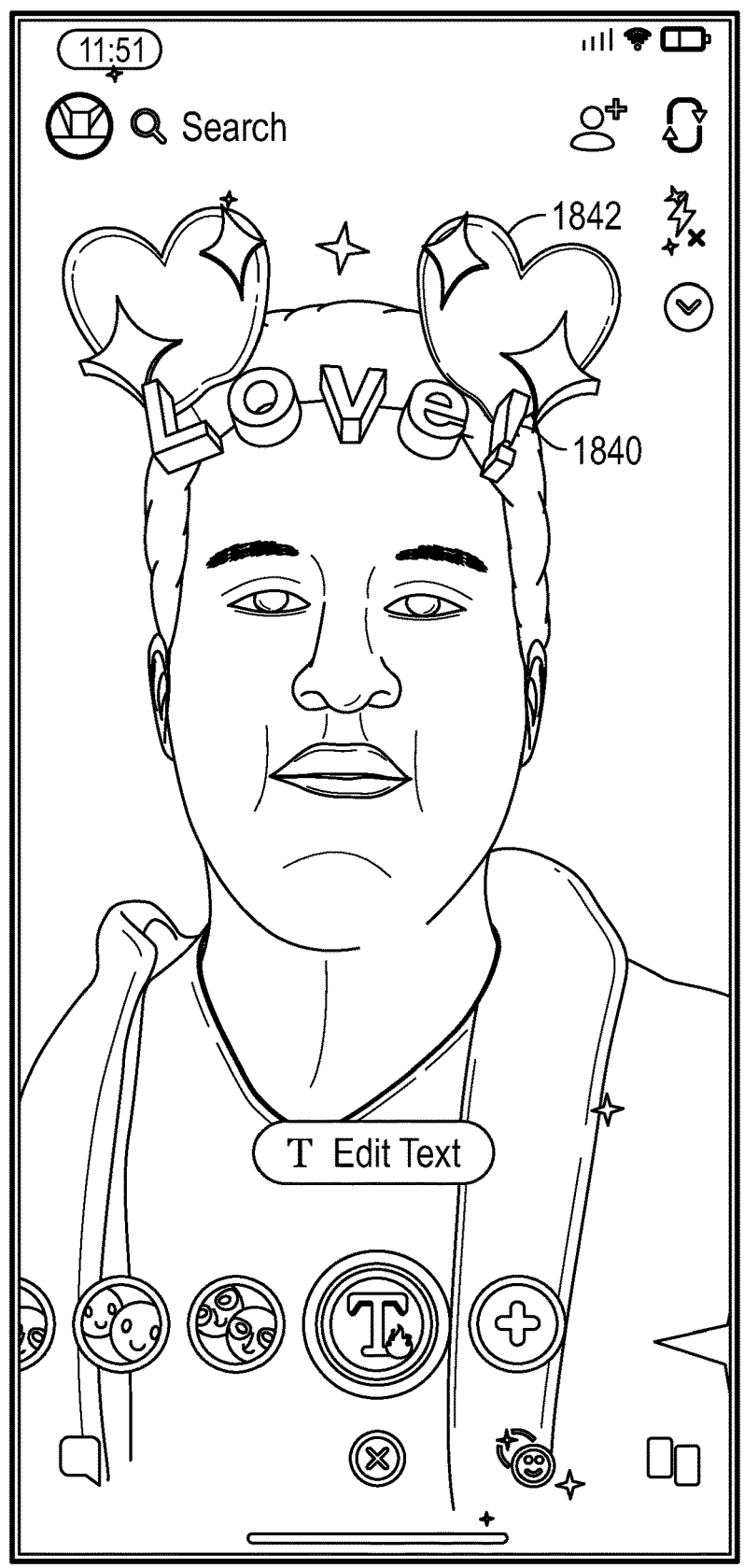

FIGS. 18A-J are interface diagrams that illustrate various interfaces provided by the messaging system 100, according to some example embodiments. In FIG. 18A, a front-facing camera feed is shown and the user inputs the text string 1810 "haha" in a dimmed screen for use in generating a 3D caption. In response to the user selecting a "done" option, the text string 1810 is converted to a 3D caption and presented on top of the user's head depicted in the camera feed as a 3D caption 1820 (FIG. 18B). The 3D caption system 210 found that the word "haha" is associated with a laughing face emoji. In response, as shown in FIG. 18B, the 3D caption system 210 adds a graphical element 1822 that includes a first laughing face emoji on the user's head on a left side of the 3D caption and a second laughing face emoji on the user's head on the right side of the 3D caption. The user can tap on the 3D caption to edit the caption. As shown in FIG. 18C, the user tapped on the 3D caption with the word "haha" and replaces the word "haha" with the word 1830 "love". In response to the user selecting a done option, the text string is converted to 3D presented on top of the user's head depicted in the camera feed as a 3D caption 1840, as shown in FIG. 18D. The 3D caption system 210 found that the word "love" is associated with a heart emoji. In response, as shown in FIG. 18D, the 3D caption system 210 adds a graphical element 1842 that includes a first heart emoji on the user's head on a left side of the 3D caption and a second heart emoji on the user's head on the right side of the 3D caption.

Figure 18E:
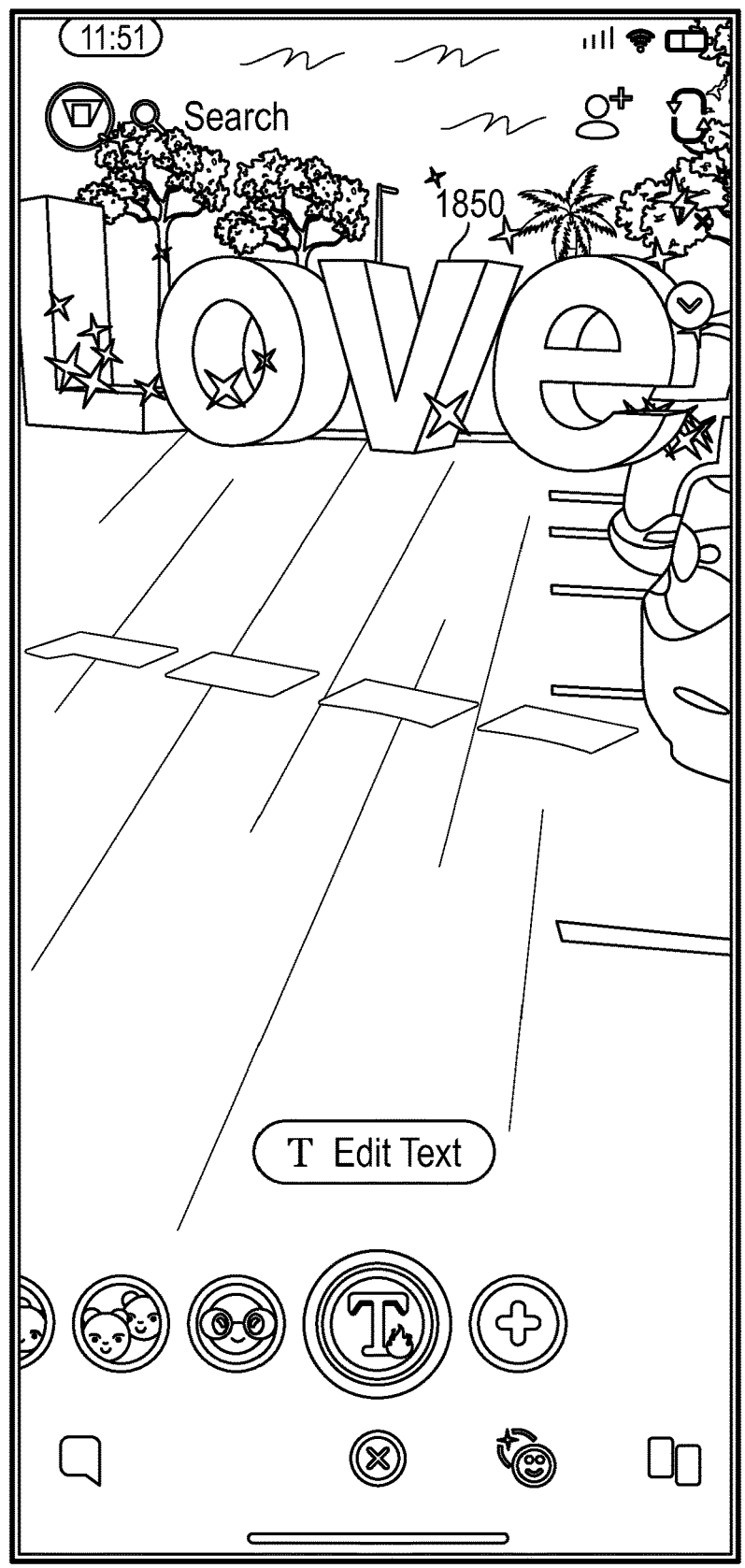

While the 3D caption with the heart emojis is presented on top of the user's face in the camera feed, as shown in FIG. 18D, the user selects an option to activate a rear-facing camera feed. In response, the camera feed is replaced by a video feed received from the rear-facing camera in which no face is detected or presented. As a result, the 3D caption system 210 presents the 3D caption that was previously on the user's head as 3D caption 1850 above the ground, as shown in FIG. 18E. Also, because a face is no longer present in the video feed, the 3D caption system 210 removes the heart emojis or graphical elements that were presented with the 3D caption when the face was detected in the video feed of the front-facing camera.

Figure 18F:
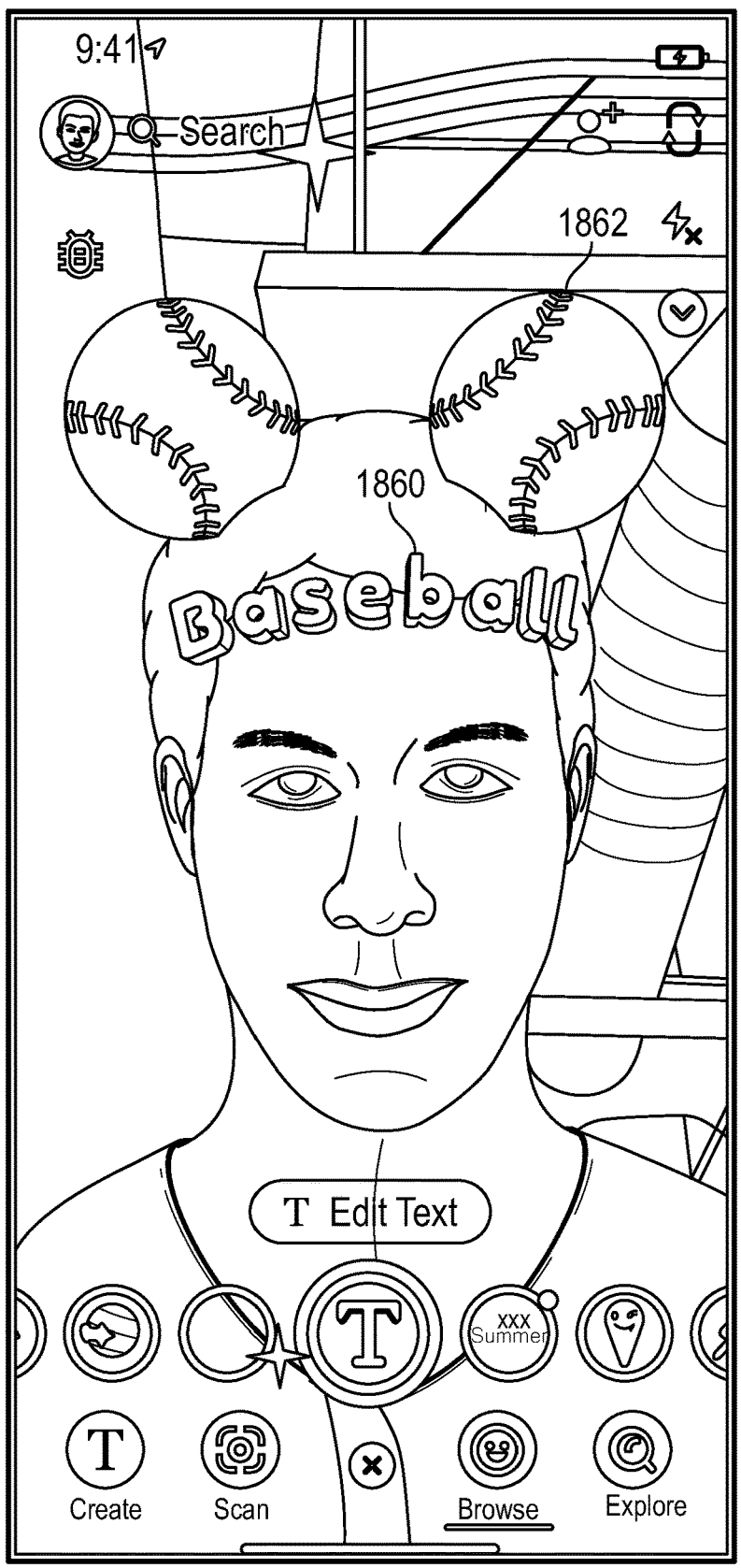
Figure 18G:
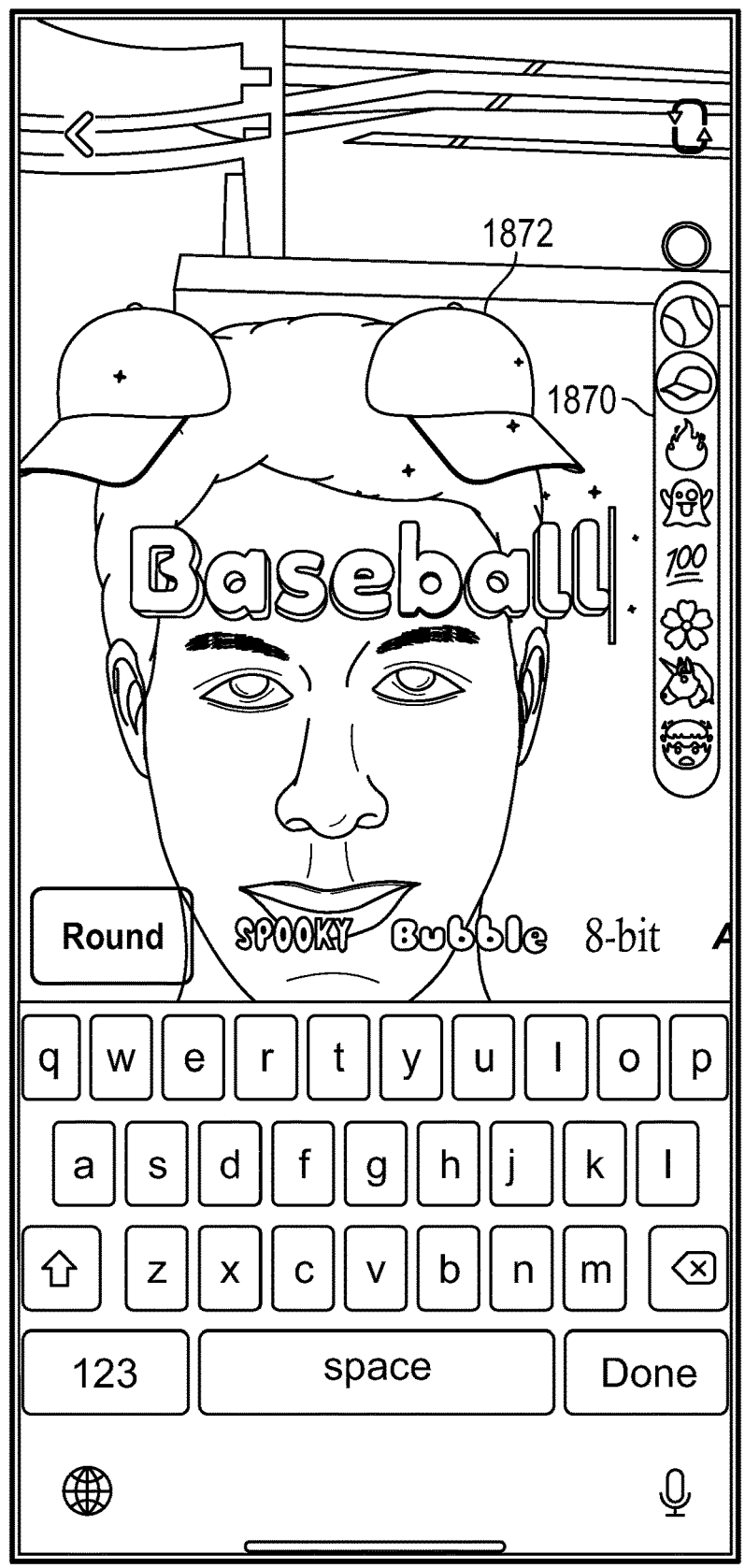
Figure 18H:
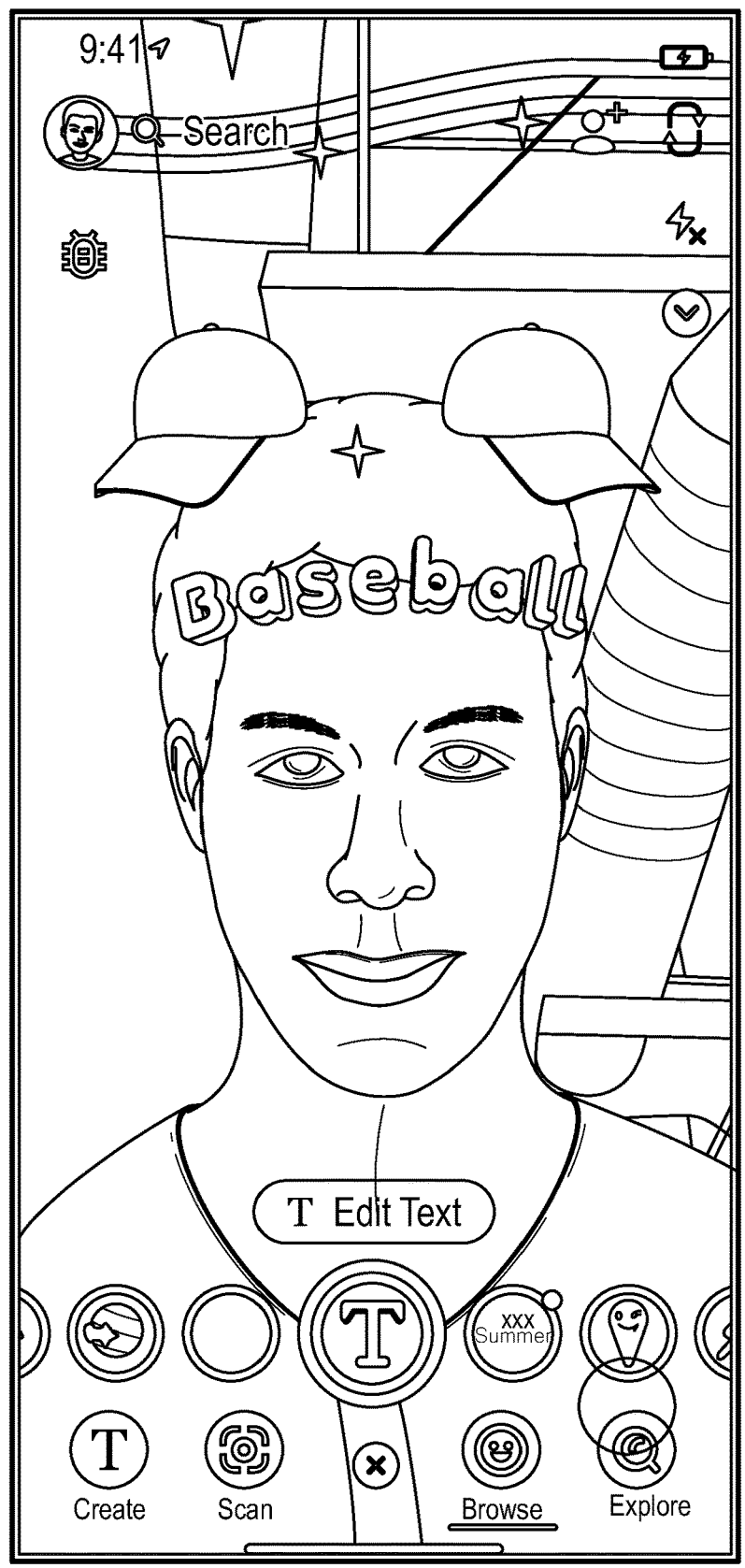

In FIG. 18F, a front-facing camera feed is shown and the user inputs the caption 1860 "baseball" in a dimmed screen for use in generating a 3D caption. In response to the user selecting a done option, the text string is converted to a 3D caption and presented on top of the user's head depicted in the camera feed as a 3D text string 1860 caption, as shown in FIG. 18F. The 3D caption system 210 found that the word "baseball" is associated with a baseball emoji. In response, as shown in FIG. 18F, the 3D caption system 210 adds a graphical element 1862 that includes a first baseball emoji on the user's head on a left side of the 3D caption and a second baseball emoji on the user's head on the right side of the 3D caption. The user can change the automatically selected graphical elements (e.g., the baseballs) shown in FIG. 18F by tapping on the graphical element 1862. In response to the user tapping on one of the baseball emojis shown in FIG. 18F, the 3D caption system 210 dims the screen and presents the text of the 3D caption in 2D so the user can edit the text. Together with the text in 2D, the 3D caption system 210 presents a graphical element menu 1870 that lists various graphical elements the user can select to replace the automatically selected graphical element, as shown in FIG. 18G. The previously selected graphical elements remain displayed in the video feed in the background on top of the user's head as a reference. The user can select an alternate graphical element 1872 (e.g., a hat emoji) from the graphical element menu. In response, as shown in FIG. 18H, the 3D caption system 210 replaces the automatically selected graphical elements with the alternate graphical element 1872. As an example, caption system 210 adds a first hat emoji on the user's head on a left side of the 3D caption and a second hat emoji on the user's head on the right side of the 3D caption.

Figure 18I:
Figure 18J:
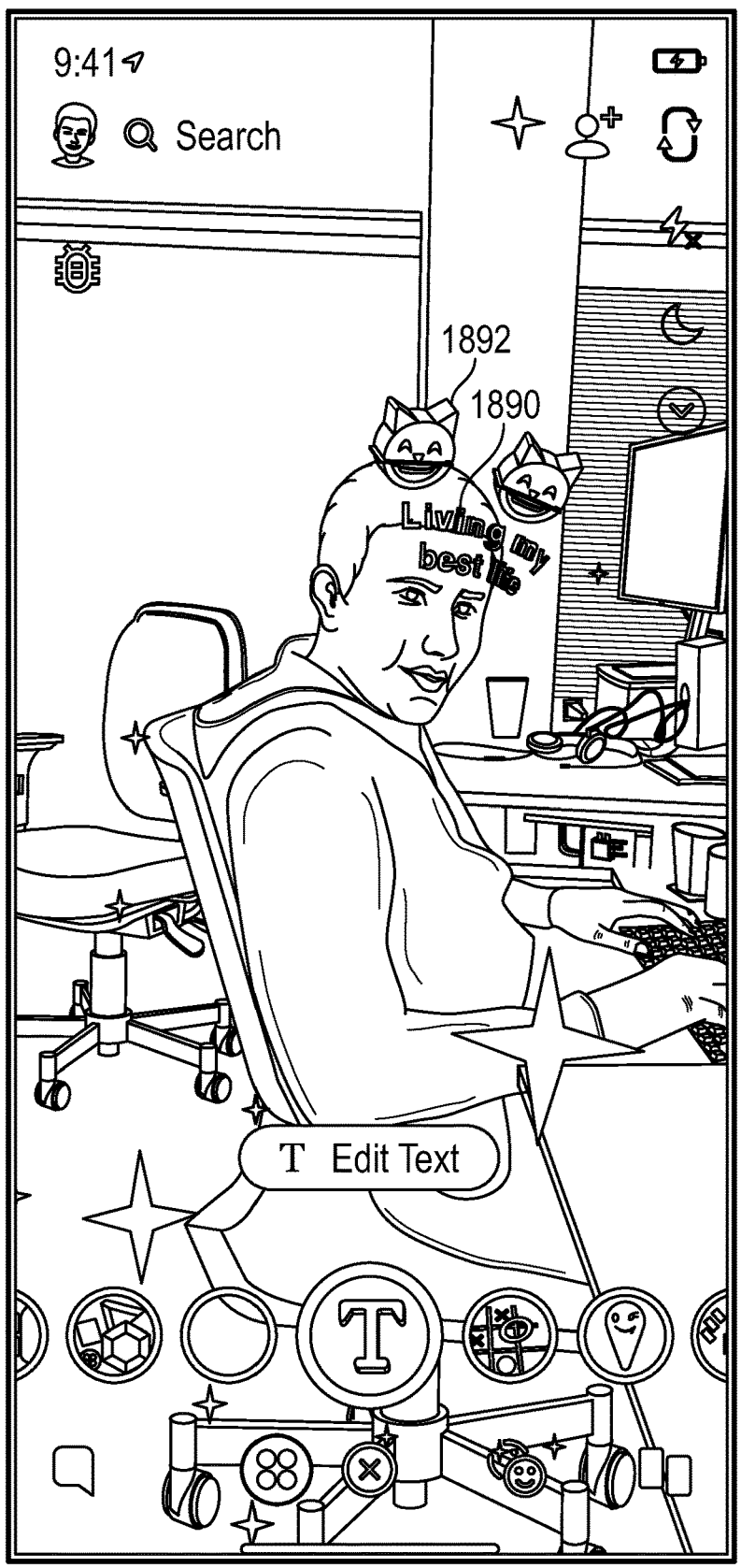

In FIG. 18I, a rear-facing camera feed is shown and the user inputs the text string "living my best life" in a dimmed screen for use in generating a 3D caption. Alternatively, the string for the 3D caption is automatically populated based on context of the client device 102. In response to the user selecting a done option, the text string is converted to a 3D caption 1880 presented on top of a surface, as shown in FIG. 18I. The user may pan the rear-facing camera to the right/left to reveal a face. In response to detecting a face, as shown in FIG. 18J, the 3D caption system 210 transitions and moves the 3D caption 1890 to being placed on top of the head (or on the forehead) or in proximity to the face depicted in the camera feed. Also, the 3D caption system 210 searches for and finds one or more graphical elements 1892 associated with words or phrases in the 3D caption and adds those graphical elements to the 3D caption on top of the head or face. The graphical elements 1892 may be removed when the camera is panned back to provide a camera feed in which a face is no longer detected. In such cases, the 3D caption is presented without the graphical elements 1892 on a surface instead of on top of the face or head of the user previously depicted in the camera feed.

Figure 19:
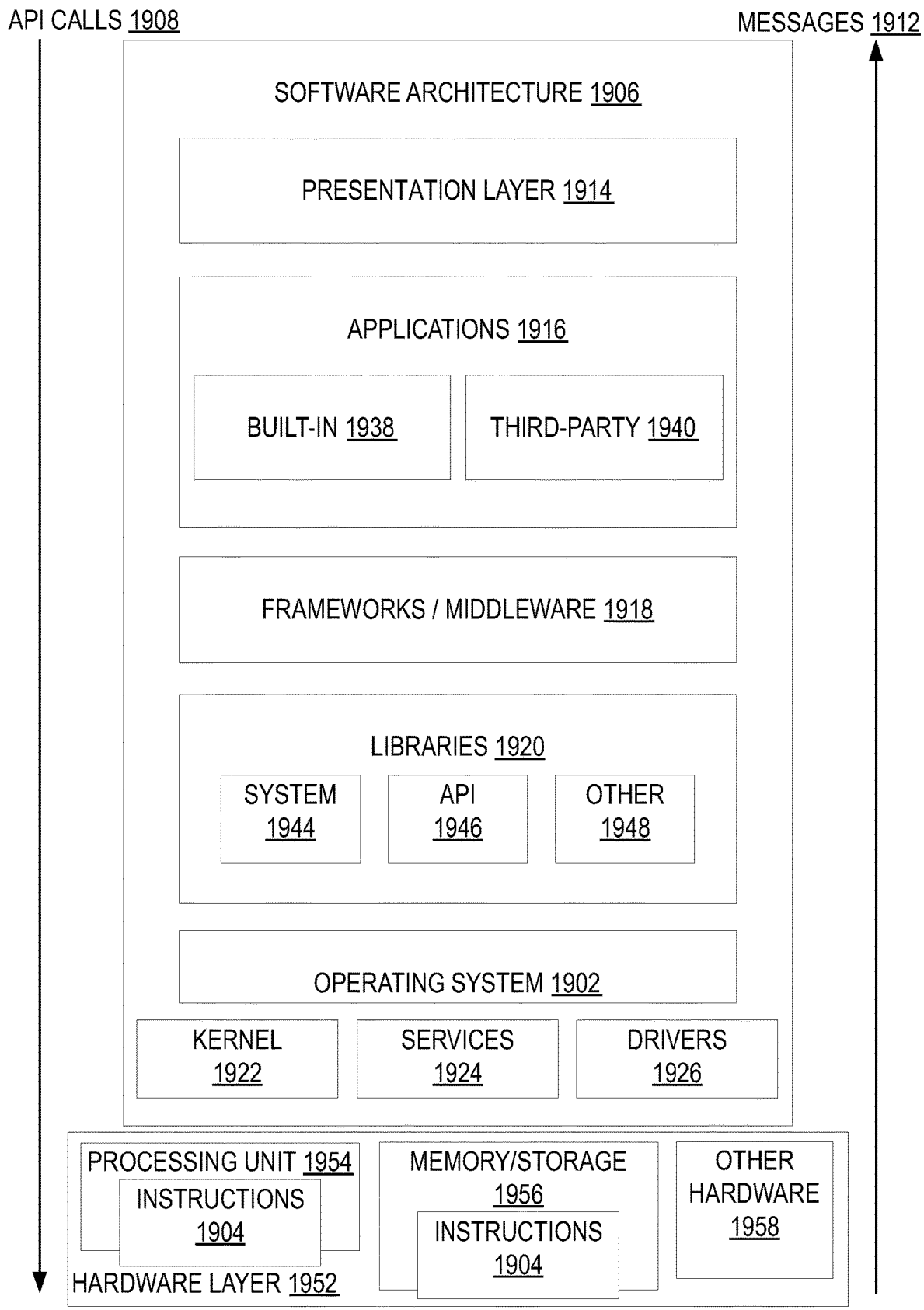
FIG. 19 is a block diagram illustrating a representative software architecture, which may be used in conjunction with various hardware architectures herein described, according to example embodiments.

FIG. 19 is a block diagram illustrating an example software architecture 1906, which may be used in conjunction with various hardware architectures herein described. FIG. 19 is a non-limiting example of a software architecture and it will be appreciated that many other architectures may be implemented to facilitate the functionality described herein. The software architecture 1906 may execute on hardware such as machine 2000 of FIG. 20 that includes, among other things, processors 2004, memory 2014, and input/output (I/O) components 2018. A representative hardware layer 1952 is illustrated and can represent, for example, the machine 2000 of FIG. 20. The representative hardware layer 1952 includes a processing unit 1954 having associated executable instructions 1904. Executable instructions 1904 represent the executable instructions of the software architecture 1906, including implementation of the methods, components, and so forth described herein. The hardware layer 1952 also includes memory and/or storage modules memory/storage 1956, which also have executable instructions 1904. The hardware layer 1952 may also comprise other hardware 1958.

In the example architecture of FIG. 19, the software architecture 1906 may be conceptualized as a stack of layers where each layer provides particular functionality. For example, the software architecture 1906 may include layers such as an operating system 1902, libraries 1920, applications 1916, frameworks/middleware 1918, and a presentation layer 1914. Operationally, the applications 1916 and/or other components within the layers may invoke API calls 1908 through the software stack and receive a response as in messages 1912 to the API calls 1908. The layers illustrated are representative in nature and not all software architectures have all layers. For example, some mobile or special purpose operating systems may not provide a frameworks/middleware 1918, while others may provide such a layer. Other software architectures may include additional or different layers.

The operating system 1902 may manage hardware resources and provide common services. The operating system 1902 may include, for example, a kernel 1922, services 1924, and drivers 1926. The kernel 1922 may act as an abstraction layer between the hardware and the other software layers. For example, the kernel 1922 may be responsible for memory management, processor management (e.g., scheduling), component management, networking, security settings, and so on. The services 1924 may provide other common services for the other software layers. The drivers 1926 are responsible for controlling or interfacing with the underlying hardware. For instance, the drivers 1926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1920 provide a common infrastructure that is used by the applications 1916 and/or other components and/or layers. The libraries 1920 provide functionality that allows other software components to perform tasks in an easier fashion than to interface directly with the underlying operating system 1902 functionality (e.g., kernel 1922, services 1924 and/or drivers 1926). The libraries 1920 may include system libraries 1944 (e.g., C standard library) that may provide functions such as memory allocation functions, string manipulation functions, mathematical functions, and the like. In addition, the libraries 1920 may include API libraries 1946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1920 may also include a wide variety of other libraries 1948 to provide many other APIs to the applications 1916 and other software components/modules.

The frameworks/middleware 1918 (also sometimes referred to as middleware) provide a higher-level common infrastructure that may be used by the applications 1916 and/or other software components/modules. For example, the frameworks/middleware 1918 may provide various graphic user interface (GUI) functions, high-level resource management, high-level location services, and so forth. The frameworks/middleware 1918 may provide a broad spectrum of other APIs that may be utilized by the applications 1916 and/or other software components/modules, some of which may be specific to a particular operating system 1902 or platform.

The applications 1916 include built-in applications 1938 and/or third-party applications 1940. Examples of representative built-in applications 1938 may include, but are not limited to, a contacts application, a browser application, a book reader application, a location application, a media application, a messaging application, and/or a game application. Third-party applications 1940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1940 may invoke the API calls 1908 provided by the mobile operating system (such as operating system 1902) to facilitate functionality described herein.

The applications 1916 may use built-in operating system functions (e.g., kernel 1922, services 1924, and/or drivers 1926), libraries 1920, and frameworks/middleware 1918 to create user interfaces to interact with users of the system. Alternatively, or additionally, in some systems interactions with a user may occur through a presentation layer, such as presentation layer 1914. In these systems, the application/component "logic" can be separated from the aspects of the application/component that interact with a user.

Figure 20:
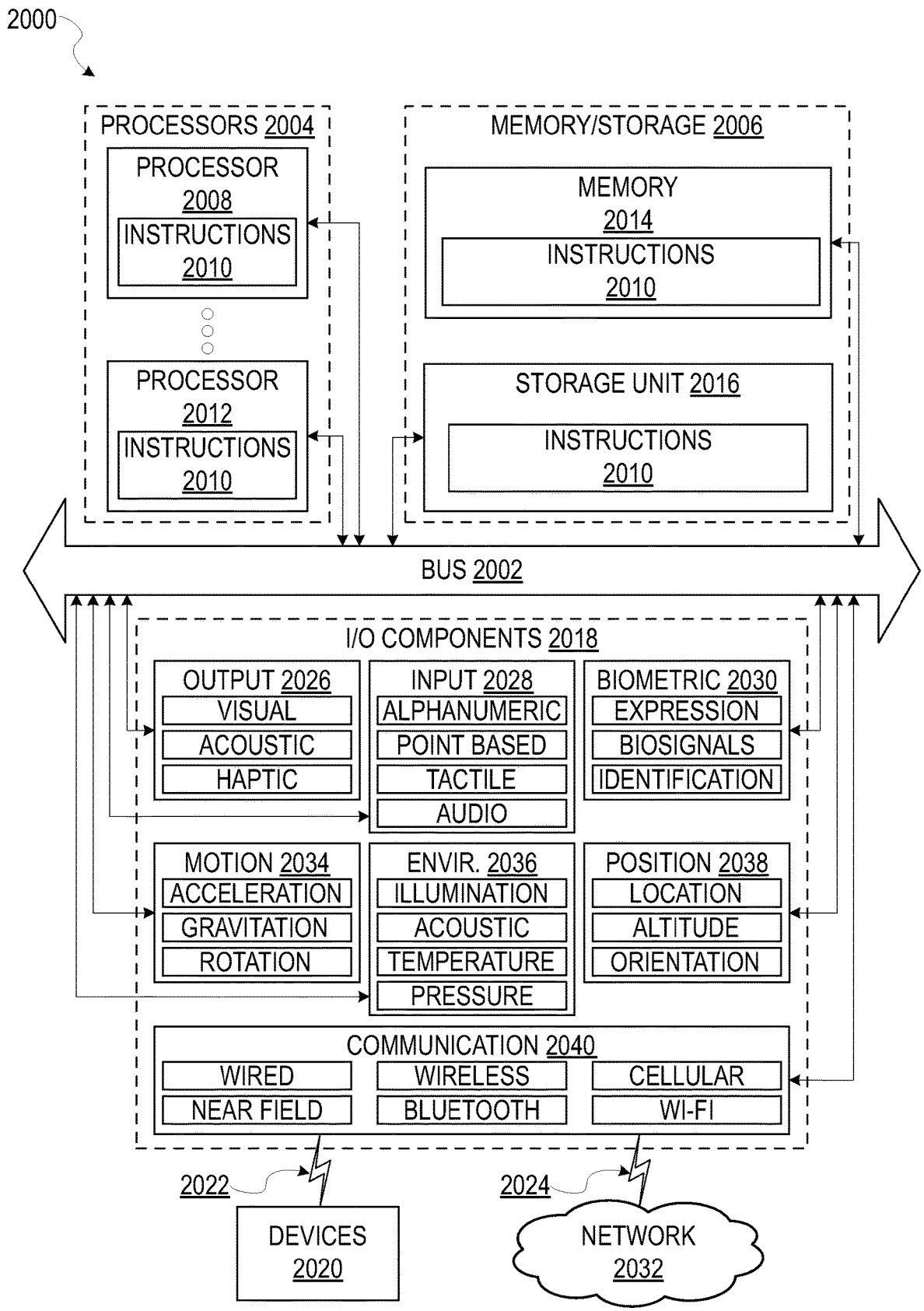
FIG. 20 is a block diagram illustrating components of a machine able to read instructions from a machine-readable medium (e.g., a machine-readable storage medium) and perform any one or more of the methodologies discussed herein, according to example embodiments.

FIG. 20 is a block diagram illustrating components of a machine 2000, according to some example embodiments, able to read instructions from a machine-readable medium (e.g., a machine-readable storage medium) and perform any one or more of the methodologies discussed herein. Specifically, FIG. 20 shows a diagrammatic representation of the machine 2000 in the example form of a computer system, within which instructions 2010 (e.g., software, a program, an application, an applet, an app, or other executable code) for causing the machine 2000 to perform any one or more of the methodologies discussed herein may be executed. As such, the instructions 2010 may be used to implement modules or components described herein. The instructions 2010 transform the general, non-programmed machine 2000 into a particular machine 2000 programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2010, sequentially or otherwise, that specify actions to be taken by machine 2000. Further, while only a single machine 2000 is illustrated, the term "machine" shall also be taken to include a collection of machines that individually or jointly execute the instructions 2010 to perform any one or more of the methodologies discussed herein.

The machine 2000 may include processors 2004, memory/storage 2006, and I/O components 2018, which may be configured to communicate with each other such as via a bus 2002. In an example embodiment, the processors 2004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2008 and a processor 2012 that may execute the instructions 2010. The term "processor" is intended to include multi-core processors 2004 that may comprise two or more independent processors (sometimes referred to as "cores") that may execute instructions 2010 contemporaneously. Although FIG. 20 shows multiple processors 2004, the machine 2000 may include a single processor with a single core, a single processor with multiple cores (e.g., a multi-core processor), multiple processors with a single core, multiple processors with multiple cores, or any combination thereof.

The memory/storage 2006 may include a memory 2014, such as a main memory, or other memory storage, and a storage unit 2016, both accessible to the processors 2004 such as via the bus 2002. The storage unit 2016 and memory 2014 store the instructions 2010 embodying any one or more of the methodologies or functions described herein. The instructions 2010 may also reside, completely or partially, within the memory 2014, within the storage unit 2016, within at least one of the processors 2004 (e.g., within the processor's cache memory), or any suitable combination thereof, during execution thereof by the machine 2000. Accordingly, the memory 2014, the storage unit 2016, and the memory of processors 2004 are examples of machine-readable media.

The I/O components 2018 may include a wide variety of components to receive input, provide output, produce output, transmit information, exchange information, capture measurements, and so on. The specific I/O components 2018 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2018 may include many other components that are not shown in FIG. 20. The I/O components 2018 are grouped according to functionality merely for simplifying the following discussion and the grouping is in no way limiting. In various example embodiments, the I/O components 2018 may include output components 2026 and input components 2028. The output components 2026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2018 may include biometric components 2030, motion components 2034, environmental components 2036, or position components 2038 among a wide array of other components. For example, the biometric components 2030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2034 may include acceleration sensor components (e.g., accelerometer), gravitation sensor components, rotation sensor components (e.g., gyroscope), and so forth. The environmental components 2036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2018 may include communication components 2040 operable to couple the machine 2000 to a network 2032 or devices 2020 via coupling 2024 and coupling 2022, respectively. For example, the communication components 2040 may include a network interface component or other suitable device to interface with the network 2032. In further examples, communication components 2040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2020 may be another machine or any of a wide variety of peripheral devices (e.g., a peripheral device coupled via a USB).

Moreover, the communication components 2040 may detect identifiers or include components operable to detect identifiers. For example, the communication components 2040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving a date and time of day, sometimes accurate to a small fraction of a second.

What is claimed is:

1. A system comprising:
   at least one hardware processor; and
   a memory storing instructions which, when executed by the at least one hardware processor, cause the at least one hardware processor to perform operations comprising:
   capturing an image by a camera of a user device;
   receiving an indication that causes placement of a 3D object at a designated position in the image captured by the camera; and
   selectively a graphical element in the image based on whether the 3D object is placed proximate to an object depicted in the image or on a surface depicted in the image.

2. The system of claim 1, wherein the operations further comprise:
   detecting input indicating that a user tapped the 3D object that is displayed in the image; and
   in response to detecting the input, presenting text of the 3D object in two-dimensions (2D) to enable the user to modify text of the 3D object.

3. The system of claim 1, wherein the operations further comprise:
   determining that the image is received from a camera; and
   in response to determining that the image is received from the camera, populating the 3D object with the graphical element.

4. The system of claim 1, wherein the operations further comprise:
   populating the 3D object with the graphical element in response to a user request.

5. The system of claim 1, wherein the operations further comprise:
   receiving a request to add a 3D object to an image that depicts the object; and identifying the graphical element that is associated with context of the 3D object.

6. The system of claim 1, wherein the operations further comprise curving the 3D object and graphical element around a bottom of the object.

7. The system of claim 1, wherein the operations further comprise:
receiving input that selects the graphical element that is displayed; and
in response to receiving the input, presenting text of the 3D object in two-dimensions in place of the 3D object while maintaining display of the graphical element in the image.

8. The system of claim 7, wherein the operations further comprise:
presenting a list of alternate graphical elements while maintaining display of the graphical element in the image;
receiving a selection of a given alternate graphical element from the list of alternate graphical elements; and
replacing the graphical element that is displayed in the image with the given alternate graphical element.

9. The system of claim 1, wherein the operations further comprise searching a database of graphical elements based on text of the 3D object to identify the graphical element that is associated with the text of the 3D object.

10. The system of claim 1, wherein the operations further comprise:
determining context associated with the image; and
automatically populating text of the 3D object based on the context associated with the image.

11. The system of claim 10, wherein the context associated with the image is determined based on a current date and time or day of the week.

12. The system of claim 1, wherein the operations further comprise dimming a screen in which text of the 3D object is presented to bring focus to the text of the 3D object.

13. The system of claim 12, wherein the operations further comprise:
determining that a user tapped on the screen at a location between two characters of the text; and
positioning a cursor to modify the text starting at the location between the two characters of the text in response to determining that the user tapped on the screen at the location between the two characters of the text.

14. The system of claim 1, wherein the 3D object includes words or phrases, and wherein the operations further comprise selecting a default graphical element to be displayed as the graphical element when none of the words or phrases in the 3D object matches words or phrases stored in a database that associates words or phrases with graphical elements.

15. The system of claim 1, wherein the operations further comprise:
in response to receiving a request to add the 3D object, presenting a two-dimensional (2D) text entry interface;
receiving a 2D text string from the 2D text entry interface;
identifying the graphical element based on the 2D text string;
converting the 2D text string to the 3D object; and
displaying the 3D object and the graphical element in response to receiving indication of completion of entry of the 2D text string.

16. The system of claim 1, the operations comprising:
in response to determining that the object is no longer detected in the image, moving the 3D object to the surface depicted in the image without displaying the graphical element.

17. A method comprising:
capturing an image by a camera of a user device;
receiving an indication that causes placement of a 3D object at a designated position in the image captured by the camera; and
selectively displaying a graphical element in the image based on whether the 3D object is placed proximate to an object depicted in the image or on a surface depicted in the image.

18. The method of claim 17, further comprising:
detecting input indicating that a user tapped the 3D object that is displayed in the image; and
in response to detecting the input indicating that the user tapped the 3D object, presenting text of the 3D object in two-dimensions to enable the user to modify text of the 3D object.

19. The method of claim 17, the image comprising a frame of a video.

20. A non-transitory machine-readable medium storing instructions which, when executed by one or more processors of a machine, cause the machine to perform operations comprising:
capturing an image by a camera of a user device;
receiving an indication that causes placement of a 3D object at a designated position in the image captured by the camera; and
selectively a graphical element in the image based on whether the 3D object is placed proximate to an object depicted in the image or on a surface depicted in the image.

* * * * *

UNITED STATES PATENT AND TRADEMARK OFFICE
CERTIFICATE OF CORRECTION

| | | |
|---|---|---|
| PATENT NO. | : 12,347,045 B2 | Page 1 of 1 |
| APPLICATION NO. | : 18/419163 | |
| DATED | : July 1, 2025 | |
| INVENTOR(S) | : Goodrich et al. | |

It is certified that error appears in the above-identified patent and that said Letters Patent is hereby corrected as shown below:

In the Claims

In Column 30, Line 43, in Claim 1, after "selectively", insert --displaying--

In Column 32, Line 45, in Claim 20, after "selectively", insert --displaying--

Signed and Sealed this
Sixth Day of January, 2026

John A. Squires
*Director of the United States Patent and Trademark Office*